(12) United States Patent
Rogers et al.

(10) Patent No.: US 8,125,370 B1
(45) Date of Patent: Feb. 28, 2012

(54) POLARIMETRIC SYNTHETIC APERTURE RADAR SIGNATURE DETECTOR

(75) Inventors: George W. Rogers, Milford, VA (US); Houra Rais, Adelphi, MD (US); Kenneth G. Bullard, Charlotte Hall, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 952 days.

(21) Appl. No.: 12/082,194

(22) Filed: Mar. 31, 2008

Related U.S. Application Data

(60) Provisional application No. 60/925,906, filed on Apr. 16, 2007.

(51) Int. Cl.
*G01S 13/90* (2006.01)
(52) U.S. Cl. .................................... 342/25 F; 342/25 R
(58) Field of Classification Search ................ 342/25 R, 342/25 F
See application file for complete search history.

(56) References Cited

U.S. PATENT DOCUMENTS 5,343,204 A   8/1994   Farmer et al. ................... 342/25

(Continued)

OTHER PUBLICATIONS

W. L. Cameron et al., "Simulated Polarimetric Signatures of Primitive Geometric Shapes", *IEEE Trans. on Geoscience and Remote Sensing*; 34, May 3, 1996, 793-803.

(Continued)

*Primary Examiner* — Thomas Tarcza
*Assistant Examiner* — Matthew M Barker
(74) *Attorney, Agent, or Firm* — Gerhard W. Thielman, Esq.

(57) ABSTRACT

A method is provided for processing an acquired polarimetric synthetic aperture radar (SAR) image of a region to identify a candidate pixel that correlates to a target representation. The polarimetric SAR image is composed of a plurality of pixels, and the candidate pixel corresponds to a position in the region that contains a candidate object. The process includes deconstructing J parameter components each sample, obtaining acquired values for the image from select parameter components, acquiring reference values that characterize said parameter components for the target representation, determining distance values each reference value and each acquired value, comparing the distance values against a classification criterion to determine whether the candidate pixel conforms to the target representative. The process may further include extracting N sub-apertures from the polarimetric SAR image, and combining the distance values for the sub-apertures together to obtain distance summations for comparison. The process may additionally include multiplying the distance summations with their corresponding weighting factors to obtain weighted results and combining these to produce a weighted log-likelihood function that identifies whether the pixel conforms to the target. Determining a difference may further include subtracting reference values from their respective acquired values to respectively obtain set of differences, assigning normalized defaults to the differences in response to the difference having a specified relation to parameter thresholds, and otherwise normalizing the difference, and determining natural logs of unity minus said each difference to obtain their distance values.

9 Claims, 35 Drawing Sheets

U.S. PATENT DOCUMENTS

| | | | |
|---|---|---|---|
| 5,552,787 | A | 9/1996 | Schuler et al. ................... 342/25 |
| 6,359,584 | B1 | 3/2002 | Cordey et al. .................. 342/169 |
| 6,518,914 | B1 | 2/2003 | Peterson et al. ................ 342/25 |
| 6,888,490 | B1 | 5/2005 | Brovko et al. ................... 342/25 |
| 2003/0122700 | A1 | 7/2003 | Moreira et al. ................. 342/25 |
| 2003/0134664 | A1 | 7/2003 | Zancewicz .................... 455/562 |
| 2004/0032361 | A1 | 2/2004 | Kirscht ........................... 342/25 |
| 2004/0201514 | A1 | 10/2004 | Stappaerts ..................... 342/25 |

OTHER PUBLICATIONS

W. L. Cameron et al., "Conservative Polarimetric Scatterers and their Role in Incorrect Extensions of the Cameron Decomposition", *IEEE Trans. of Geoscience and Remote Sensing*. 44, Dec. 12, 2006, 3506-3516.

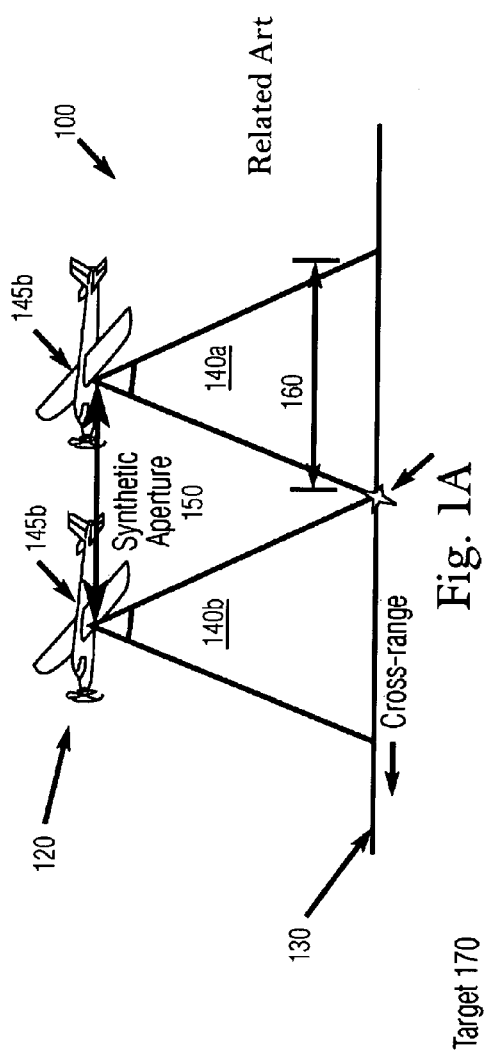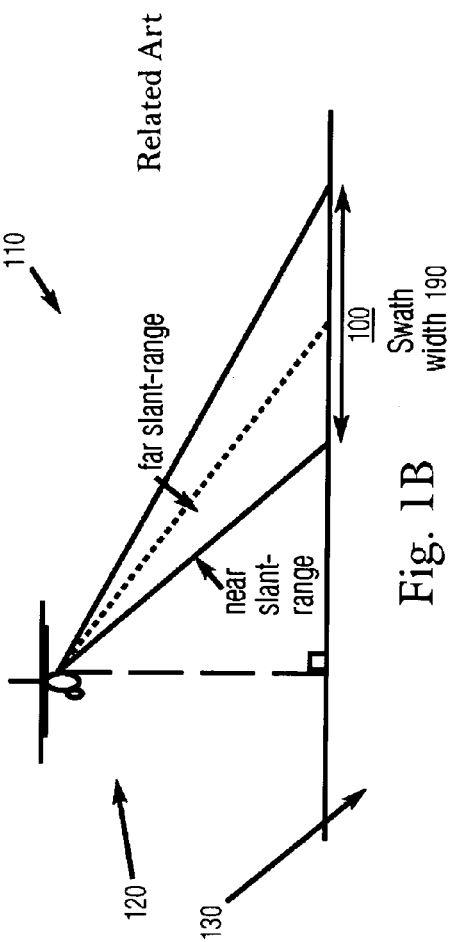

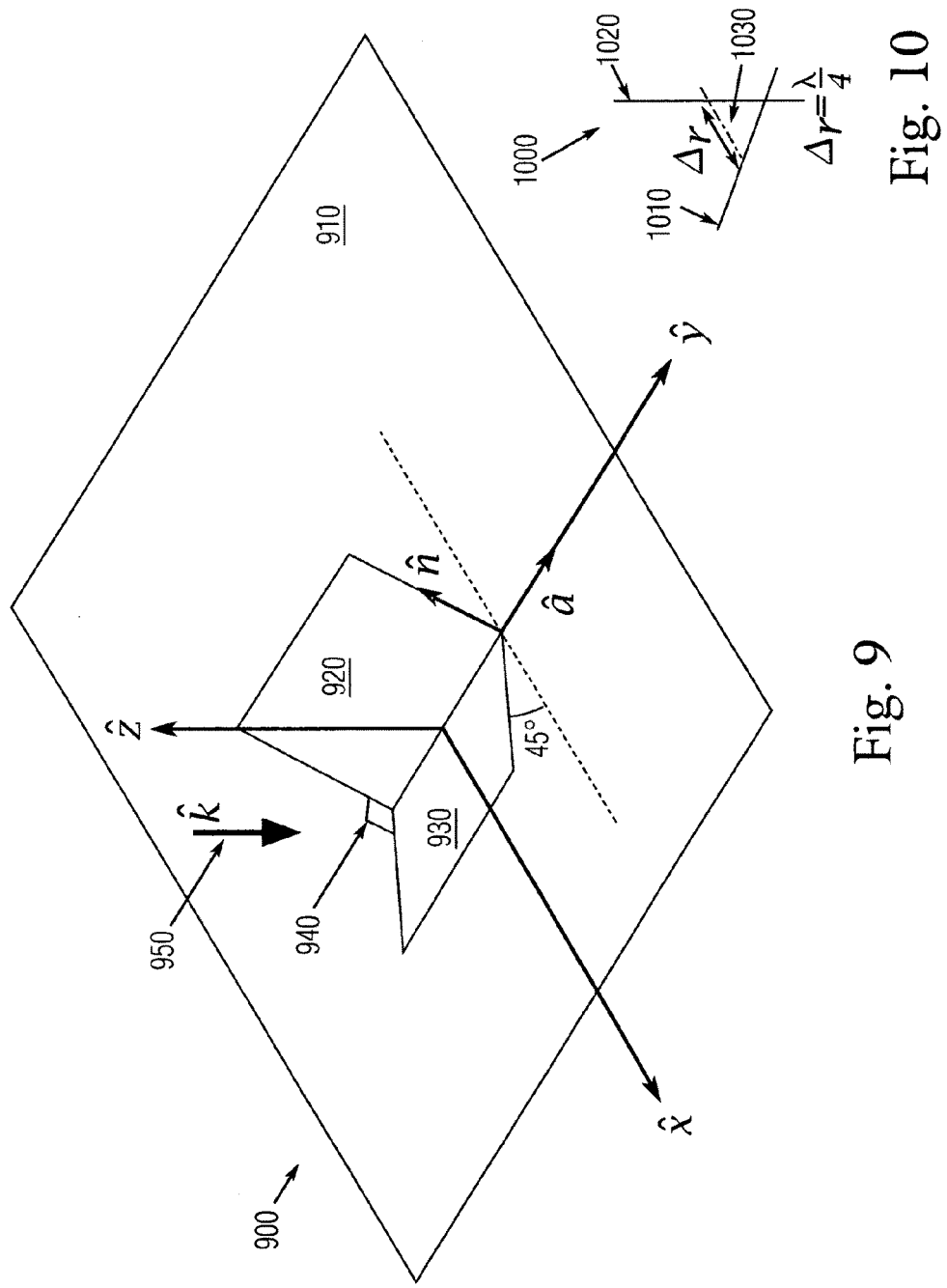

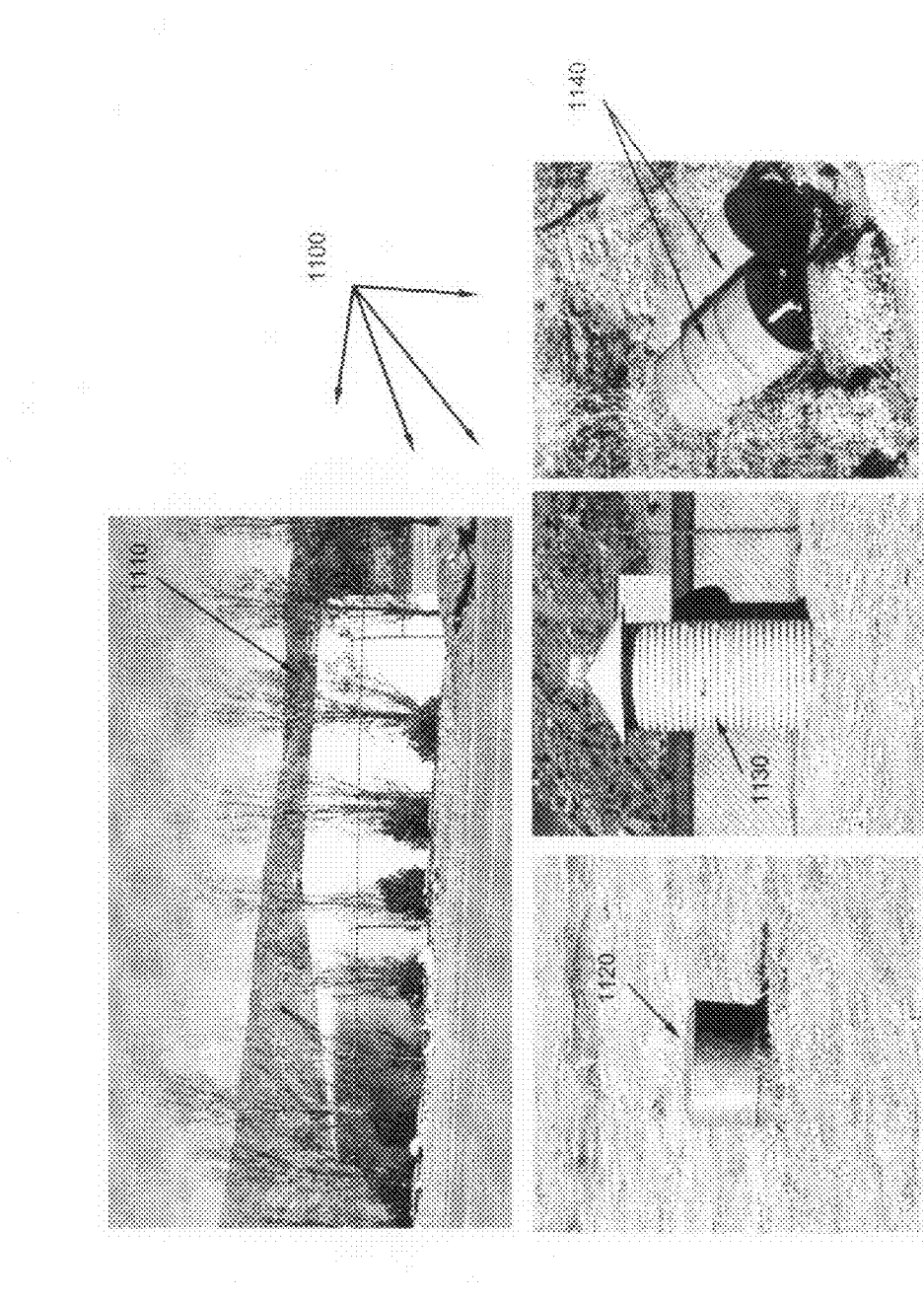

POLARIMETRIC SYNTHETIC APERTURE RADAR SIGNATURE DETECTOR

CROSS REFERENCE TO RELATED APPLICATION

Pursuant to 35 U.S.C. §119, the benefit of priority from provisional application 60/925,906, with a filing date of Apr. 16, 2007, is claimed for this non-provisional application.

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to polarimetric synthetic aperture radar (SAR). In particular, this invention enables accurate detection and monitoring of objects with specific sizes and shapes across a wide area imaged by a polarimetric SAR platform.

SAR is a coherent, microwave imaging radar system with day, night and all-weather capabilities. SAR systems provide high resolution imagery over wide areas under conditions of poor visibility, which make them useful in target detection, tracking and monitoring applications. SAR systems can collect data in three modes: strip-map mode (i.e., antenna pointed in a fixed direction relative to the flight path), spotlight mode (i.e., antenna maneuvered during data collection to radiate only a desired area of terrain), or scan mode (i.e., antenna maneuvered during data collection to radiate a desired swath at any arbitrary angle relative to the flight path). Also, SAR systems can be used in the interferometric mode to obtain high resolution digital terrain elevation information over the imaged area. SAR systems can be installed on airborne and/or satellite platforms.

A polarimetric SAR system transmits and receives pulses with both horizontal & vertical polarizations. Polarimetric SAR imagery consists of two, three or four independent channels of complex data (amplitude plus phase) consisting of HH (Horizontal transmit, Horizontal receive), HV (Horizontal transmit, Vertical receive), VV (Vertical transmit, Vertical receive), and VH (Vertical transmit, Horizontal receive). For a fully polarimetric or quad-polarization SAR system (four channels), all four combinations HH, HV, VV and VH are employed. In the case of three channels, either VH or HV is dropped. Two channel systems exist where there is one transmit polarization and dual receive channels (HH and HV combination or VV and VH combination). The complex, 2×2 polarimetric scattering matrix of each individual source of radiation scatter (or "scatterer") is represented by the returns from all four channels HH, HV, VH, VV. The scatterer response is reciprocal if and only if the condition HV=VH holds.

One conventional method for utilizing the extra information in polarimetric SAR produces a false color image in which each pixel has a red-green-blue (rgb) value based on the HH, HV, and VV amplitudes at that pixel. This method ignores the phase information contained in the polarimetric SAR data and has some limited utility in classifying ground cover over large areas. The typical approach to exploiting the polarimetric SAR data applies a decomposition transformation to the three or four complex (i.e., real plus imaginary) numbers associated with each pixel in the complex SAR image(s). Standard decompositions include Huynen, Freeman-Durdin, Cameron, Touzi, Krograger and Cloude, used by the technical community with proponents for each. These apply a non-linear transformation to the complex numbers associated with a pixel and classifying the result as one of a small number of basic scattering center types. For example, the Cameron decomposition classifies all symmetric scatterers (i.e., scatterers that have an axis of symmetry in the plane orthogonal to the radar's line of sight) as either trihedral, dihedral, cylinder, narrow diplane, dipole; or quarter wave.

For all of the standard decomposition approaches, each pixel gets classified as one of the scattering types defined by the decomposition used. However, no conventional mechanism is available to determine the validity of the classification. In most cases, there are multiple scattering centers in the resolution cell (e.g., pixel), and the classification is performed based on the combined return from the multiple scattering centers irrespective of the actual shape of any of the scattering centers in the resolution cell/pixel. This in turn leads to an unacceptably high false alarm rate when trying to detect any specific objects.

Independent of polarimetric SAR, a well known technique is to convert a full resolution SAR image into a sequence of lower resolution sub-aperture images that can be displayed as a short movie loop. This sequence looping has provides a visual cue to stationary scattering centers as well as speckle phenomena and non-stationary scattering centers. This has significantly aided manual analysis of single polarization SAR images, but has not resulted in any significant automated analysis methods to date. Sub-apertures can be formed in either the "fast time" (swath-range) or "slow time" (cross-range, azimuth) dimensions. Another well known technique incoherently averages sub-aperture images (for a single polarization) to produce a "multi-look" image having reduced speckle (i.e., the graininess associated with SAR imagery).

SUMMARY

Conventional target identification techniques using SAR images yield disadvantages addressed by various exemplary embodiments of the present invention. In particular, various exemplary embodiments provide procedures for identifying a candidate pixel in a polarimetric SAR image composed of pixels for a region that correlates to a target representation.

Various exemplary embodiments extract N sub-apertures from the polarimetric SAR image, derive J parameter components from each sub-aperture, obtain acquired values for that sub-aperture from select parameter components, acquire reference values that characterize the parameter components for the target representation, determine distance values between the reference and acquired values, combine the distance values d for the sub-apertures together to obtain distance summations, compare the distance summations against a classification criterion to determine whether the candidate pixel conforms to the target representation or target signature.

Distance values d may be determined by subtracting reference values from their respective acquired values, adjusting the resulting differences D to fall in the range [0,1] in response to the difference having a specified relation to parameter thresholds, and finally computing the natural logs of unity minus each difference, i.e., ln (1−D). The process may further multiply the distance summations $\Sigma d$ with their corresponding weighting factors w to obtain weighted results and combine these to produce a weighted log-likelihood function $L_T$ that identifies whether the pixel conforms to the target.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which:

FIG. 1A is a cross-range or azimuth view for a typical airborne SAR platform in the strip-map data collection mode;

FIG. 1B is a lateral elevation or slant-range view for a typical airborne SAR platform in the strip-map data collection mode;

FIG. 9 is an isometric view of an ideal dihedral;

FIG. 10 is an isometric view of a dipole visualization of an ideal dihedral;

FIG. 11 is a photographic collection of cylindrical shapes that in combination with the ground plane produced dihedral responses;

DETAILED DESCRIPTION

Figure 2:
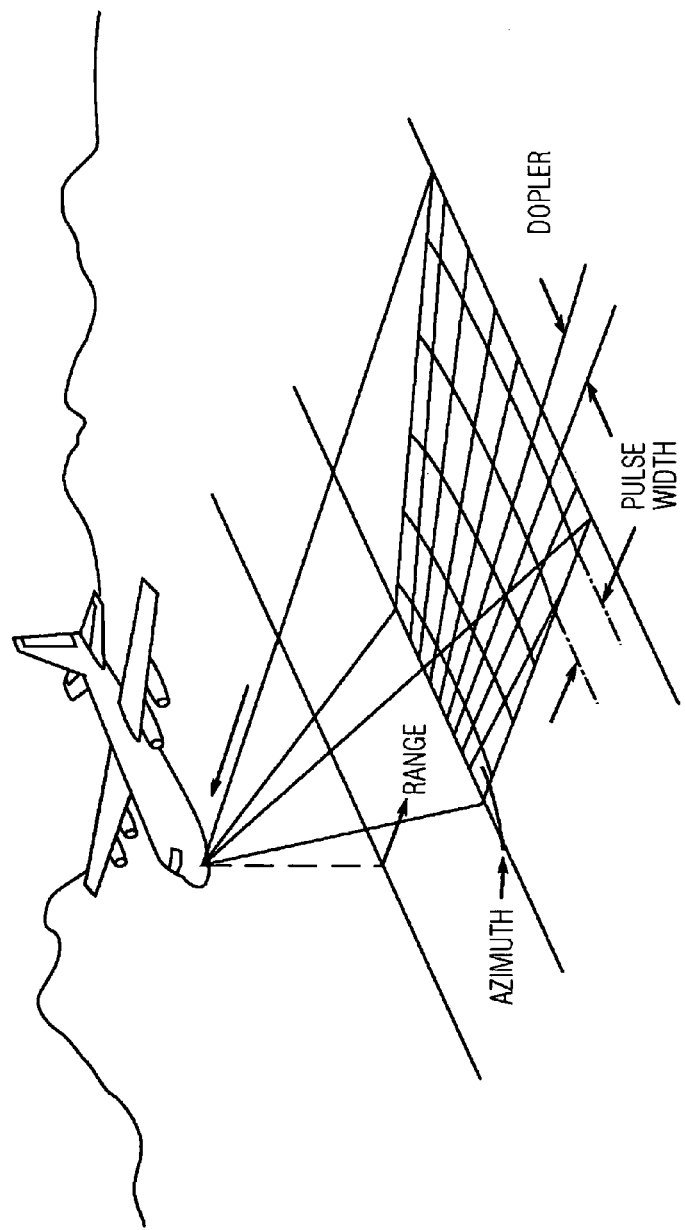
FIG. 2 is an isometric slant-range and cross-range view for a typical SAR platform in the strip-map data collection mode.

In the following detailed description of exemplary embodiments of various exemplary embodiments, reference is made to the accompanying drawings that form a part hereof, and in which is shown by way of illustration specific exemplary embodiments in which various exemplary embodiments may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Various exemplary embodiments provide capability to detect and monitor objects with specific sizes and shapes in polarimetric Synthetic Aperture Radar (SAR) imagery. This enables screening of large geographic areas for specific objects of interest and monitoring the presence of those objects over time. Various exemplary embodiments provide an enhanced detection capability while simultaneously reducing the false alarm rate by many orders of magnitude. Whereas the conventional techniques allow the classification of scattering centers by shape, exemplary embodiments estimate the size as well as the shape of these scatterers.

I. SAR Description: Beginning with a simplified description of SAR data collection geometry, the examples described herein relate to an airborne SAR system. FIGS. 1A and 1B show cross-range (or travel direction) 100 and slant-range (or lateral) 110 views, respectively, of the exemplary airborne configuration with a side-looking SAR-equipped platform (e.g., aircraft) 120 collecting data over a terrain (e.g., ground)

130 in the strip-map mode. FIG. 1A shows the cross-range or azimuth viewing angles 140a and 140b as the SAR platform 120 travels forward from first to second positions 145a to 145b, the distance traveled forming a synthetic aperture (i.e., length) 150. Intersection of the either viewing angle 140a or 140b (sometimes referred to as antenna beam width) with the ground 130 yields the cross-range or azimuth extent 160 along the ground 130. The synthetic aperture 150 corresponds to the distance the SAR platform 120 covers during the period in which a target (or scatterer) 170 can be observed from the forward extent of the azimuth view angle 140a on the platform's approach to the aft extent of the azimuth view angle 140b upon its departure. This longer synthetic aperture 150 enables the SAR to achieve a much finer cross-range resolution than is available from a smaller physical antenna.

FIG. 1B shows the slant-range viewing angle 180 between the near slant-range (i.e., the slant-range line which forms the smallest angle with the perpendicular line between the airborne platform 120 and ground 130 or nadir) and the far-slant range (i.e., the slant-range line which forms the largest angle with nadir). The swath-width 190 corresponds to the lateral extent along the ground 130 covered by the slant-range viewing angle 180. Typically, SAR produces a two-dimensional image, with the two dimensions cross-range (or azimuth) and slant-range being perpendicular to each other. FIG. 2 shows a perspective view (from Sandia) of the airborne SAR system in the strip-map data collection mode.

SAR determines slant-range from the platform 120 to the target 170 by measuring the round-trip-time from a first event when the platform 120 transmits a pulse to the target 170 to a second event when the pulse returns from the target 170 back to the platform 120 (i.e., the round trip pulse propagation time). As with other types of radar systems, the SAR range resolution is a function of the transmitted pulse width. A balancing trade-off may be considered and implemented between achieving finer range resolution by transmitting a shorter duration pulse and a high signal-to-noise (SNR) ratio (for enhancing target detectability) by transmitting a longer duration pulse. A matched filter' receiver with a proper transmit waveform (e.g., chirped pulse) enables both high range resolution and high SNR to be achieved by employing pulse compression techniques to decouple range resolution from the transmitted pulse length. For this case, the range resolution only depends on the frequency bandwidth of the transmitted pulse, making possible the use of longer duration, higher energy pulses to achieve high SNR, while achieving finer range resolution by increasing the frequency bandwidth.

SAR system may be distinguished from other radar systems by SAR's ability to accomplish much finer cross-range or azimuth resolution. Fine azimuth resolution with a physical antenna necessitates extending antenna length in the azimuth direction to often impractical dimensions. The SAR system synthesizes a large antenna length in the azimuth direction by moving the platform 120 with respect to the target 170. The along-track motion (or flight-path trajectory) of the platform 120, combined with a relatively large antenna beam-width, can record a large number of radar returns from each target 170 on the ground 130 while passing through the antenna aperture on the platform 120. The large synthetic aperture 150 thus forms along the platform's trajectory, whose length is determined by the along track separation of the points at which the target 170 may be acquired and then lost.

Targets at different azimuth positions produce echoes or returns at different Doppler frequencies. Just as the measured round-trip time of the pulse traveling from the platform 120 to the target 170 and back determines the target's position in the slant-range direction, the Doppler frequency shift of the returned signal determines the cross-range or azimuth position of the target 170. As the target 170 passes through the synthetic aperture 150, the large number of radar returns from each target 170 on the ground 130 are collected by coherent (in phase and in quadrature) demodulation to preserve their relative phases. These returns may be processed into an image by individually adjusting their phases and adding them coherently in a fashion mathematically similar to that used to focus data from an array antenna. This process may produce a two-dimensional (i.e., slant-range and azimuth) SAR image, consisting of pixels having values with complex quantities to denote both magnitude and phase.

Figures 3A, 3B, 3C:
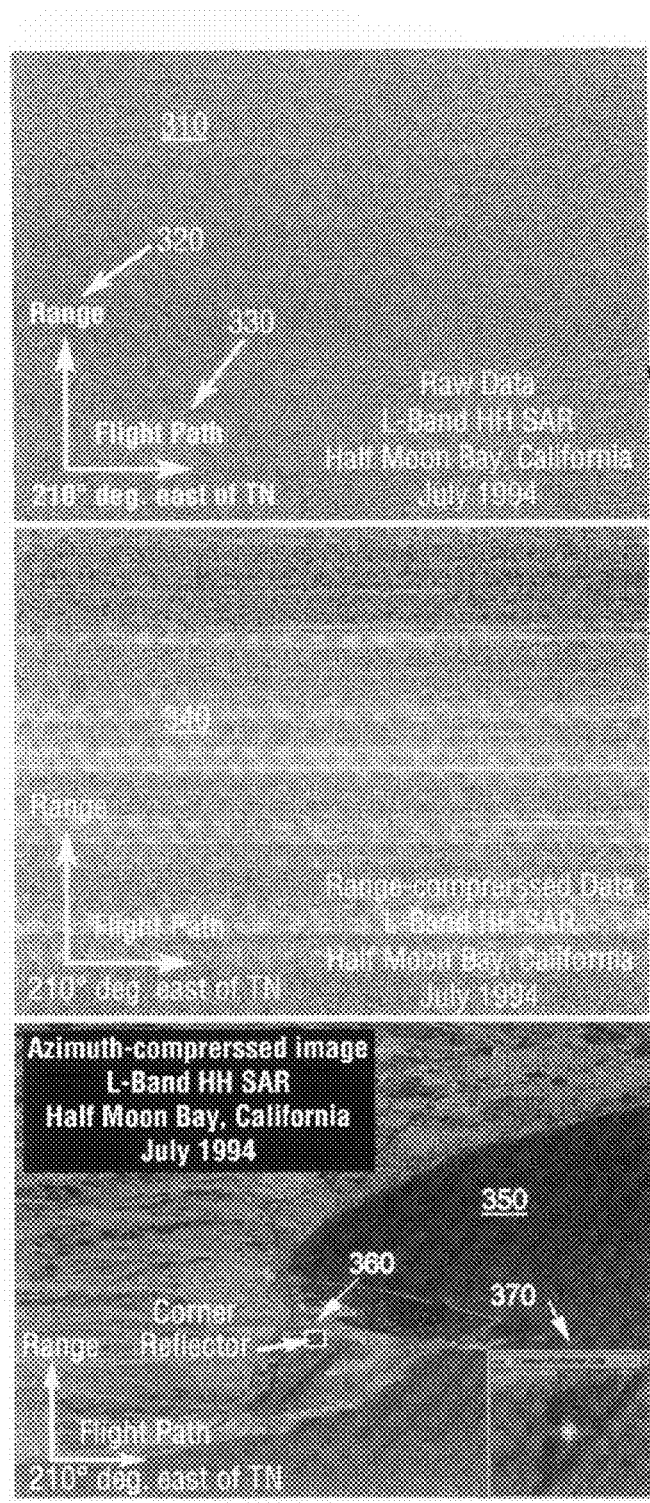
FIG. 3A is a raw SAR image of Half Moon Bay, Calif.
FIG. 3B is the corresponding range compressed SAR image.
FIG. 3C is the corresponding range and azimuth compressed SAR image.

II. SAR Image Processing: FIGS. 3A through 3C show images relating to the transformation of SAR raw data to a resolvable (i.e., viewable) image. These images were collected in July 1994 over Half Moon Bay, Calif., by the NASA/JPL airborne Synthetic Aperture Radar system, AIRSAR. FIGS. 3A through 3C show complex (i.e., amplitude and phase) L-band HH SAR images 300 under progressive processing. FIG. 3A shows an intensity image 310 for raw SAR data with orthogonal image axis vectors slant-range 320 and cross-range (or azimuth or flight path in this case) 330. The results of the two main stages of SAR raw data processing, namely range compression and azimuth compression, are shown in FIGS. 3B and 3C. The slant-range 320 and azimuth 330 directions are also shown in these figures. FIG. 3B shows an intensity image 340 produced by range compression of the complex SAR raw data. FIG. 3C shows an intensity image 350 with additional azimuth compression of the complex range-compressed SAR data. An outlined rectangle 360 is highlighted as enlarged in corner image 370 to provide detail of the pixel return from an 8-ft triangular trihedral corner reflector placed at the Half Moon Bay airport as a calibration device.

Other stages in raw data processing may also be introduced for motion compensation and auto focusing, which improve the quality of processed images by removing blurring due to motion and other effects. The output of a full-aperture SAR raw data processor may be a complex SAR image, generally referred to as the Single-Look Complex (SLC) image. The next step after processing the data in all four polarimetric channels (i.e., HH, HV, VH and VV) into SLCs may be to accurately register them and then perform polarimetric calibration (i.e., phase calibration, cross-talk removal, amplitude calibration and channel gain imbalance correction) to correct for instrumentally induced errors in the phase and amplitude relationships between the polarization channels. Accurate polarimetric registration and calibration is essential in ensuring that the results of polarimetric decomposition reflect the true nature of the scattering target or scatterer.

III. Cameron Polarimetric Decomposition and Classification: Polarimetric SAR data may be transformed or decomposed into a new set of observable variables by a variety of techniques. Cameron Coherent Decomposition represents an example of such pixel element transformation to generate a set of observable variables. See W. L. Cameron, N. N. Youssef and L. K. Leung, "Simulated Polarimetric Signatures of Primitive Geometrical Shapes", *IEEE Trans. On Geoscience and Remote Sensing*, vol. 34, no. 3, pp. 793-803, May 1996. This reference coherently decomposes an arbitrary complex scattering matrix into three mutually orthogonal components, consisting of a nonreciprocal component, a maximum symmetric component, and a minimum symmetric component. Each Cameron decomposition component has representative parameters that are related to the physical properties of the target (e.g., scatterer type, target orientation), thereby providing an advantage. The Cameron decomposition parameters considered in this approach include the Symmetric Scatterer Type (denoted by z), Maximum Symmetric Normalized Amplitude (denoted by a), Symmetry Angle (denoted by "tau" or $\tau$), Reciprocity Angle (denoted by "theta" or $\theta$) and Symmetry Weight (denoted by s).

The Cameron polarimetric classification technique classifies a symmetric scatterer (i.e., a scatterer that has an axis of symmetry in the plane orthogonal to the radar's line of sight) as either trihedral, dihedral, cylinder, narrow diplane, dipole, or quarter wave depending on where its scatterer type value falls within the complex (i.e., real and imaginary axes) Unit Disc representing the Symmetric Scatterer Space. In this classification scheme, the complex Unit Disc is divided into six distinct sub-regions, with each region representing the six elementary shapes: trihedral, cylinder, dipole, narrow diplane, dihedral and quarter-wave device. A trihedral return (or a return signal resulting from an odd number of "bounces") prevails in the natural world and therefore not indicative of an artificial (i.e., man-made) target artifact. Trihedral corner reflectors (three orthogonal plates connected along common edges), flat plates, and spheres are common examples of objects that produce trihedral returns.

The ideal trihedral return is represented by the complex scatterer type (+1, 0) in the complex Unit Disc. A dihedral return (or a return signal resulting from an even number of "bounces") is the more prevalent return from artificial objects. An example of a dihedral shape is an object with two relatively flat surfaces of comparable size sharing a single edge at a 90° angle. The ideal dihedral return is represented by the complex scatterer type (−1, 0) in the complex Unit Disc. A cylinder return, representative of curved surfaces, resembles a trihedral return but weaker in either the HH or VV component of its return. Similarly, a narrow-diplane return resembles a dihedral return but weaker in one its component directions. An example of a narrow-diplane shape is a dihedral object whose component plates have a smaller width than length (or vice versa). The ideal cylinder and ideal narrow-diplane returns are represented by the scatterer type values (+½, 0) and (−½, 0) in the complex Unit Disc, respectively. An ideal dipole, represented by the scatterer type (0, 0), has a return in only one direction, either HH or VV but not both. A quarter-wave device has a return characterized by a delay (represented by a phase shift) between its HH and VV components. The ideal quarter-wave device return is represented by two equivalent scatterer types (0, +i) and (0, −i) in the complex Unit Disc (where $i=\sqrt{-1}$). An example of a quarter-wave device is a pipe mounted perpendicular to a flat plate.

IV. Deconstruction Approach: The process operations for generating Single-Look Complex (SLC) imagery, subdividing these images into sub-aperture data, deconstructing the information into characteristic features, and performing signature analysis are described in FIGS. 4 through 8 and supplemental steps that follow. Processing the complex-valued SAR image (or the SLC), in various exemplary embodiments yields a set of sub-aperture complex images using conventional SAR processing techniques. Each sub-aperture image has lower resolution than the original and corresponds to a different view angle and/or frequency range in the chirped pulse. The target resolution of each sub-aperture image corresponds to the size of the scattering center for screening. Excess bandwidth is transformed into more sub-apertures rather than used for higher resolution. This ensures maximum signal to clutter for the targeted scattering centers.

Figure 4:
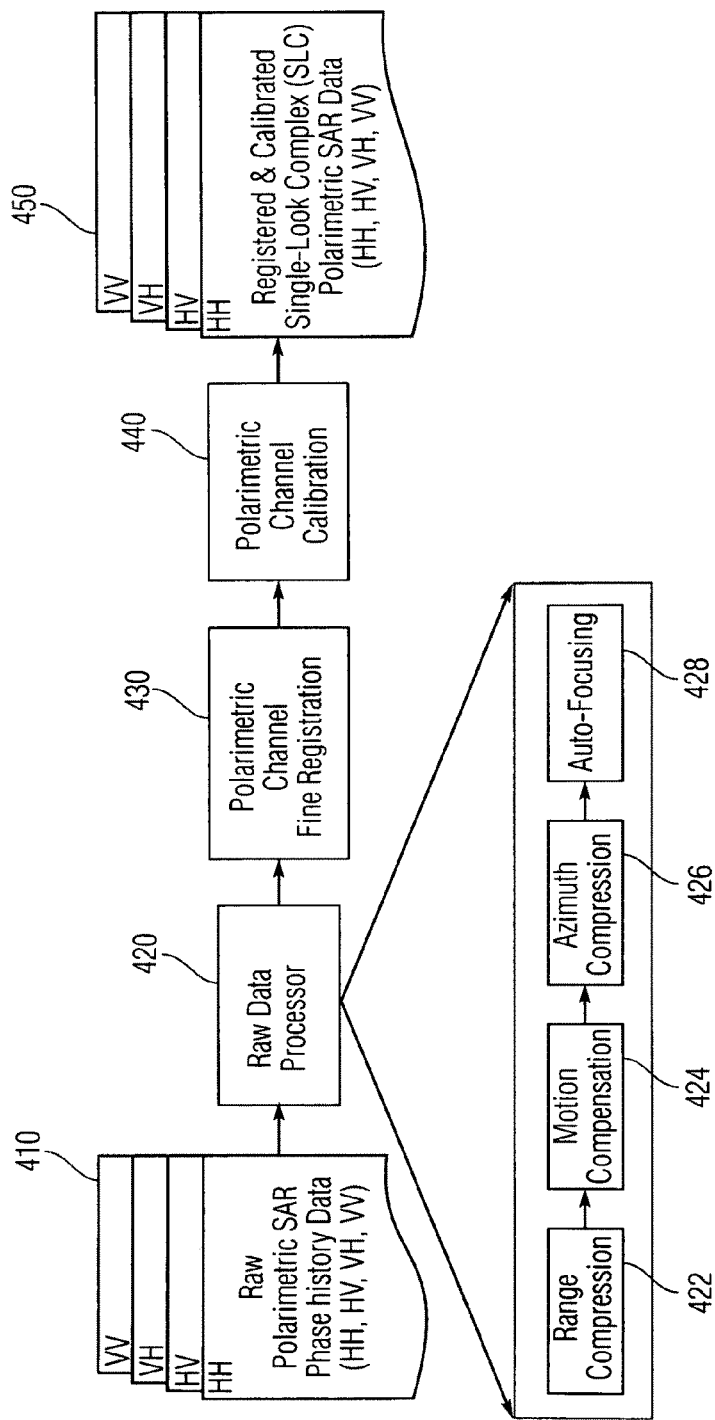
FIG. 4 is a flowchart of Polarimetric SAR Raw Data Processing.

FIG. 4 provides a flowchart diagram 400 showing steps for processing polarimetric SAR raw phase history data 410 into registered and calibrated polarimetric images. A Raw Data Processor 420 may receive the raw data 410 (for each channel HH, HV, VH or VV). The Raw Data Processor 420 includes sub-processors for sequential range compression 422, motion compression 424, azimuth compression 426 and auto-focusing 428. Range and azimuth compression represent two important image formation operations in processing SAR data. Range compression 422 convolves radar return signals with a range matched filter generated from a replica of the transmitted waveform and applied to each range line. Similarly, azimuth compression 426 convolves each range-compressed azimuth line with an azimuth matched, filter or reference function to generate a processed SAR image. Motion compensation 424 removes the blurring caused by the non-linear motion of the platform 120, while auto-focusing 428 removes additional blurring caused by other sources (e.g., inaccurate à priori values for the slant-range to near swath, and non-linearity of the true phase response of the system in cross-range). A Polarimetric Channel Fine Registration Processor 430 receives the resulting processed SAR data from the Raw Data Processor 420. A Polarimetric Channel Calibration Processor 440 then receives the registered images from Registration Processor 430 to produce registered and calibrated SLC polarimetric SAR images 450. In polarimetric SAR processing, reliable results at high accuracy can be ensured after completion of standard imaging formation operations by registering and calibrating the polarization channels with respect to each other. The registration of the polarimetric channels preferably has sub-pixel accuracy at least ¹⁄₁₆ of a pixel.

Polarimetric calibration effectively estimates and removes the effect of each polarimetric channel relative to others and involves phase calibration, cross-talk removal, amplitude calibration and channel-gain-imbalance correction. Phase calibration corrects for instrument-induced errors in the phase relationships between the channels. Cross-talk may be caused by imperfections in the radar antenna, resulting in impure polarization states for the individual polarization combinations measured directly by the hardware. Amplitude calibration and channel-gain-imbalance correction are performed using backscatter measurements from known targets to correct for residual amplitude offsets in the various polarization channels and to correct for absolute gain of the radar system.

Figure 5:
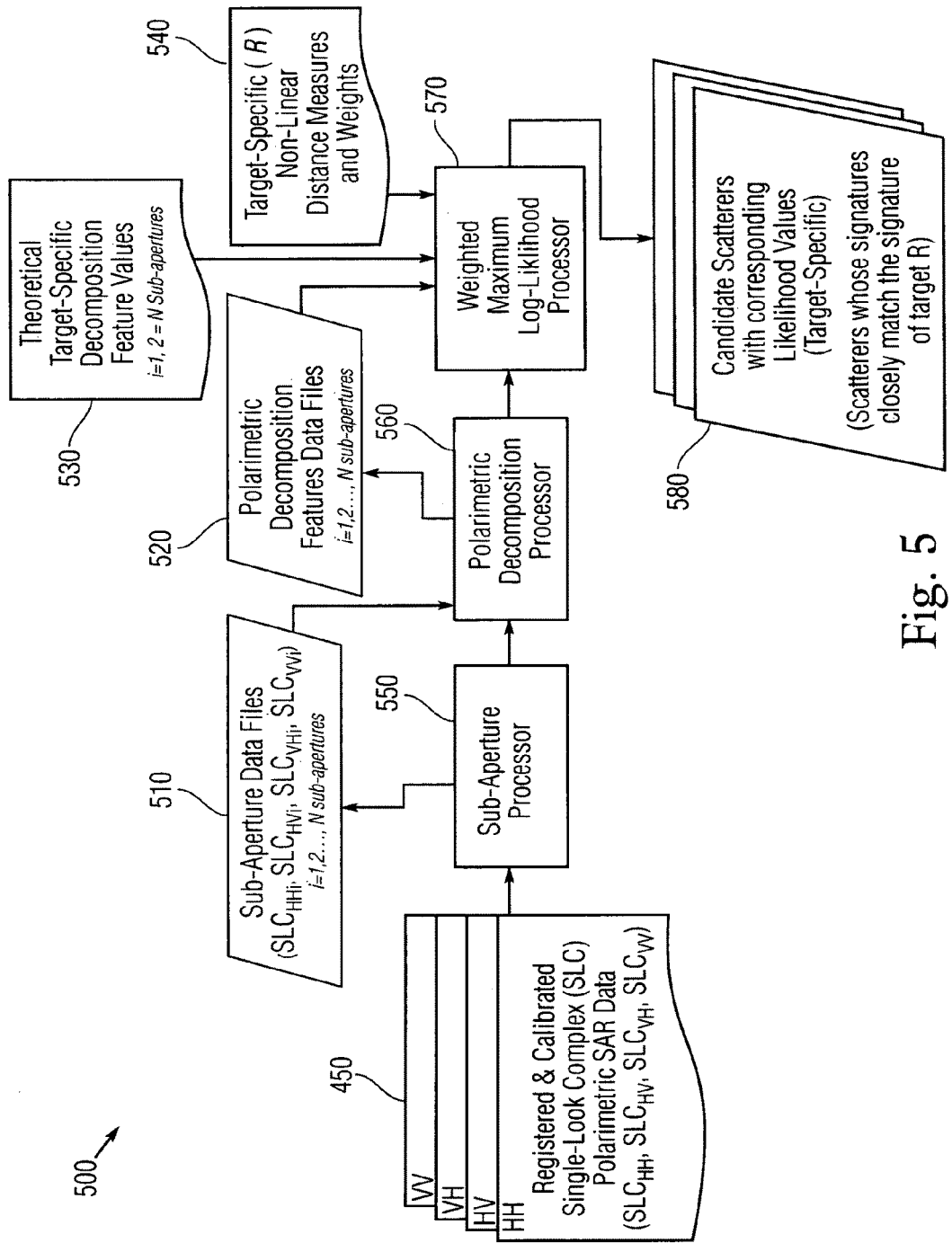
FIG. 5 is a flowchart of Polarimetric SAR Signature Processing.

FIG. 5 provides a flowchart diagram 500 showing signature processing operations. Supplemental data files for selecting pixel returns having strong resemblance to target characteristics include: Sub-Aperture Data Files 510, Polarimetric Decomposition Features Data Files 520, Theoretical Target-Specific Decomposition Feature Values 530 and Target-Specific Non-Linear Distance and Measures and Weights 540 (referred to subsequently as Auxiliary Data). For each SAR data channel (HH, HV, VH, VV), a series of sub-apertures i=1, 2, . . . , N may be introduced. (Note that i denotes sub-aperture counters for this discussion, rather than the imaginary number.)

After the formation of the registered and calibrated SLC images 450, a Sub-Aperture Processor 550 (shown in greater detail in FIG. 6) creates sub-aperture complex images for each polarimetric channel using conventional SAR processing techniques. A Polarimetric Decomposition Processor 560 (shown in greater detail in FIG. 7) receives the sub-aperture SLC data to generate a set of independent observables or features for each sub-aperture (derived from the measurement SAR data): A Weighted Maximum Log-Likelihood Processor 570 (shown in greater detail in FIG. 8) receives the independent observables set, together with the expected (target specific theoretical) observable values 530 and their respective non-linear distance measure definitions and weights 540. The Log-Likelihood Processor 570 generates a matrix of Candidate Scatterers 580 (corresponding to pixel positions in the SAR image) along with their likelihood values. Each identified scatterer denotes a target-candidate to be further investigated. Scatterers having likelihood values below a pre-determined threshold can then be discarded, while scatterers with higher likelihood values (i.e., those whose signatures approach the signature of the theoretical target of interest) can be retained for further analysis.

Figure 6:
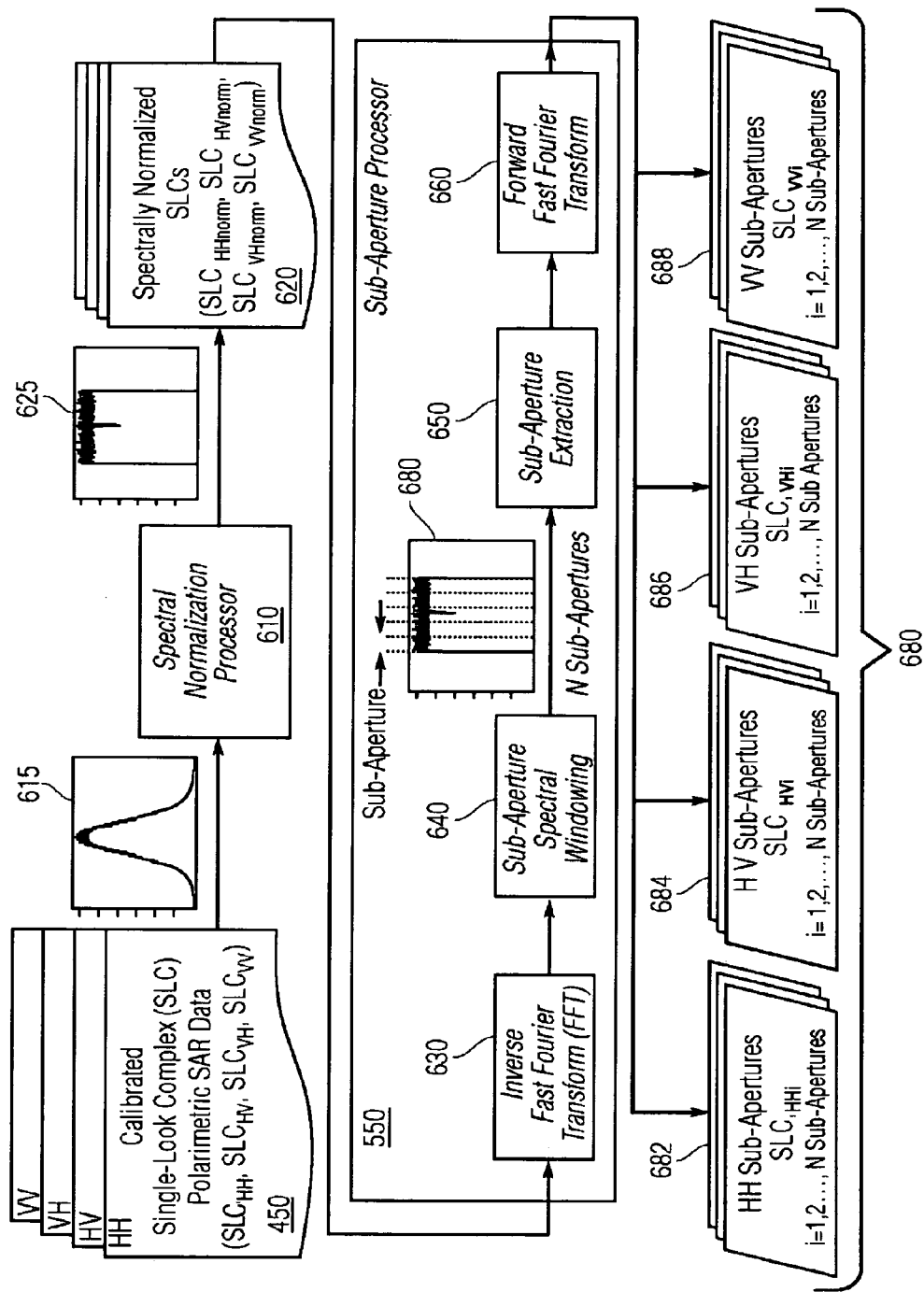
FIG. 6 is a flowchart of Sub-Aperture Processing.

FIG. 6 provides a flowchart diagram 600 showing the Sub-Aperture Process, which involves spectral normalization and sub-aperture extraction for each polarimetric channel. A Spectral Normalization Processor 610 receives calibrated SLC data 450 from any of the four polarimetric channels—$SLC_{HH}$, $SLC_{HV}$, $SLC_{VH}$ and $SLC_{VV}$—the original spectrum of each SLC channel resembling a Gaussian curve 615. The Spectral Normalization Processor 610 transforms the channel signals into spectrally normalized SLC data 620—$SLC_{HH,norm}$, $SLC_{HV,norm}$, $SLC_{VH,norm}$ and $SLC_{VV,norm}$—the spectrum of each resembling a square wave 625. The Sub-Aperture Generation Processor 550 receives the spectrally normalized SLC data 620 and performs the following four operations on each of the four input SLCs: (1) inverse Fast Fourier Transform (FFT) SLC data 630, (2) apply spectral windowing 640 to divide spectrum into N segments 645 (non-ovelapping or overlapping), (3) extract the N sub-apertures from the inverse FFT-ed SLC data 650, and finally (4) forward FFT the N extracted sub-apertures 660. The output files 680 are then N complex SLC sub-apertures for each polarization channel HH 682, HV 684, VH 686 and VV 688.

Various exemplary embodiments use the processed polarimetric (complex valued) SAR imagery and one of the polarimetric SAR decompositions as a starting point. Each of the decompositions results in a transformation from the complex numbers associated with a pixel (i.e.; the pixel's four, complex-valued scattering matrix elements represented by $SLC_{HH}$, $SLC_{HV}$, $SLC_{HH}$, $SLC_{VV}$) to a new set of variables. Each of these variables is considered to be an independent observable. The approach can utilize any of the polarimetric scattering matrix decomposition techniques to generate a set of physically meaningful and independent parameters/observables to use in subsequent stages.

Figure 7:
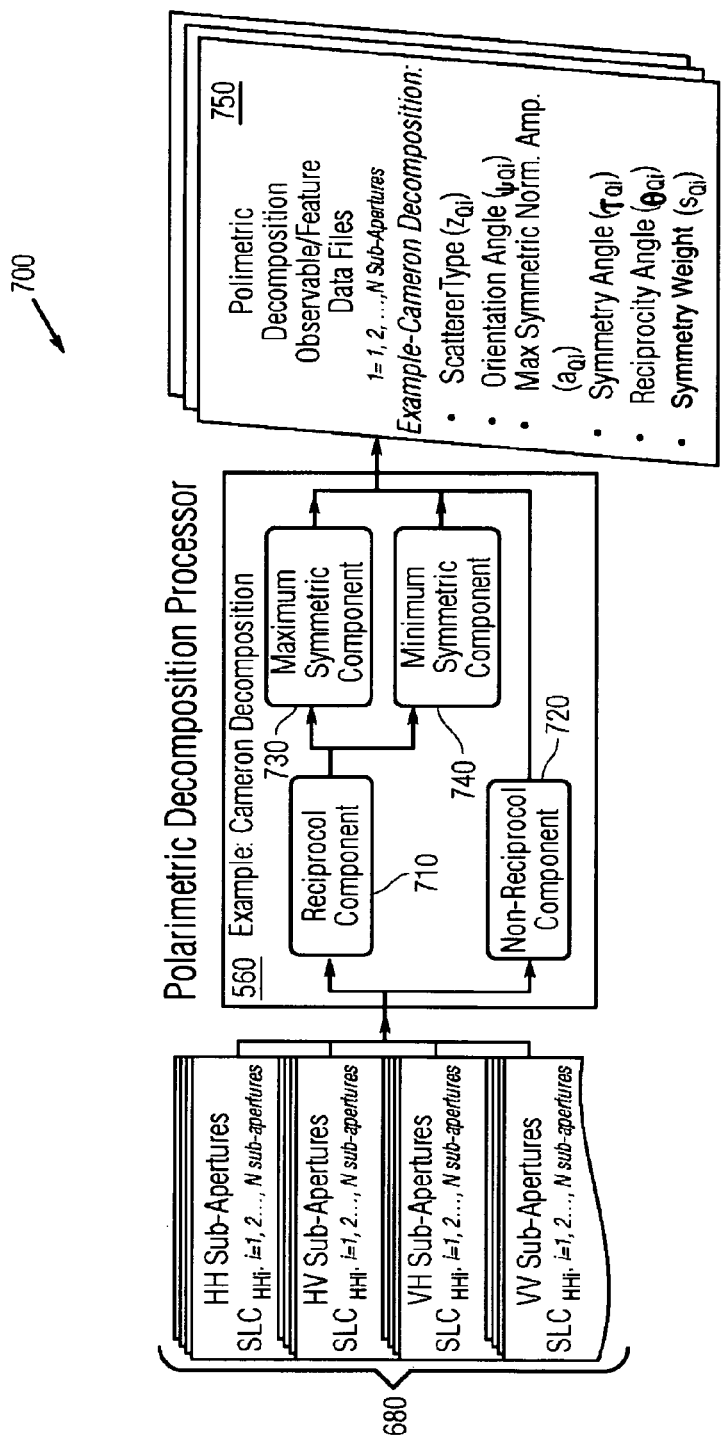
FIG. 7 is a flowchart of Decomposition Processing.

FIG. 7 provides a flowchart 700 showing a Polarimetric Scattering Matrix Decomposition Processor based on, for example, the Cameron Coherent Decomposition technique, discussed previously in Section III in greater detail. The Polarimetric Decomposition Processor 560 receives the Sub-Aperture data 680 that include the N sub-aperture SLC images formed by the Sub-Aperture Generation Processor 550 shown in FIG. 6, for each polarization HH 682, HV 684, VH 686 and VV 688. The Decomposition Processor 560 first decomposes the sub-aperture scattering matrix data for each pixel (i.e., $SLC_{HHi}$, $SLC_{HVi}$, $SLC_{VHi}$; for i=1, 2, ..., N) into Reciprocal and Non-Reciprocal Components 710, 720 and then further decomposes the Reciprocal component 710 into Maximum Symmetric and Minimum Symmetric Components 730, 740.

The Decomposition Processor 560 generates a set of Measured Polarimetric SAR Decomposition Data files 750, each containing values for a specific decomposition parameter for all N sub-apertures. The set of (in this example, six) independent observables (or decomposition parameters) derived for each sub-aperture i=1, 2, ..., N may include: the complex-valued (real and imaginary) Symmetric Scatterer Type $z_i$, Orientation Angle $\psi_i$, Maximum Symmetric Normalized Amplitude $a_i$, Symmetric Angle $\tau_i$, Reciprocity Angle $\theta_i$ and Symmetry Weight $s_i$ preferably saved in separate files.

Figure 8:
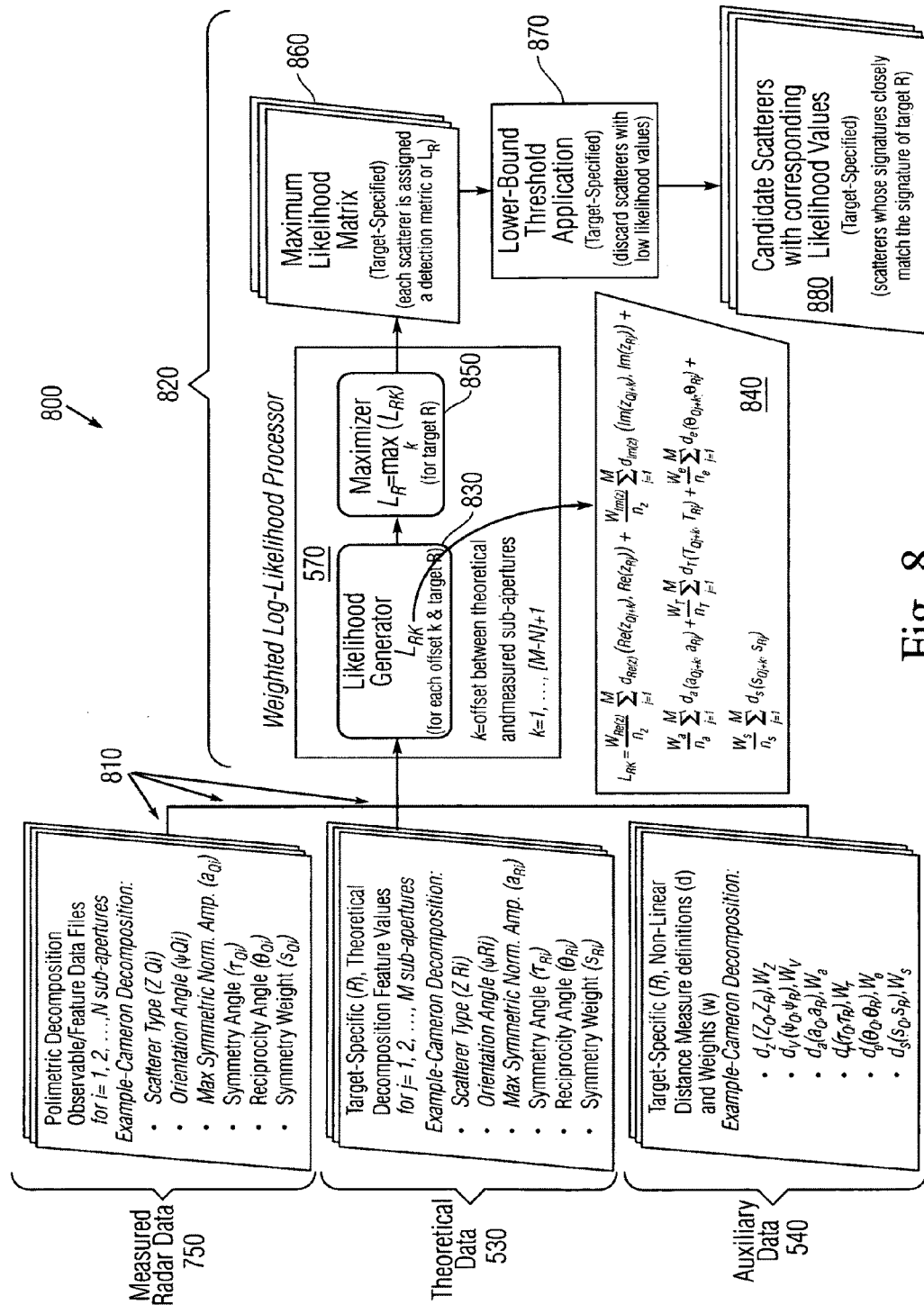
FIG. 8 is a flowchart of Weighted Log-Likelihood Processing.

FIG. 8 provides a flowchart diagram 800 showing the Weighted Log-Likelihood Process. The three input data sets 810 to the Signature Analysis and Likelihood Detection Processor 570 include: (1) Measured Polarimetric SAR Decomposition Data files 750—composed of decomposition files (six, for this example) generated by the Polarimetric Decomposition Processor 560 shown in FIG. 7, with each data file containing i=1, 2, ..., N sub-aperture response values for a specific decomposition parameter; (2) Theoretical Data files 530—"target-specific" decomposition files corresponding to the Measured decomposition files 750, with each data file containing the given target's theoretical or expected responses for a specific decomposition parameter for j=1, 2, ... M sub-apertures; and (3) the Auxiliary Data 540—target-specific, non-linear distance measure definitions d and weights w determined from both theoretical and experimental sources. The target or scattering center response models (or signatures) used to populate the Theoretical Data files 530 are based on the target's theoretical scattering matrix responses as functions of target size and orientation.

For each scatterer in the SAR image, a Signature Analysis and Likelihood Detection Process 820 compares measured data and theoretical target-specific data in the input set 810 to generate a likelihood value indicative of resemblance between the analyzed pixel and the specific target of interest. The first step in this Process 820 uses the Weighted Log-Likelihood Processor 570 to generate target-specific detection metrics or likelihood values for each scatterer in the SAR image. The weighted Log-Likelihood Processor 570 includes a Likelihood Generator 830, which determines a likelihood function value 840, and a Maximizing Processor 850 to determine the pixel having the maximum likelihood value.

The Likelihood Generator 830 receives the Measured Radar Data 750, Theoretical Data 530 and Auxiliary Data 540 as inputs and calculates a target-specific weighted log-likelihood $L_{Rk}$ for each offset k between theoretical and measured sub-apertures. The Maximizer 850 then selects the maximum among all likelihoods (associated with the k offsets) calculated for each scatterer and outputs the result into a Maximum Likelihood. Matrix 860 as the scatterer's target-specific Detection Metric or $L_R$. A target-specific threshold operator 870 can subsequently be applied as detection threshold to discard all scatterers with unacceptably low likelihood values. The remaining "Detected" or "Candidate" Scatterers with their corresponding Target-Specific Likelihood Values 880 then provide the basis for detecting and discriminating the size and/or shape of the object or target of interest.

V. Signature Determination: Each of the decomposition observables for each of the sub-apertures may be treated as an independent observation. Depending on the amount of overlap of the sub-apertures, this may not be strictly true but nonetheless represents a useful statistical assumption. The signature consists of a weighted log-likelihood computation where the likelihood for each observation is based on the observed variable's distance from the theoretical response for the target scattering center type. The distance in each case is a nonlinear function whose parameters are determined through the use of acquired data in order to account for the operational performance of the sensor. Weights (i.e., weighting factors) for the weighted log-likelihood may be determined by the relative importance of the observables.

For the distance function, the computed distance imposes a zero difference between the theoretical value of the observable and the expected departure from that value due to system noise and collateral (i.e., non-target) artifacts. As the difference in values increases, the distance function typically follows in a monotonic fashion. A simple distance function that satisfies these requirements is called a nonlinear ramp function. For each pixel, the weighted log-likelihood function may be computed for different sub-aperture offsets in order to align the actual response with the theoretical response based on the actual orientation of the scattering center. This enables the response change to be exploited as a function of orientation and produces an estimate of the orientation of the scattering center.

The preference for the offset variable is exemplified by the glint off of a flat plate that occurs for a sensor that is perpendicular thereto. The largest amplitude occurs at broadside and decreases away from broadside in a manner dependent on the size of the plate relative to the wavelength of the radiation used. In a SAR image, the aperture can be anything from a few degrees to more than 45° or ¼π. The orientation of the plate (or more generally the scattering center) may not be known à priori, so multiple offsets may have to be implemented corresponding to different angles away from the aperture center for where the response peaks.

The resultant log-likelihood can be compared to a detection threshold to provide simple detections, or the log-likelihood values can be retained to provide a ranking of detections in a Constant False Alarm Rate (CFAR) application. For a given scattering center type, signatures may be applied based on variations in size and shape, thereby providing a viable means to discriminate both the size and shape of an object of interest. The various decompositions provide features that form the basis for discriminating shape, while the amplitude falloff provides the basis for discriminating the size of a particular shape. This approach also enables a new type of change detection to be performed. Because the orientation of detected scattering centers may be determined, subsequent SAR collections taken from different geometries can be processed and the resultant signature detections can be compared. This type of change detection has much less stringent collection conditions than Coherent Change Detection (CCD) or Two Color Multi-View.

VI. Summary of Advantages: The advantages from the various exemplary embodiments described herein include the following:

(a) Use of sub-aperture images (in both slow time and fast time) in conjunction with polarimetric decompositions.
(b) Sizing the resolution of the sub-apertures to roughly match the dimensions of the target of interest
(c) Use of normalized amplitude observables (normalized across the sub-apertures) to make the results independent of absolute amplitude.
(d) Treatment of each decomposition variable from each sub-aperture as an independent variable.
(e) Use of a weighted log-likelihood formulation to compute a detection likelihood for each signature at each pixel.
(f) Use of theoretical signatures as a basis to provide size dependent signature detection.
(g) Combined use of theoretical signatures and collected data to determine the parameters for the weighted log-likelihood function.
(h) Capability to perform change detection based on polarimetric signatures.
(i) Providing a viable means for performing detections and classifications of scattering centers in the Mie region (a region where target or scattering center size is on the order of a wavelength in size).

VII. Exemplary Ideal Dihedral Target Representation: Some exemplary results of the approach described herein are presented in this section. The chosen target of interest is a dihedral object or shape that is commonly present in many man-made objects. FIG. 9 shows an isometric Cartesian illustration 900 of a dihedral on a planar surface 910. The dihedral comprises a first plate 920 joined at an edge to a second plate 930, with the edge forming a perpendicular angle 940. The surface 910 is defined by the planar vectors $\hat{x}$ and $\hat{y}$, and a normal vector $\hat{z}$. An edge vector $\hat{a}$ where the plates join is coplanar with the surface 910 and is depicted in this example as parallel to planar vector $\hat{y}$. The first plate 920 is angularly tilted from the surface 910 along a plate vector $\hat{n}$ perpendicular to the edge vector $\hat{a}$. In this example, the first and second plates 920, 930 are tilted from the surface 910 by an angle of 45°. Radar energy 950 may be directed towards the surface 910 and the dihedral plates 920, 930 along a transmission vector $\hat{k}$ (along the negative vertical or $-\hat{z}$ direction). This configuration, referred to as the broadside setup, ensures maximum radar return from the dihedral object. In terms of the radar look angles as specified by the azimuth and elevation angles, the broadside set up in this example has an azimuth angle of 0° (zero) and an elevation angle of 45°. FIG. 10 illustrates an isometric representation 1000 of a dipole visualization of an ideal dihedral. The dihedral can be represented by two dipoles 1010, 1020, separated by a distance $\Delta r = \lambda/4$ 1030. This representation is based decomposing the response from a horizontally oriented symmetric scatterer as a combination of the responses of two non-interacting frequency-independent orthogonal dipoles with variable amplitudes and phases. See W. L. Cameron and Houra Rais, "Conservation Polarimetric Scatterers and their Role in Incorrect Extensions of the Cameron Decomposition", *IEEE Trans. on Geoscience and Remote Sensing*, vol. 44, no. 12, pp. 3506-3516, December 2006. For the ideal dihedral, both the horizontal 1010 and vertical 1020 dipoles produce a unit amplitude response, with their relative phase response modeled as a radial separation 1030 equal to a quarter of the wavelength.

FIG. 11 provides a collection of photographs 1100 featuring the various objects from SAR imagery shown subsequently in FIGS. 13A and 13B. The dihedral return from 1360a was produced by the combination of a half-buried 55-gallon drum 1120 against the ground plane. Similarly, the strong dihedral returns in 1360b were produced by the combination of the large water tank 1110 against the ground plane. The roofed silo 1130 against the gravel ground produced the dihedral response in 1360c. The two side-by-side 55-gallon drums 1140 in conjunction with the ground plane again produced the dihedral response in 1390. Note that these two drums 1390 were probably in the upright position when the radar imagery was obtained, about eighteen months prior to when they were photographed and a year before a major flood affected the region.

VIII. Exemplary SAR Imagery: The approach described herein, was applied to the fully polarimetric L-band imagery from the NASA/JPL Airborne Synthetic Aperture Radar (AIRSAR) system to detect dihedral and trihedral targets. Mounted on a DC-8 aircraft operated out of NASA Dryden Flight Research Center, the fully polarimetric (i.e., quad-channels: HH, HV, VH, VV) AIRSAR system was operating in the strip-map mode at a transmission frequency centered at 1280 MHz with a bandwidth of 80 MHz. The azimuth beamwidth was about 6°. This collection produced full-resolution imagery at all four polarizations, with a slant-range resolution of about 1.67 meters and an azimuth resolution of about one meter. The dihedral and trihedral detectors are described subsequently in Section XI.

Figure 12:
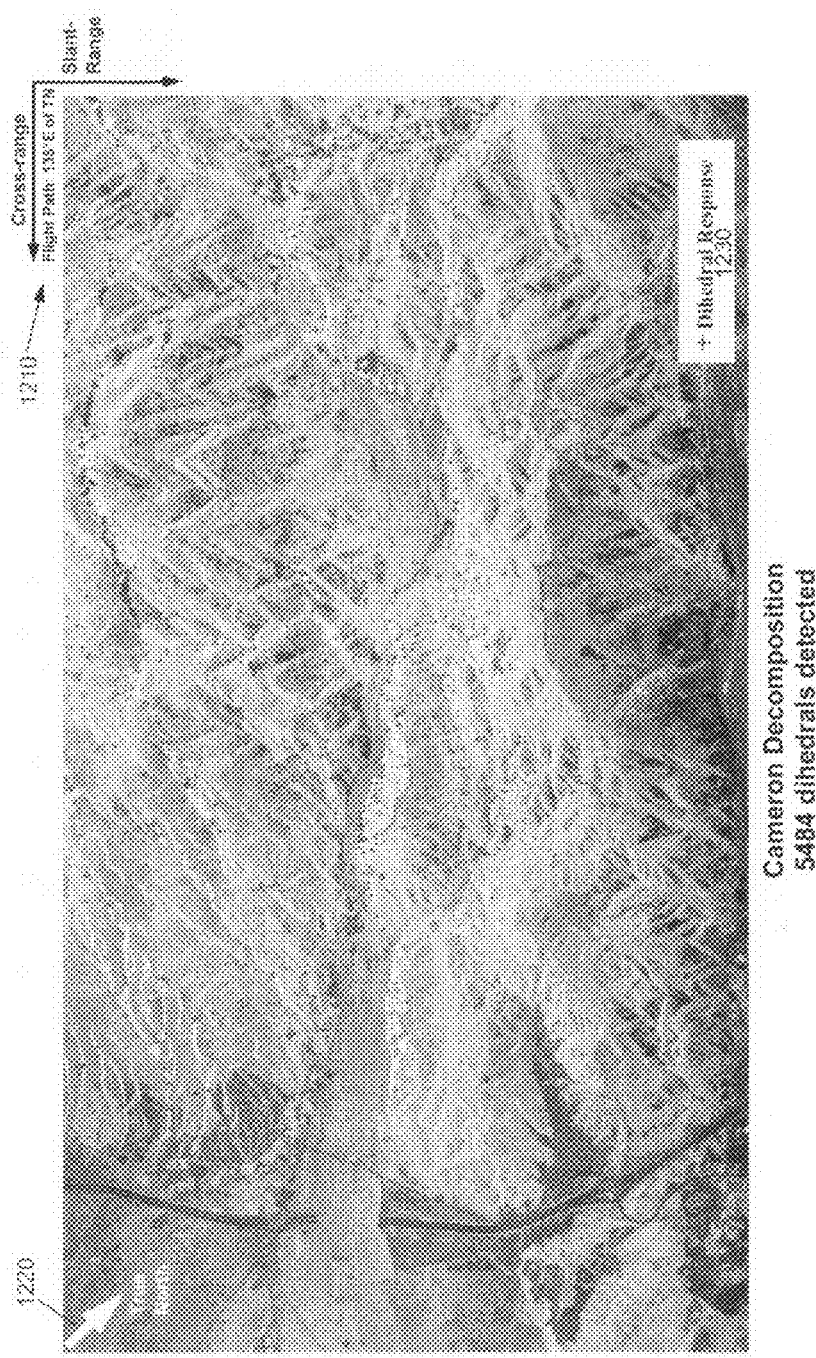
FIG. 12 is a south-east heading, L-band SAR image of Lytle Creek in San Bernardino County, Calif., showing dihedral shape detections using only Cameron Decomposition.
Figure 13A:
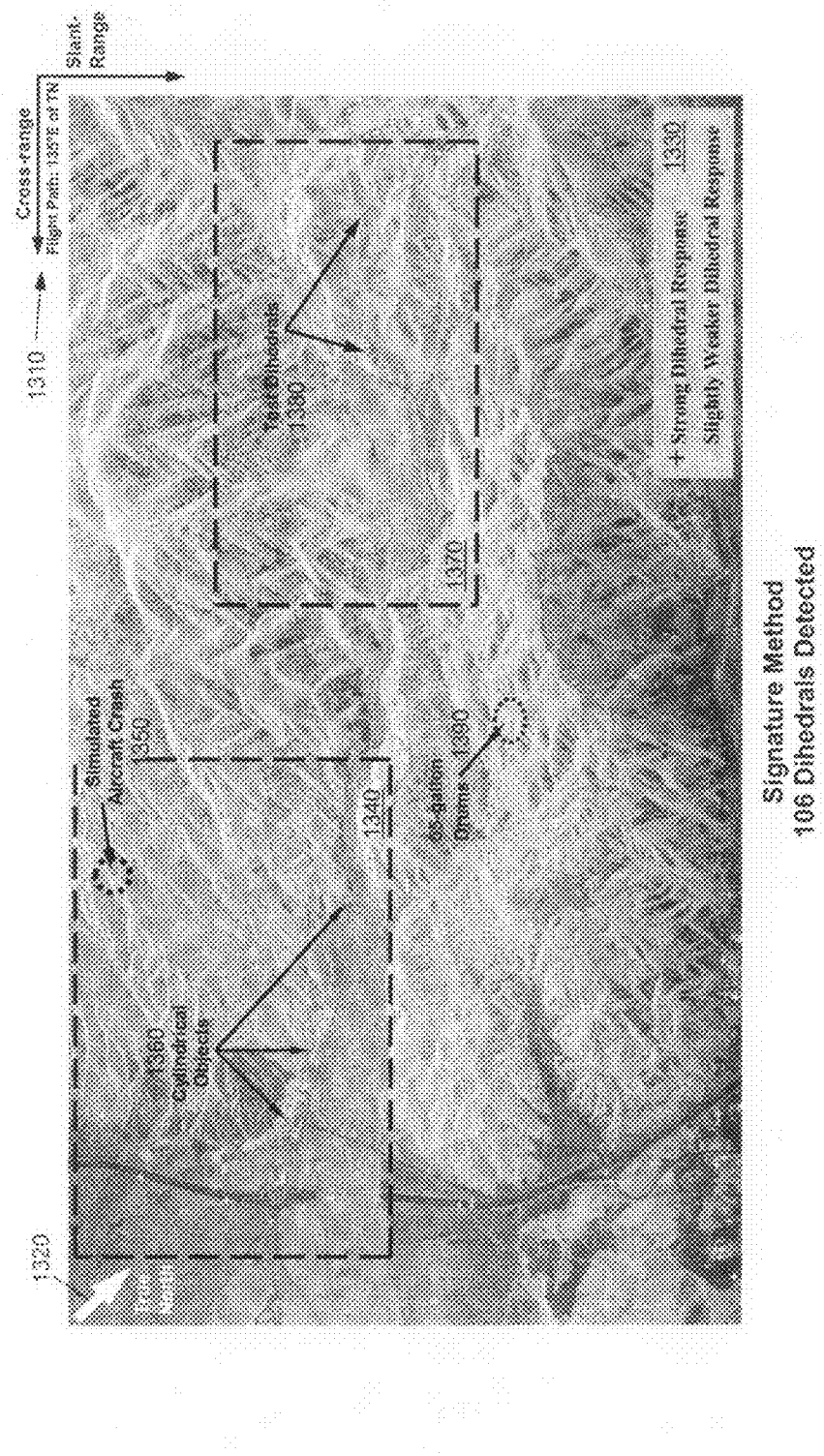
FIG. 13A is the same L-band. SAR image of Lytle Creek, showing dihedral shape detections using Signature Method.

FIGS. 12 and 13A show the same L-band HH SAR image 1200, 1300 collected by the NASA/JPL AIRSAR system over the Lytle Creek region of San Bernardino County, Calif., in April 2002. The azimuth and slant-range directions are labeled in the upper left corner of each figure by a compass rose 1210, 1310. The dataset frame extends 10.5 km in azimuth by 6.3 km in range, covering 67 km² of area. The SAR platform's travel direction was southeast, with a heading of 135° East of True North as indicated by the direction arrow in each image 1220, 1320. FIGS. 12 and 13A compare the detection results for dihedral returns using two methods: (1) a method solely based on applying Cameron classification (in FIG. 12) and (2) a method based on the signatures approach (in FIG. 13A). The comparison measure is the number of detected candidate dihedral targets generated by each method, which directly relates to number of false alarms (or false detections) generated. FIGS. 12 and 13A show respective legends 1230, 1330, both identifying each pixel having strong dihedral characteristics with a black cross. FIGS. 13A through 13C additionally identify each pixel having weaker dihedral characteristics with a white cross.

FIG. 12 shows the SAR image 1200 marked with black crosses indicating the positions of all image pixels identified by the Cameron classification method as having strong dihedral characteristics. (Cameron Symmetric Scatterer Space classifies symmetric scatterer type into six distinct regions, representing the six elementary shapes: trihedral, dihedral, dipole, cylinder, narrow-diplane and quarter-wave device.) In this example, 5484 candidates with dihedral-like characteristics were detected. This outcome highlights the unacceptably high false-alarm rate that can result when a standard polarimetric SAR classification technique is used to detect specific objects.

By contrast, FIG. 13A illustrates the SAR image 1300 marked with crosses indicating the positions of image pixels identified by the signature method described herein as having strong and slightly weaker dihedral characteristics. A total number of 106 candidate pixels are identified in this signature case, a significant improvement to the 5484 detections made by the Cameron classification method. This result also demonstrates the extremely low false alarm rates that can be achieved using the signature method described herein. The upper left portion of the image 1300 features a first dash rectangular region 1340 within which are shown candidate dihedral returns from a salvaged single-engine aircraft tail 1350 (part of a simulated aircraft crash site set-up) and other objects 1360 of various sizes and shapes exhibiting dihedral-like characteristics. The right portion of the image 1300 features a second dash rectangular region 1370 including ideal test dihedrals 1380 (of the form shown in FIG. 9) set up for maximum radar return. Image 1300 also includes candidate dihedral returns from a pair of abreast (i.e., side-by-side) 55-gallon drums 1390.

Figure 13B:
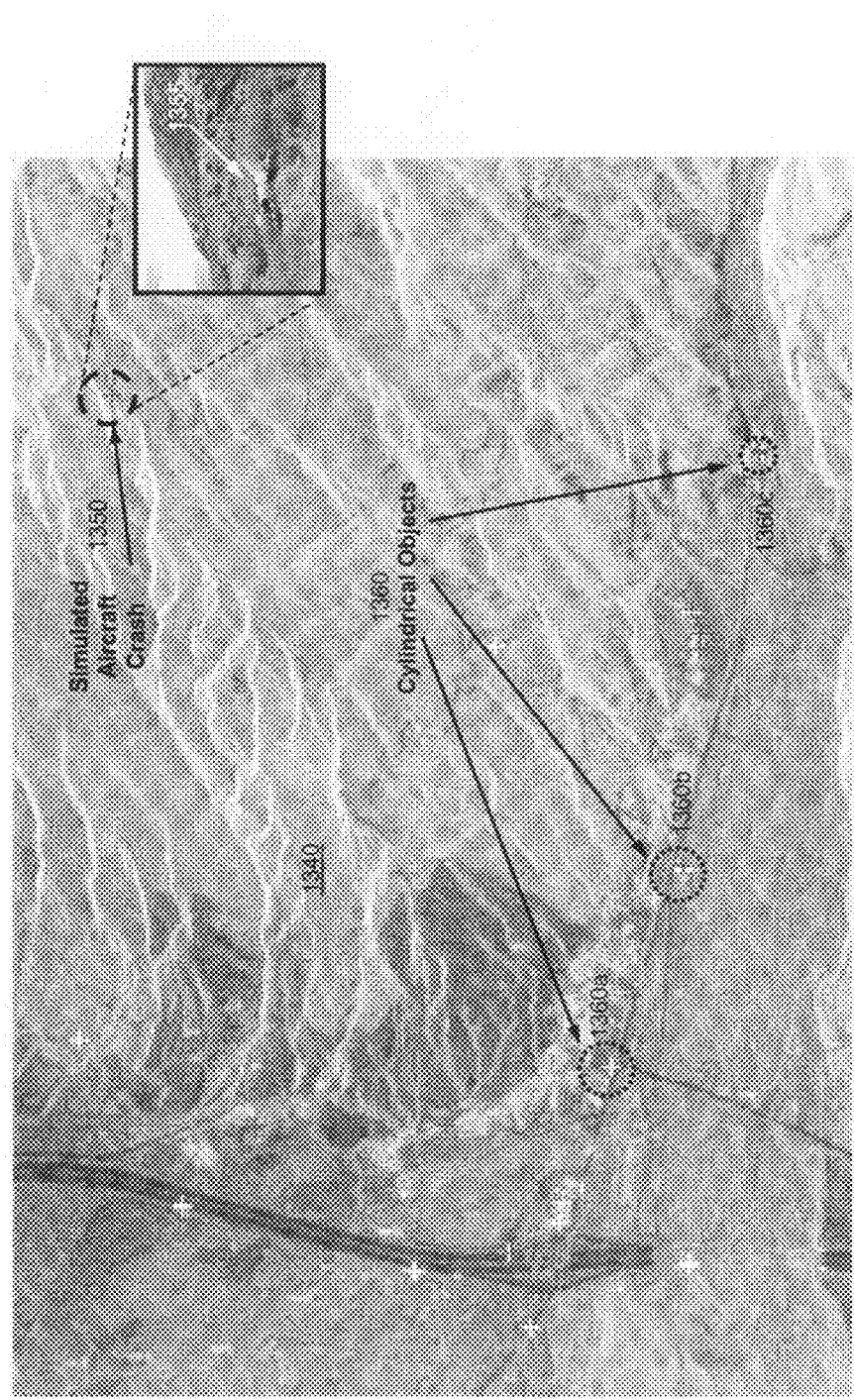
FIG. 13B is a left side detail of the Lytle Creek SAR image in 13A.
Figure 13C:
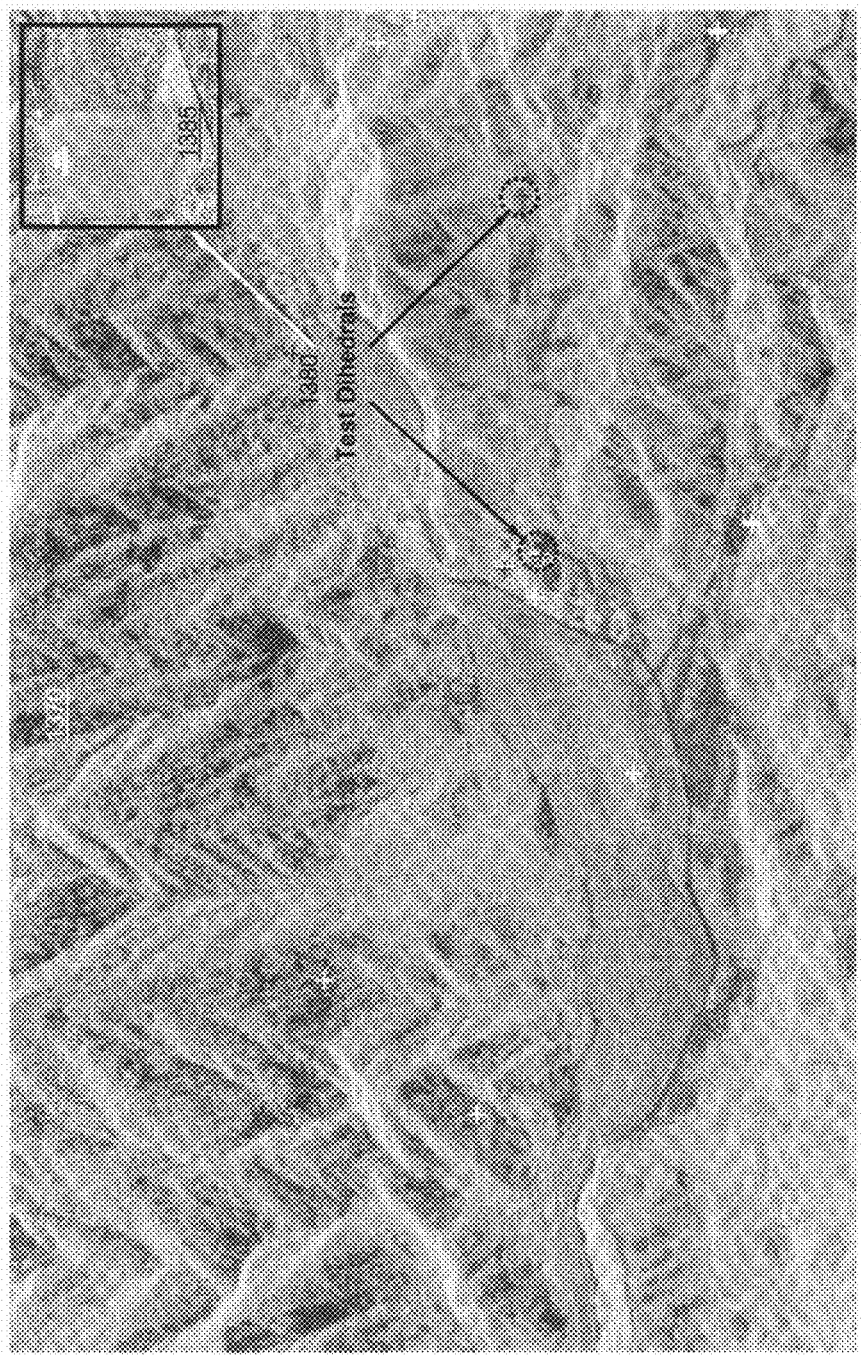
FIG. 13C is a right side detail of the Lytle Creek SAR image in 13A.

FIGS. 13B and 13C show enlargements of the image portions 1340 and 1370, respectively. The aircraft crash site 1350 is shown on the upper right corner of FIG. 13B, just off of a dirt road on the side of a hill. The dihedral return from this site 1350 was produced by the aircraft's T-tail (shown in detail photograph 1355) that was positioned broadside to the radar. FIG. 13C shows strong dihedral returns 1380 from ideal test dihedrals, a photograph of one is shown in 1385. Some of the more accessible candidate dihedral return locations near the Lytle Creek wash 1360a, 1360b, 1360c and 1390, were investigated during a subsequent on-site verification effort, as shown in FIG. 11. These responses were verified to have been produced from objects of various sizes and shapes, which in conjunction with the ground simulated dihedral-like characteristics.

Figure 14:
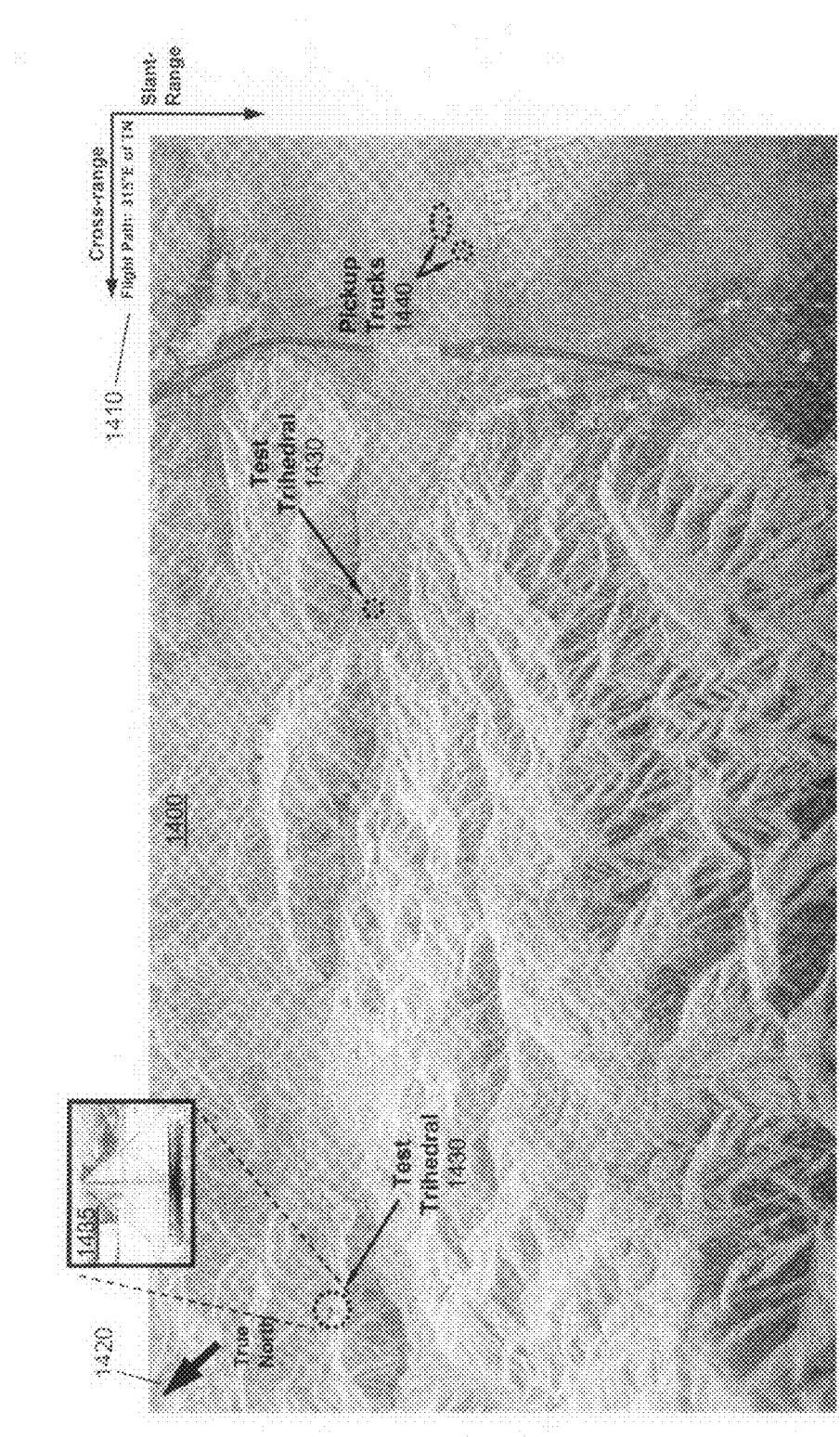
FIG. 14 is a north-west heading, L-band SAR image of Lytle Creek, showing Trihedral shape detections using. Signature Method.

FIG. 14 shows an L-band HH SAR image 1400 collected by the NASA/JPL AIRSAR from the same area in the Lytle Creek region, using a platform heading 180° away from the platform heading shown in FIGS. 12 and 13A. The azimuth and slant-range directions are labeled in the upper left corner of the figure by a compass rose 1410. In this case, the SAR travel direction was northeast, with a heading of 315° East of True North, indicated by the direction arrow 1420. The signature method described herein was used to identify strong trihedral (rather than dihedral) returns in the SAR image 1400. The two strong responses produced by the ideal test trihedrals 1430 were identified (with a detail photograph of an example shown in 1435) as well as strong responses from other objects simulating trihedral-like effects such as pickup trucks 1440.

IX. Exemplary Parameter Plots: FIGS. 15-20 show graphs of characteristic responses for an ideal dihedral as function of azimuth angle and/or dihedral edge size. The dihedral edge size is provided as fractional or whole increments of the wavelength $\lambda$ and the azimuth angle corresponds to the angle away from broadside (i.e., azimuth angle=0), or as shown in FIG. 9 the angle away from $\hat{k}$ (negative vertical or $-\hat{z}$ direction) in the plane defined by $\hat{x}$ and $\hat{z}$ axes. The data sets used for these plots were generated using full-wave electromagnetic simulations of a dihedral's complex (phase and amplitude) backscattering response to a 300 MHz transmitted plane-wave (i.e., wavelength $\lambda$~1 meter) as function of dihedral edge size and azimuth angle.

Figure 15:
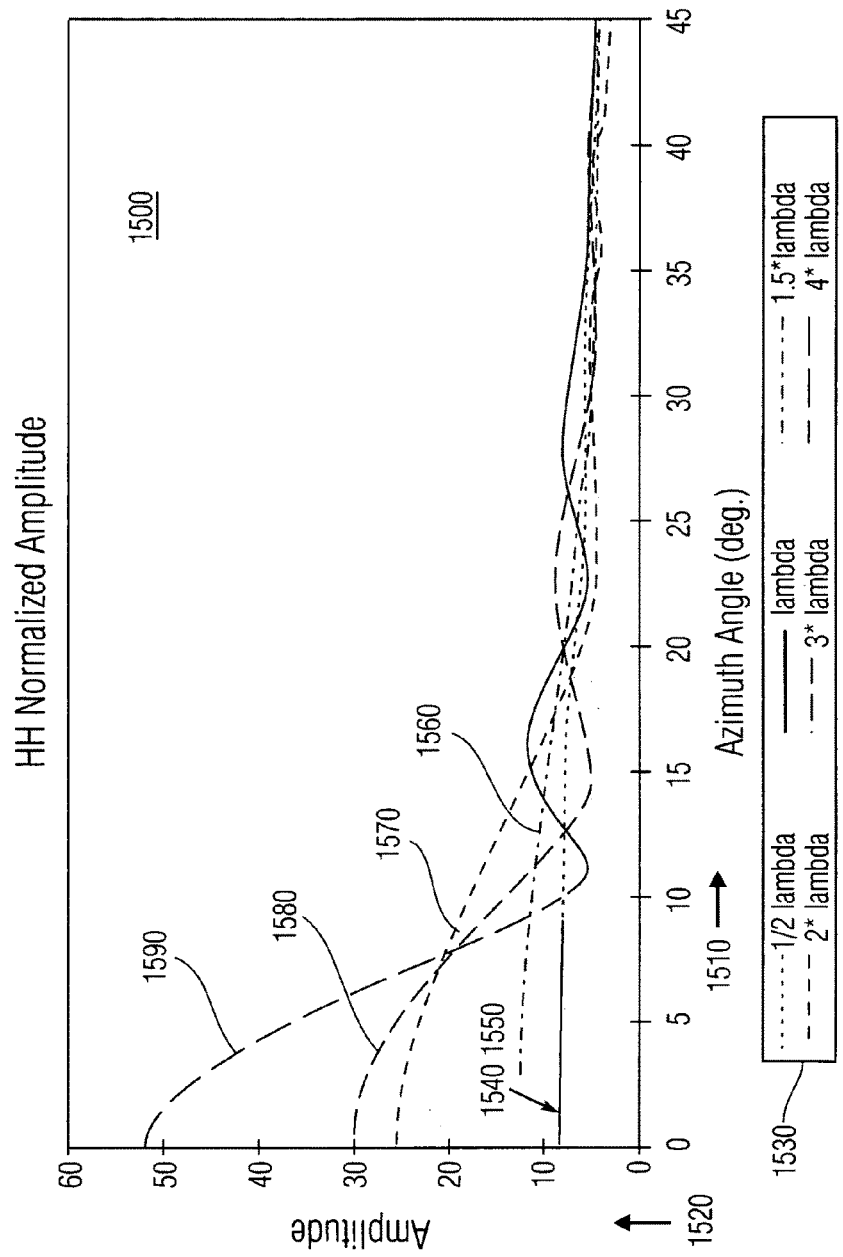
FIG. 15 is a graphical representation of Dihedral HH Normalized Amplitude versus azimuth angle.

FIG. 15 shows a graph 1500 that represents normalized HH amplitude as a function of angle away from broadside (i.e., azimuth angle=0) for dihedral shaped scattering centers of different sizes relative to the wavelength $\lambda$. The abscissa 1510 represents azimuth angle in degrees, while the ordinate 1520 represents normalized amplitude. The legend 1530 identifies amplitude responses for ideal dihedral edge sizes (measured in terms of wavelength, $\lambda$~1 meter), including ½$\lambda$ as 1540, $\lambda$ as 1550, 1½$\lambda$ as 1560, 2$\lambda$ as 1570, 3$\lambda$ as 1580 and 4$\lambda$ as 1590. As can be observed, the peak amplitude (located at broadside or zero azimuth angle) increases and the main lobe sharpens and approaches the region near broadside with larger dihedral edge sizes. The rate of falloff is part of the signature function used in various exemplary embodiments. Significant change in main lobe width for size change may be observed from $\lambda$ to 2$\lambda$ with potential for 0.2× size sensitivity in this region. Measurable change in main lobe width may be observed for size change from 2$\lambda$ to 3$\lambda$, with potential for 2× (or better) size sensitivity for dihedrals that are multiple wavelengths $\lambda$ in size.

Figure 16:
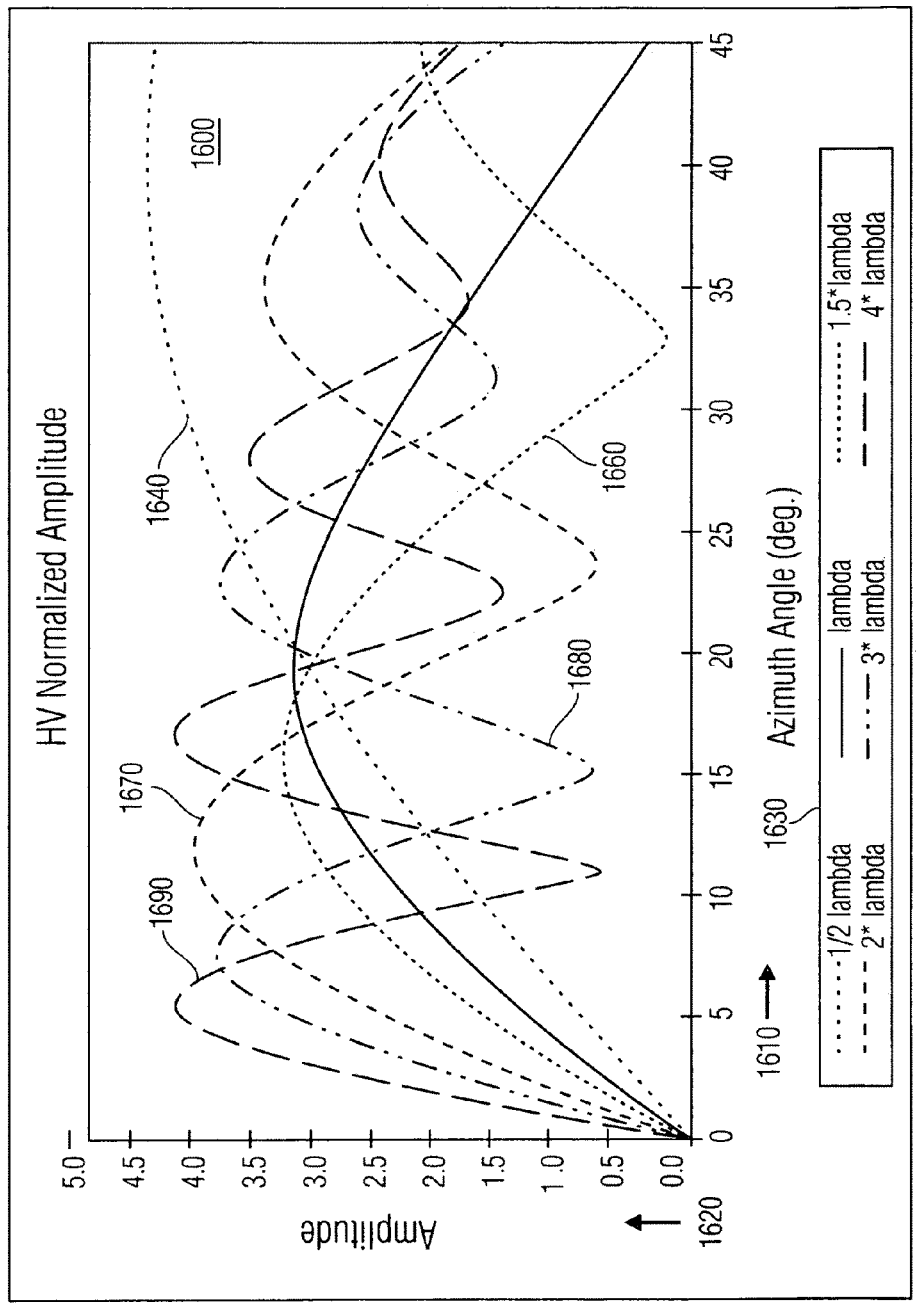
FIG. 16 is a graphical representation of Dihedral HV Normalized Amplitude versus azimuth angle.

FIG. 16 shows a graph 1600 that represents normalized HV amplitude variation as a function of angle away from broadside for dihedral shaped scattering centers of different sizes relative to the wavelength $\lambda$. The abscissa 1610 represents azimuth angle in degrees, while the ordinate 1620 represents normalized amplitude. The legend 1630 identifies amplitude responses for ideal dihedral edge sizes (measured in terms of wavelength), including ½$\lambda$ as 1640, $\lambda$ as 1650, 1½$\lambda$ as 1660, 2$\lambda$ as 1670, 3$\lambda$ as 1680 and 4$\lambda$ as 1690. As expected, the HV amplitude at broadside is zero for all sizes of ideal diheral. The peak amplitudes for all dihedral sizes are about an order of magnitude less than those of the HH amplitude values in FIG. 15, with the peak amplitude (i.e., the peak of the first oscillation) approaching broadside as the dihedral size becomes larger. Also, the oscillation frequency increases for larger dihedral sizes. As with the HH amplitude responses in FIG. 15, the structural variations in the HV amplitude returns may be exploited for dihedral size discriminations.

Figure 17:
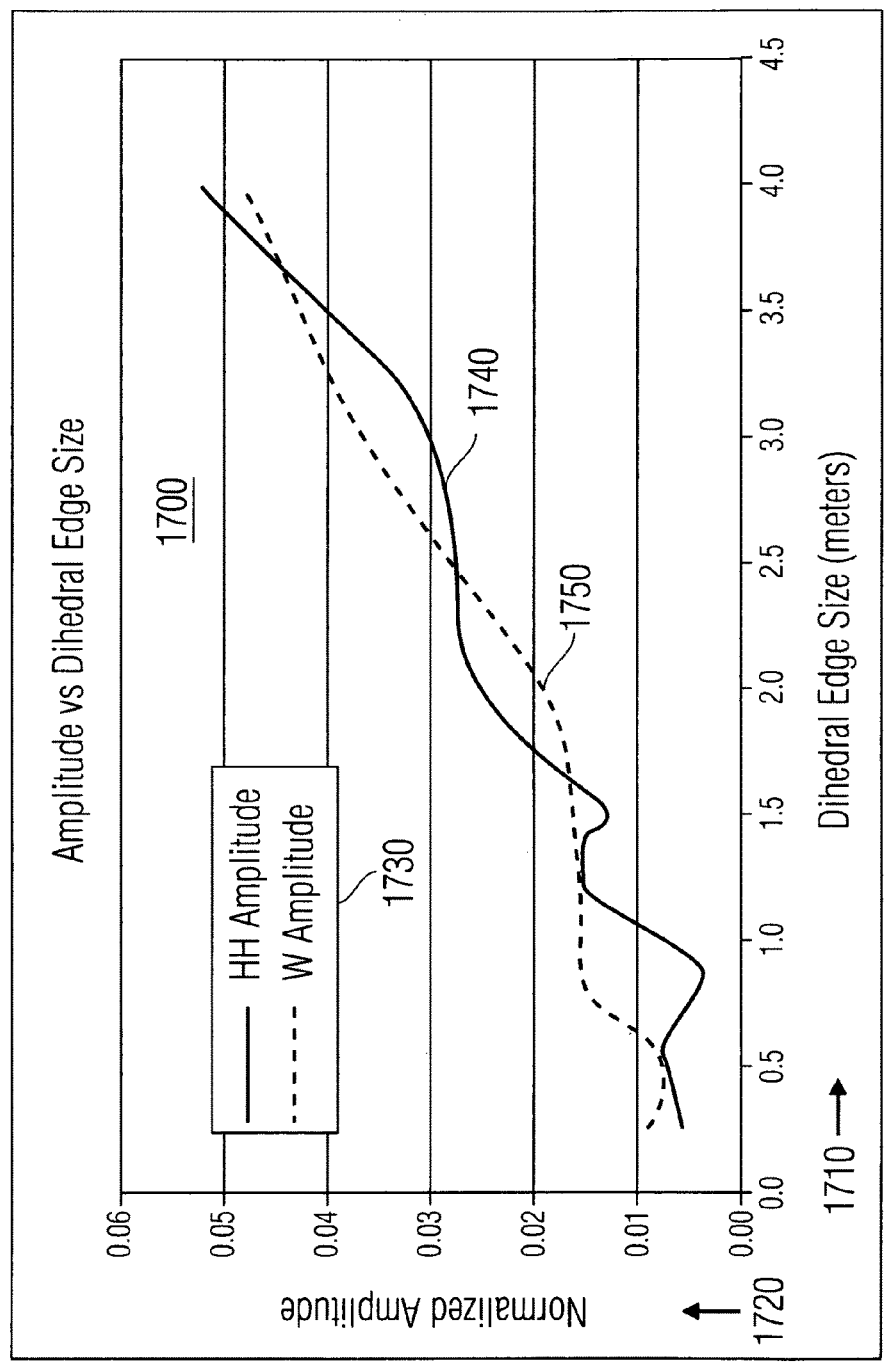
FIG. 17 is a graphical representation of Dihedral HH and VV Normalized Amplitudes versus Dihedral Edge. Size.
Figure 18:
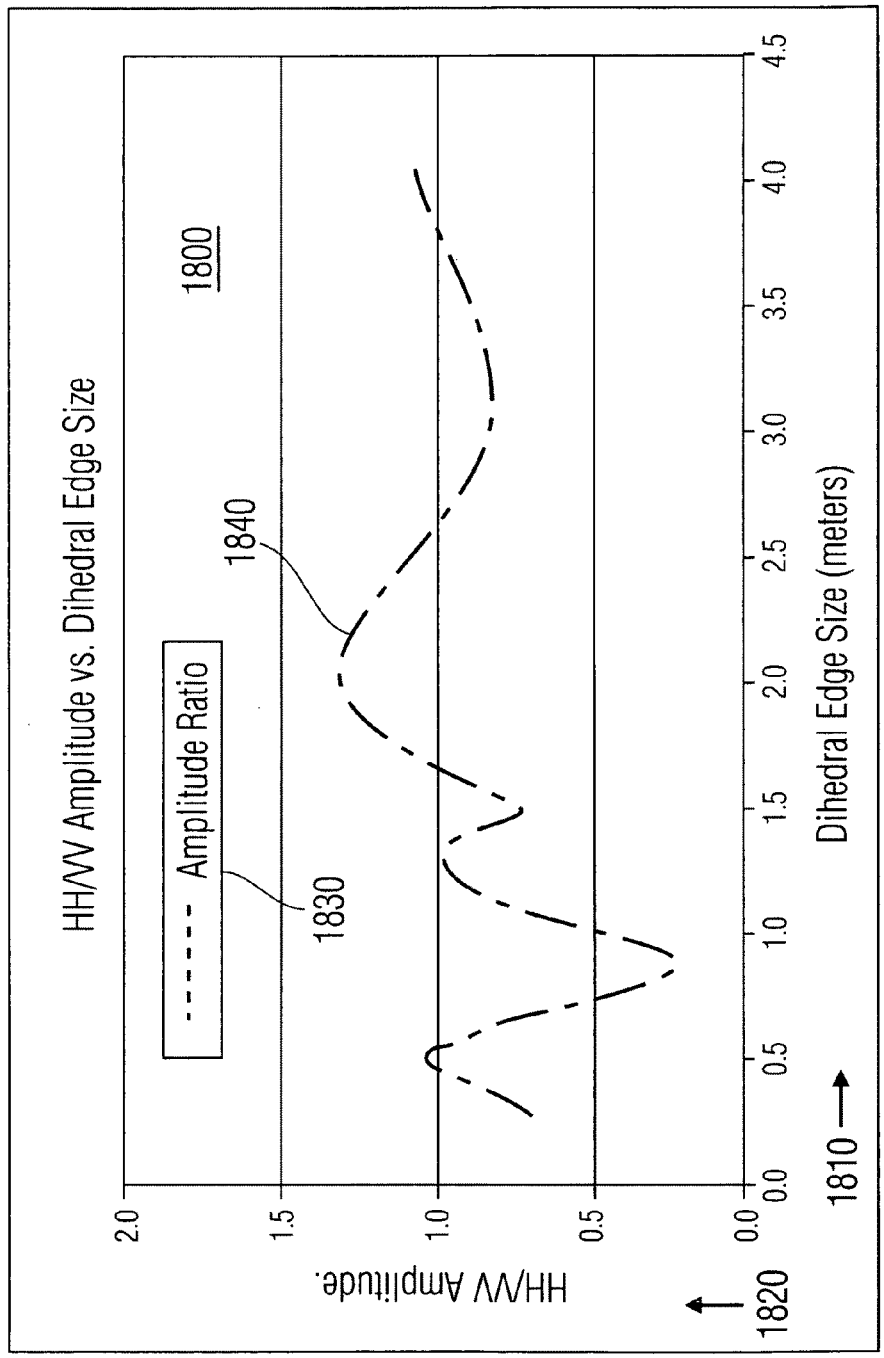
FIG. 18 is a graphical representation of Dihedral HH/VV Amplitude Ratio versus Dihedral Edge Size.

FIG. 17 shows a graph 1600 of HH and VV normalized amplitudes at broadside (azimuth angle of zero) as a function of dihedral edge length. The abscissa 1710 represents dihedral edge size in meters, while the ordinate 1720 represents normalized amplitude. The legend 1730 identifies curves for two channels: HH as 1740 and VV as 1750. Both curves oscillate distinctly, but generally increase with increasing edge size. FIG. 18 shows a graph 1800 of the ratio of HH to VV amplitudes in relation to dihedral edge size. The abscissa 1810 represents dihedral edge size in meters, while the ordinate 1820 represents the HH/VV amplitude ratio. The legend 1830 identifies the curve 1840 for the ratio. The HH/VV ratios vary with edge size, exhibiting expected oscillatory behavior in the Mie or resonance region (the region where object sizes are comparable to the radar wavelength). The expected HH/VV ratio for an ideal dihedral at broadside is unity in the optical region, the region where object sizes are at least ten times bigger than the transmitted wavelength. As observed in FIG. 18, the HH/VV ratios asymptotically converge to unity as the dihedral size increases above $3\lambda$. The observed signal structure is important in extracting signatures from objects at ultra-high frequencies (UHF), where most targets of interest fall into the Mie region.

Figure 19:
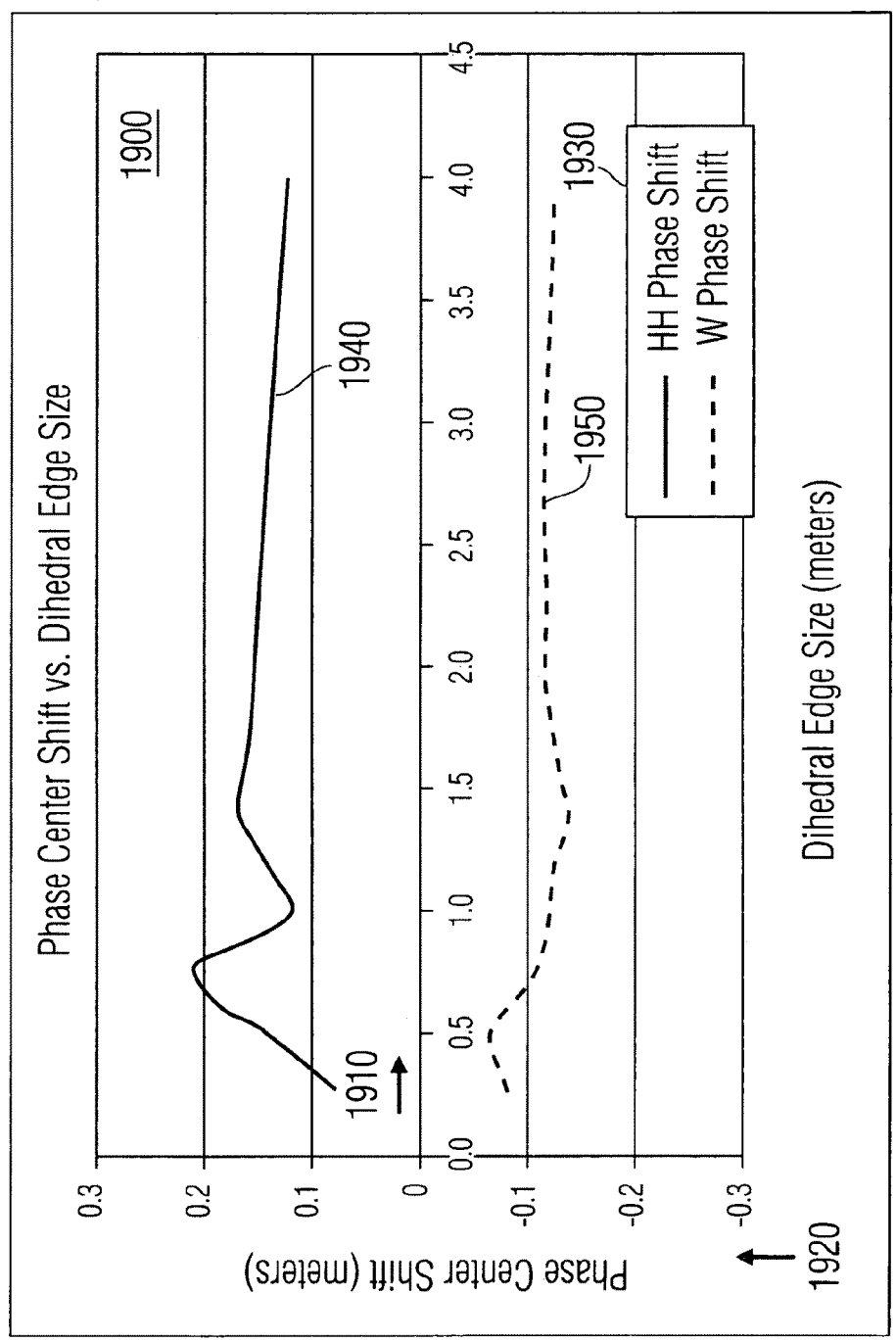
FIG. 19 is a graphical representation of Dihedral HH and VV Phase Center shifts versus Dihedral Edge Size.

FIG. 19 shows a graph 1900 of phase center position (i.e., the position from which the return is originating) as a function of dihedral size at broadside (azimuth angle of zero). The abscissa 1910 represents dihedral edge size in meters, while the ordinate 1920 represents phase center position in meters. The legend 1930 identifies curves for two channels: HH as 1940 and VV as 1950. The expected variation in phase center positions for HH and VV are minimal if not zero in the optical region. However, FIG. 19 shows the HH and VV phase center positions in the Mie region shift considerably (and independently), especially at smaller dihedral sizes. The phase center positions for both HH and VV become more stable/constant as the dihedral size increases above $3\lambda$.

Figure 20:
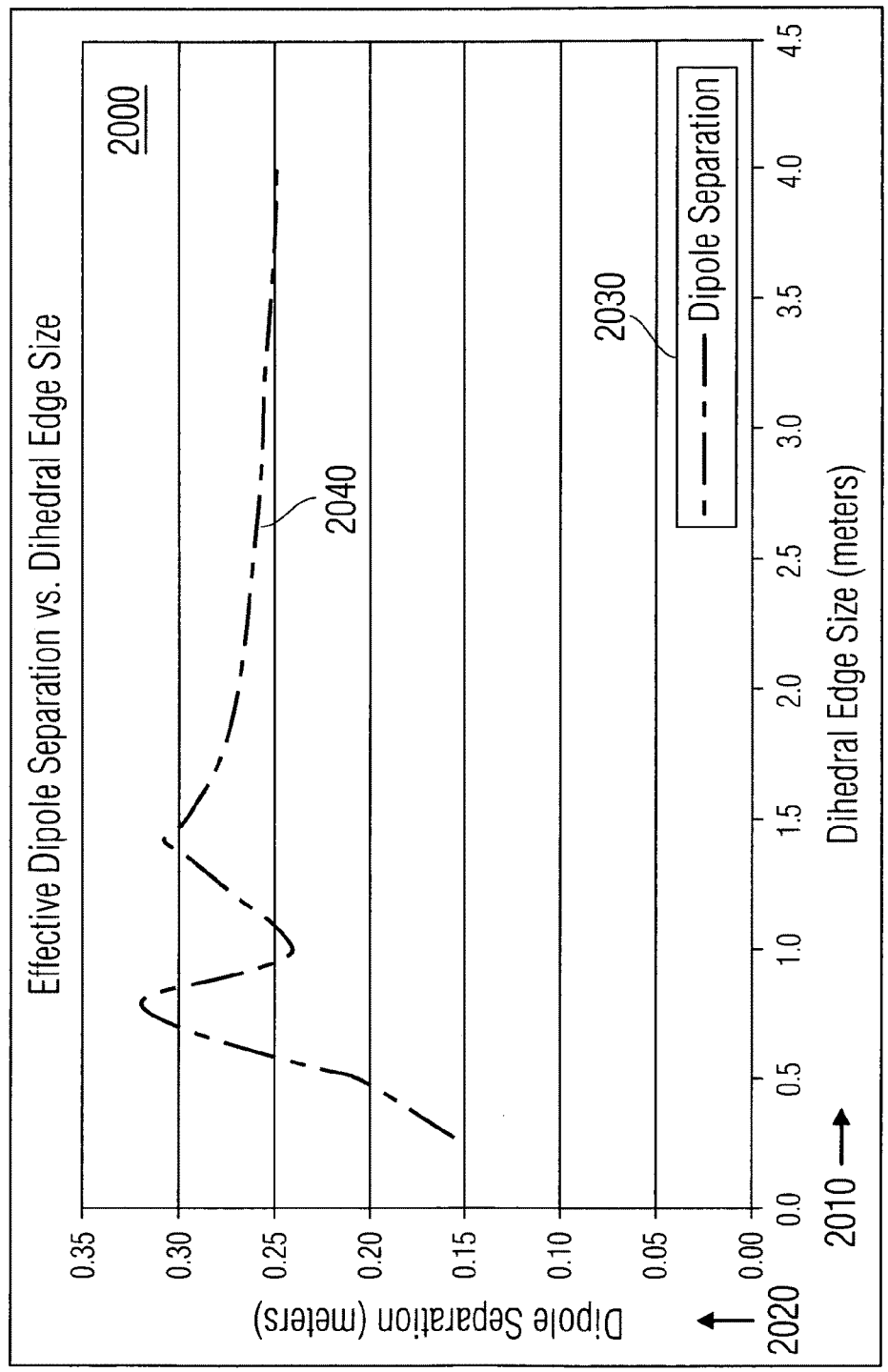
FIG. 20 is a graphical representation of Effective Dipole Separation (dihedral visualization in FIG. 9) versus Dihedral Edge Size.

FIG. 20 shows a graph 2000 that features effective dipole separation in relation to dihedral edge size. The abscissa 2010 represents dihedral edge size in meters, while the ordinate 2020 represents dipole separation in meters. The legend 2030 identifies a curve 2040 for dipole separation. (Effective dipole separation is related dihedral edge size, all values shown being greater than 0.15 m and above 0.20 m for edge sizes greater than 0.5 m.) As observed in FIG. 10, the effective dipole separation for a dihedral in the optical regime is constant at $\lambda/4$, which in this example is about 0.25 meter ($\lambda \sim 1$ m in these data simulations). FIG. 20 is another illustration of how responses in the Mie region vary from responses in the optical region, showing that the dipole separation varies significantly as a function of dihedral edge size in the Mie region. The dipole separation exhibits an asymptotic convergence to the expected optical regime value of $\lambda/4$ as the dihedral size increases above $3\lambda$. This observed structure may be accounted for in signature-based detections of objects in the Mie region.

X. Decomposition Observables and Features: Exemplary implementations of the signature approach are described in Sections XI, XII and XIII. A plurality of N overlapping sub-aperture SAR images and their corresponding Cameron decomposition data sets are acquired. This example assumes 50% overlap between adjacent sub-apertures. Thus, for a given pixel, an observation space may consist of N ordered Cameron feature sets, with each set consisting of the following parameter list: $(z_{Qi}, a_{Qi}, \tau_{Qi}, s_{Qi})|_{i=1,\ldots,N}$ where subscript Q represents acquired data (measured or simulated) and subscript/counts sub-apertures from 1 to N. In the exemplary embodiments described herein, Cameron's symmetric scatterer Orientation Angle, $\psi_i (-\pi/2 \leq \psi_i \leq \pi/2)$, measured relative to radar's line-of-sight, is presently not used as an observable for the maximum log-likelihood detectors. In addition for the exemplary embodiments, the Symmetric Scatterer Type $z_i$ counts as two parameters, with its real (Re) and imaginary (Im) components considered as separate parameters.

Parameters for data acquired for each pixel are defined such that: $z_{Qi}$ is Symmetric Scatterer Type having a complex value, $a_{Qi}$ is maximum symmetric normalized amplitude, $\tau_{Qi}$ is symmetry angle, $\theta_{Qi}$ is reciprocity angle, and $s_{Qi}$ is symmetry weight. The complex-valued Symmetric Scatterer Type can be expressed as $z_{Qi} = (\text{Re}(z_{Qi}), \text{Im}(z_{Qi}))$ and $|z_{Qi}| \leq 1$. The Maximum Symmetric Normalized Amplitude has the limits $a_{Qi} \in (0,1)$, where $\max\{a_{Qi}|_{i=1,\ldots,N}\} = 1$. The symmetry angle has limits $0 \leq \tau_{Qi} \leq \pi/4$ in which $\tau_{Qi} = 0$ represents a symmetric scatterer and $\tau_{Qi} = \pi/4$ represents an asymmetric scatterer. The reciprocity angle has limits $0 \leq \theta_{Qi} \leq \pi/2$ where $\theta_{Qi} = 0$ represents a scatter that strictly obeys the reciprocity principle and $\theta_{Qi} = \pi/2$ represents a scatterer that violates the reciprocity principle. The symmetry weight $s_{Qi}$ represents the ratio of the magnitude of the symmetric component of the sum of to the magnitude of all components of the scattering matrix. Thus, the shown feature list for acquired SAR data includes a plurality of J parameters, where J=6 for each sub-aperture i: $\text{Re}(z_{Qi})$, $\text{Im}(z_{Qi})$, $a_{Qi}$, $\tau_{Qi}$, $\theta_{Qi}$, $s_{Qi}$. Similarly, each log-likelihood detector, as described in Section XI, is defined as having M sub-apertures or components, with each sub-aperture consisting of the same six Cameron decomposition feature parameters listed above $(z_{Rj}, a_{Rj}, \tau_{Rj}, \theta_{Rj}, s_{Rj})|_{j=1,\ldots,M}$, where subscript R represents a specific target and subscript j counts detector sub-apertures from 1 to M.

Preferably, all detectors have their $\tau_{Rj}|_{j=1,\ldots,M}$ values set at 15°, $\theta_{Rj}|_{j=1,\ldots,M}$ values set at 9°, and $s_{Rj}|_{j=1,\ldots,M}$ values set at 0.5. This is because sub-aperture pixels that have $\tau_{Rj} \geq 15°$ or $s_{Rj} \geq 0.5$ are not considered to be adequate symmetric scatterers and hence are assigned very small likelihood values. Moreover, sub-aperture pixels that have $\theta_{Rj} \geq 15°$ are not considered to be reciprocal scatterers and hence are also assigned very small likelihood values.

XI. Shape-Specific Log-Likelihood Detectors: An exemplary implementation of Weighted Log-Likelihood Detectors for four elementary shapes (edge glint, dihedral, trihedral, and quarter-wave device) is described in the following paragraphs. Note that this implementation was originally designed for one particular SAR system, the NASA/JPL Airborne Synthetic Aperture Radar (AIRSAR) system and uses particularly the Cameron decomposition (although other methods may be used instead). Because the AIRSAR system had a small bandwidth, this implementation does not include the size discrimination component except in the case of a Dihedral Detector described subsequently.

The Edge Glint Detector (e.g., for a wing boundary) is assumed to exhibit the following characteristics: (1) Maximum Symmetric Normalized Amplitude profile $(a_{Rj}|_{j=1,\ldots,M})$ shows the brightest return occurring over one sub-aperture (or at most two adjacent sub-apertures) with rapid falloff over other sub-apertures; and (2) Symmetric Scatterer Type profile $(z_{Rj}|_{j=1,\ldots,M})$ sets the Symmetric Scatterer Type of the brightest sub-aperture return to the complex value [0.25, 0.0], a value halfway between the Cameron Symmetric Scatterer Type values of an ideal dipole and an ideal Cylinder, and sets the Symmetric Scatterer Type values of all other sub-aperture returns to Not Classifiable (NC) or Unusable/Invalid (i.e., their returns are assumed to be dominated by clutter). This detector can be implemented using an odd number of sub-apertures with symmetry about the middle sub-aperture (i.e., j=M/2+1), which may be assigned the brightest return, or alternatively, using an even number of sub-apertures, with symmetry about the boundary joining the two middle sub-apertures (i.e., j=M/2 and M/2+1). Values for a three sub-aperture (i.e., M=3) and a four sub-aperture (i.e., M=4) implementations of an Edge Glint Detector are listed. For each pixel, the implementation providing the higher likelihood value is selected:

for three-component, M=3
  $(z_{R1}, a_{R1}, \tau_{R1}, \theta_{R1}, s_{R1})$=(NA, 0.4, 15°, 9°, 0.5)
  $(z_{R2}, a_{R2}, \tau_{R2}, \theta_{R2}, s_{R2})$=([0.25, 0.0], 1, 15°, 9°, 0.5)
  $(z_{R3}, a_{R3}, \tau_{R3}, \theta_{R3}, s_{R3})$=(NA, 0.4, 15°, 9°, 0.5), and
for four-component, M=4
  $(z_{R1}, a_{R1}, \tau_{R1}, \theta_{R1}, s_{R1})$=(NA, 0.25, 15°, 9°, 0.5)
  $(z_{R2}, a_{R2}, \tau_{R2}, \theta_{R2}, s_{R2})$=([0.25, 0.0], 1, 15°, 9°, 0.5)
  $(z_{R3}, a_{R3}, \tau_{R3}, \theta_{R3}, s_{R3})$=([0.25, 0.0], 1, 15°, 9°, 0.5)
  $(z_{R4}, a_{R4}, \tau_{R4}, \theta_{R4}, s_{R4})$=(NA, 0.25, 15°, 9°, 0.5),
with notable symmetry between the first and last components, and between the second and next-to-last components.

The Dihedral Detector exhibits the following characteristics: (1) Maximum Symmetric Normalized Amplitude profile $(a_{Rj}|_{j=1,\ldots,M})$ shows the brightest return occurring at broadside with gradual falloff over other sub-apertures; and (2) Symmetric Scatterer Type profile $(z_{Rj}|_{j=1,\ldots,M})$ sets the Symmetric Scatterer Type value of the return at broadside equal to the Symmetric Scatterer Type of an ideal Dihedral (i.e., [−1.0, 0.0]), tending to the Symmetric Scatterer Type of a Narrow-Diplane (i.e., [−0.5, 0.0]) for sub-apertures that are far enough from broadside. Similar to the Edge Glint Detector, the Dihedral Detector can be implemented using an odd number of sub-apertures with symmetry about the middle sub-aperture (i.e., j=M/2+1), which may be assigned the brightest return, or alternatively using an even number of sub-apertures, with symmetry about the boundary joining the two middle sub-apertures (i.e., j=M/2 and M/2+1). Four sub-aperture (i.e., M=4) and five sub-aperture (i.e., M=5) implementations of a Dihedral Detector are listed. For each pixel, the implementation providing the higher likelihood value is selected:

for four-component, M=4
  $(z_{R1}, a_{R1}, \tau_{R1}, s_{R1})$=([−0.8, 0.0], 0.8, 15°, 9°, 0.5)
  $(z_{R2}, a_{R2}, \tau_{R2}, \theta_{R2}, s_{R2})$=([−0.95, 0.0], 1, 15°, 9°, 0.5)
  $(z_{R3}, a_{R3}, \tau_{R3}, \theta_{R3}, s_{R3})$=([−0.95, 0.0], 1, 15°, 9°, 0.5)
  $(z_{R4}, a_{R4}, \tau_{R4}, \theta_{R4}, s_{R4})$=([−0.8, 0.0], 0.8, 15°, 9°, 0.5), and
for five-component, M=5
  $(z_{R1}, a_{R1}, \tau_{R1}, s_{R1})$=([−0.75, 0.0], 0.8, 15°, 9°, 0.5)
  $(z_{R2}, a_{R2}, \tau_{R2}, \theta_{R2}, s_{R2})$=([−0.9, 0.0], 0.9, 15°, 9°, 0.5)
  $(z_{R3}, a_{R3}, \tau_{R3}, \theta_{R3}, s_{R3})$=([−0.98, 0.0], 1, 15°, 9°, 0.5)
  $(z_{R4}, a_{R4}, \tau_{R4}, \theta_{R4}, s_{R4})$=([−0.9, 0.0], 0.9, 15°, 9°, 0.5)
  $(z_{R5}, a_{R5}, \tau_{R5}, \theta_{R5}, s_{R5})$=([−0.75, 0.0], 0.8, 15°, 9°, 0.5),
again with similar component symmetry patterns as for the Edge Glint Detector. Initial tests on some SAR images showed that the 4-component Dihedral Detector performed slightly better than its 5-component version. However, this result is not yet conclusive.

The Trihedral Detector exhibits the following characteristics: (1) Maximum Symmetric Normalized Amplitude profile $(a_{Rj}|_{j=1,\ldots,M})$ shows invariant/equal brightness for returns over all sub-apertures; and (2) Symmetric Scatterer Type profile $(z_{Rj}|_{j=1,\ldots,M})$ sets the Symmetric Scatterer Type value of each sub-aperture to the Symmetric Scatterer Type of an ideal Trihedral, [1.0, 0.0]. This representation of the Trihedral Detector then assumes a uniform response over all sub-apertures. For each pixel, the implementation providing the higher likelihood value is selected:

for seven-component, M=7
  $(z_{R1}, a_{R1}, \tau_{R1}, \theta_{R1}, s_{R1})$=([1.0, 0.0], 0.95, 15°, 9°, 0.5)
  $(z_{R2}, a_{R2}, \tau_{R2}, \theta_{R2}, s_{R2})$=([1.0, 0.0], 0.95, 15°, 9°, 0.5)
  $(z_{R3}, a_{R3}, \tau_{R3}, \theta_{R3}, s_{R3})$=([1.0, 0.0], 0.95, 15°, 9°, 0.5)
  $(z_{R4}, a_{R4}, \tau_{R4}, \theta_{R4}, s_{R4})$=([1.0, 0.0], 15°, 9°, 0.5)
  $(z_{R5}, a_{R5}, \tau_{R5}, \theta_{R5}, s_{R5})$=([1.0, 0.0], 0.95, 15°, 9°, 0.5) $(z_{R6}, a_{R6}, \tau_{R6}, \theta_{R6}, s_{R6})$=([1.0, 0.0], 0.95, 15°, 9°, 0.5)
  $(z_{R7}, a_{R7}, \tau_{R7}, \theta_{R7}, s_{R7})$=([1.0, 0.0], 0.95, 15°, 9°, 0.5),
showing uniform values for all components.

The Quarter Wave Detector exhibits the following characteristics: (1) Maximum Symmetric Normalized Amplitude profile $(a_{Rj}|_{j=1,\ldots,M})$ shows invariant or equal brightness for returns over all sub-apertures; and (2) Symmetric Scatterer Type profile $(z_{Rj}|_{j=1,\ldots,M})$ sets the Symmetric Scatterer Type value of each sub-aperture to the value of either of the two equivalent representations of an ideal Quarter-Wave. This representation of the Quarter-Wave Detector assumes a uniform response over all sub-apertures. For each pixel, the implementation providing the higher likelihood value is selected:

for the first representation, four-component, M=4
  $(z_{R1}, a_{R1}, \tau_{R1}, \theta_{R1}, s_{R1})$=([0.0, 1.0], 0.95, 15°, 9°, 0.5)
  $(z_{R2}, a_{R2}, \tau_{R2}, \theta_{R2}, s_{R2})$=([0.0, 1.0], 0.95, 15°, 9°, 0.5)
  $(z_{R3}, a_{R3}, \tau_{R3}, \theta_{R3}, s_{R3})$=([0.0, 1.0], 0.95, 15°, 9°, 0.5)
  $(z_{R4}, a_{R4}, \tau_{R4}, \theta_{R4}, s_{R4})$=([0.0, 1.0], 0.95, 15°, 9°, 0.5), and
for the second representation, four-component, M=4
  $(z_{R1}, a_{R1}, \tau_{R1}, \theta_{R1}, s_{R1})$=([0.0, −1.0], 0.95, 15°, 9°, 0.5)
  $(z_{R2}, a_{R2}, \tau_{R2}, \theta_{R2}, s_{R2})$=([0.0, −1.0], 0.95, 15°, 9°, 0.5)
  $(z_{R3}, a_{R3}, \tau_{R3}, \theta_{R3}, s_{R3})$=([0.0, −1.0], 0.95, 15°, 9°, 0.5)
  $(z_{R4}, a_{R4}, \tau_{R4}, \theta_{R4}, s_{R4})$=([0.0, −1.0], 0.95, 15°, 9°, 0.5),
showing uniform values for the components in each representation.

XII. Likelihood Determination: A "detector" for a specific Target R, with M components or sub-apertures: $(z_{Rj}, a_{Rj}, \tau_{Rj}, \theta_{Rj}, s_{Rj})|_{j=1,\ldots,M}$ and pixel data over the N sub-apertures from an SAR image $(z_{Qi}, a_{Qi}, \tau_{Qi}, \theta_{Qi}, s_{Qi})|_{i=1,\ldots,N}$, where the following sequence of log-likelihood estimates from the set 840 of FIG. 8 can be concatenated to determine a log-likelihood value of whether the pixel in the SAR image corresponds to the target characteristics:

$$L_{Rk} = \frac{w_{Re(z)}}{n_z} \sum_{j=1}^{M} d_{Re(z)}(\text{Re}(z_{Qj+k}), \text{Re}(z_{Rj})) +$$

$$\frac{w_{Im(z)}}{n_z} \sum_{j=1}^{M} d_{Im(z)}(\text{Im}(z_{Qj+k}), \text{Im}(z_{Rj})) + \frac{w_a}{n_a} \sum_{j=1}^{M} d_a(a_{Qj+k}, a_{Rj}) +$$

$$\frac{w_T}{n_T} \sum_{j=1}^{M} d_T(\tau_{Qj+k}, \tau_{Rj}) + \frac{w_\theta}{n_\theta} \sum_{j=1}^{M} d_\theta(\theta_{Qj+k}, \theta_{Rj}) + \frac{w_s}{n_s} \sum_{j=1}^{M} d_s(s_{Qj+k}, s_{Rj})$$

where k is the detector offset or the offset between the detector sub-apertures and the measured sub-apertures with k=1, …, |M−N|+1, and $W_{Re(z)}$, $W_{Im(z)}$, $w_a$, $W_\tau$; $w_\theta$, $w_s$ are the weights associated with corresponding J plurality of parameters in the Cameron decomposition feature set (i.e., Re(z), Im(z), a, τ, θ, s). The numbers $n_z$, $n_a$, $n_\tau$, $n_\theta$, $n_s \leq M$, each of which correspond to a parameter in the Cameron decomposition feature set and represent the number of valid sub-apertures used in a particular summation in $L_{Rk}$ likelihood estimate for the particular target R and offset k. For example, in the case of the Edge Glint Detector $n_z \leq M$ and $n_a$, $n_\tau$, $n_\theta$, $n_s$=M because this detector's $z_R$ values for some sub-apertures were labeled as Not Classifiable or Unusable/Invalid. The distances $d_z$, $d_a$, $d_\tau$, $d_\theta$, $d_s$ represent unweighted likelihood values for each decomposition parameter.

Weights and distance measure definitions and their associated thresholds can vary based on target characteristics and the quality and statistics of the acquired data. Weights determine the sensitivity to given observables and should be set such that as much of the information as possible is used without allowing noisier observables to corrupt likelihood calculations. Distance measure thresholds may be set using both theoretical and acquired data and non-linear distance measure definitions allow the phase noise in the acquired data to be taken into account.

The distance measure d of each observable feature in this exemplary implementation is derived for each detector sub-aperture (j=1, . . . , M) as follows: (1) find the absolute value of the difference $\Delta$ between the acquired (measured or simulated) data (subscript Q) and the specific target-specific detector data (subscript R), (2) compare the calculated absolute difference $\Delta$ (or the acquired data directly) to a pre-determined threshold $\phi$ to generate an interim distance measure D with values in the range [0,1], and (3) finally compute the distance measure d as ln(1−D), where ln(0) is assigned a very small negative value (instead of negative infinity). The following paragraphs describe one way of defining distance measures for the features or observables in this exemplary implementation.

The Cameron Symmetric Scatterer Type Distance Measure can be characterized in terms of its real and imaginary components. Symmetric scatterer type $z_Q$ represents measured or simulated data and $z_R$ represents detector values. The Real Component is represented by:

$$\Delta_{Re(z)} = |Re(z_Q) - Re(z_R)|$$

$$D_{Re(z)} = \Delta_{Re(z)} - \phi_{Re(z)} \quad \text{if } (\Delta_{Re(z)} > \phi_{Re(z)}), \text{ but}$$
$$= 0 \quad \text{if } (\Delta_{Re(z)} \leq \phi_{Re(z)}), \text{ and}$$

$$d_{Re(z)}(Re(z_Q), Re(z_R)) = \log_e(1 - D_{Re(z)}) \equiv \ln(1 - D_{Re(z)}); \text{ and}$$

and the Imaginary Component is represented by:

$$\Delta_{Im(z)} = |Im(z_Q) - Im(z_R)|$$

$$D_{Im(z)} = \Delta_{Im(z)} - \phi_{Im(z)} \quad \text{if } (\Delta_{Im(z)} > \phi_{Im(z)}), \text{ but}$$
$$= 0 \quad \text{if } (\Delta_{Im(z)} \leq \phi_{Im(z)}), \text{ and}$$

$$d_{Im(z)}(Im(z_Q), Im(z_R)) = \log_e(1 - D_{Im(z)}) \equiv \ln(1 - D_{Im(z)}),$$

where the term (1−D) in the natural logarithm function gives a result on the [0,1] interval, where $\log_e(0) \equiv \ln(0)$ is assigned a very small likelihood value instead of negative infinity, i.e., $-\infty$. In this definition, when $\Delta_{Re/Im(z)} \leq \phi_{Re/Im(z)}$, then $D_{Re/Im(z)}$ is set to zero, otherwise, it increases linearly from zero as it exceeds the threshold $\phi_{Re/Im(z)}$. The threshold values $\phi_{Re(z)}$ and $\phi_{Im(z)}$ (corresponding roughly to the noise) may be specified based on both theoretical and experimental data.

The Cameron Maximum Symmetric Normalized Amplitude Distance Measure can be characterized by:

$$D_a = |a_Q - a_R| \quad \text{if } (D_a \leq 1), \text{ but}$$
$$= 1 \quad \text{if } (D_a > 1), \text{ and}$$

$$d_a(a_Q, a_R) = \log_e(1 - D_a) \equiv \ln(1 - D_a),$$

where maximum values are normalized to unity. Note that a local normalization of the acquired Maximum Symmetric Normalized Amplitudes ($a_Q$) is performed prior to the above operation. This secondary normalization is performed for each offset k, where the $a_Q$ value corresponding to the detector's center aperture is used as the normalization value. All other sub-aperture values may also scaled accordingly, with all normalized amplitude values confined to [0,1]. Also, in case of a detector with even numbers of sub-apertures, the average of the two measured or simulated sub-aperture amplitudes corresponding to the two middle detector components may be used.

The Cameron Symmetry Angle Distance Measure can be characterized as:

$$D_T = 0 \quad \text{if } (T < 15°), \text{ but}$$
$$= 1 \quad \text{if } (T \geq 15°), \text{ and}$$

$$d_T(T_Q, T_R) = \log_e(1 - D_T) \equiv \ln(1 - D_T),$$

which implies that the Detector's Cameron Symmetry Angle, $\tau_R$, is fixed at 15° over all sub-apertures. Hence, for $\tau_Q < 15°$, the calculated likelihood value is large, whereas for $\tau_Q \geq 15°$ the calculated likelihood is very small.

The Cameron Reciprocity Angle Distance Measure can be characterized as:

$$D_\theta = 0 \quad \text{if } (\theta < 9°), \text{ but}$$
$$= 1 \quad \text{if } (\theta \geq 9°), \text{ and}$$

$$d_\theta(\theta_Q, \theta_R) = \log_e(1 - D_\theta) \equiv \ln(1 - D_\theta),$$

which implies that the Detector's Cameron Reciprocity Angle, $\theta_R$, is fixed at 9° over all sub-apertures. Hence, for $\theta_Q < 9°$, the calculated likelihood value is large, whereas for $\theta_Q \geq 9°$, the calculated likelihood is very small.

The Cameron Symmetry Weight Distance Measure can be characterized as:

$$D_s = 1 \quad \text{if } (s < 0.5), \text{ but}$$
$$= 0 \quad \text{if } (s \geq 0.5), \text{ and}$$

$$d_s(s_Q, s_R) = \log_e(1 - D_s) \equiv \ln(1 - D_s),$$

which implies that the Detector's Cameron Symmetry Weight, $s_R$, is fixed at 0.5 over all sub-apertures. Hence, for $s_Q \geq 0.5$, the calculated likelihood value is large, whereas for $s_Q < 0.5$, the calculated likelihood is very small.

Given a sub-aperture offset k and a detector for a specific target R, the likelihood for each pixel in the SAR image $L_{Rk}$ is calculated as stated beginning at Section XII as follows: (1) for each detector sub-aperture (j=1, . . . , M), a distance measure is calculated for each feature (or observable) derived from the pixel return; (2) weighted log-likelihood value for each feature is calculated by summing the computed distance measures for that feature over all detector sub-apertures weighted by w; and finally (3) the total likelihood for the pixel $L_{Rk}$ is calculated by summing together the weighted log-likelihoods from each feature.

Distance measure definitions and weights can be modified based on target-specific considerations and measured/simulated data statistics and quality. Also, more than one detector f may be defined for a particular target R. The maximum weighted log-likelihood for a specific target R may then be determined as $L_R = \max_{k,f}\{L_{Rk f}\}|_{k=1,\ldots,|M-N|+1, f=1,\ldots,F}$, where f is the detector for target R and k is sub-aperture offset. The counters are denoted as f=1, 2 ..., F, where F is the total number of detectors used for detecting a specific target R and k=1, ..., |M−N|+1, where |M−N|+1 denotes the total number of detector offsets. The maximum likelihood value $L_R$ is computed for each pixel in the SAR image and represents a measure of how well a pixel's signature (or the return from the dominant scatterer contained in the pixel) conforms to the signature of the specific target of interest. The $L_R$ values may then be compared to a target-specific, lower-bound detection threshold to discard pixels/scatterers with low likelihood values and obtain a list of candidate scatterers whose higher likelyhood values imply that their signatures closely match the signature of the target of interest.

XIII. Exemplary Dihedral Detector Plots with Size Discrimination: Cameron Decomposition Parameter Profiles and their corresponding distance measure definitions for an ideal dihedral are provided in FIGS. 21-29 as functions of Azimuth Angle and dihedral edge size. These parameters show real and imaginary components of symmetric scatterer type z, maximum symmetric normalized amplitude a, symmetry angle τ, reciprocity angle θ, and symmetry weight s. As in previous plots, the dihedral edge size is provided as fractional or whole increments of the wavelength λ and the azimuth angle corresponds to the angle away from broadside (i.e., azimuth angle=0°); or as shown in FIG. 9 the angle away from $\hat{k}$ (negative vertical or −$\hat{z}$ direction) in the plane defined by $\hat{x}$ and $\hat{z}$ axes. The data sets used for these plots were generated using full-wave electromagnetic simulations of a dihedral's complex (phase and magnitude) backscattering response to a 300 MHz transmitted plane-wave (i.e., wavelength λ~1 meter) as function of the dihedral's edge size and azimuth angle.

Figure 21:
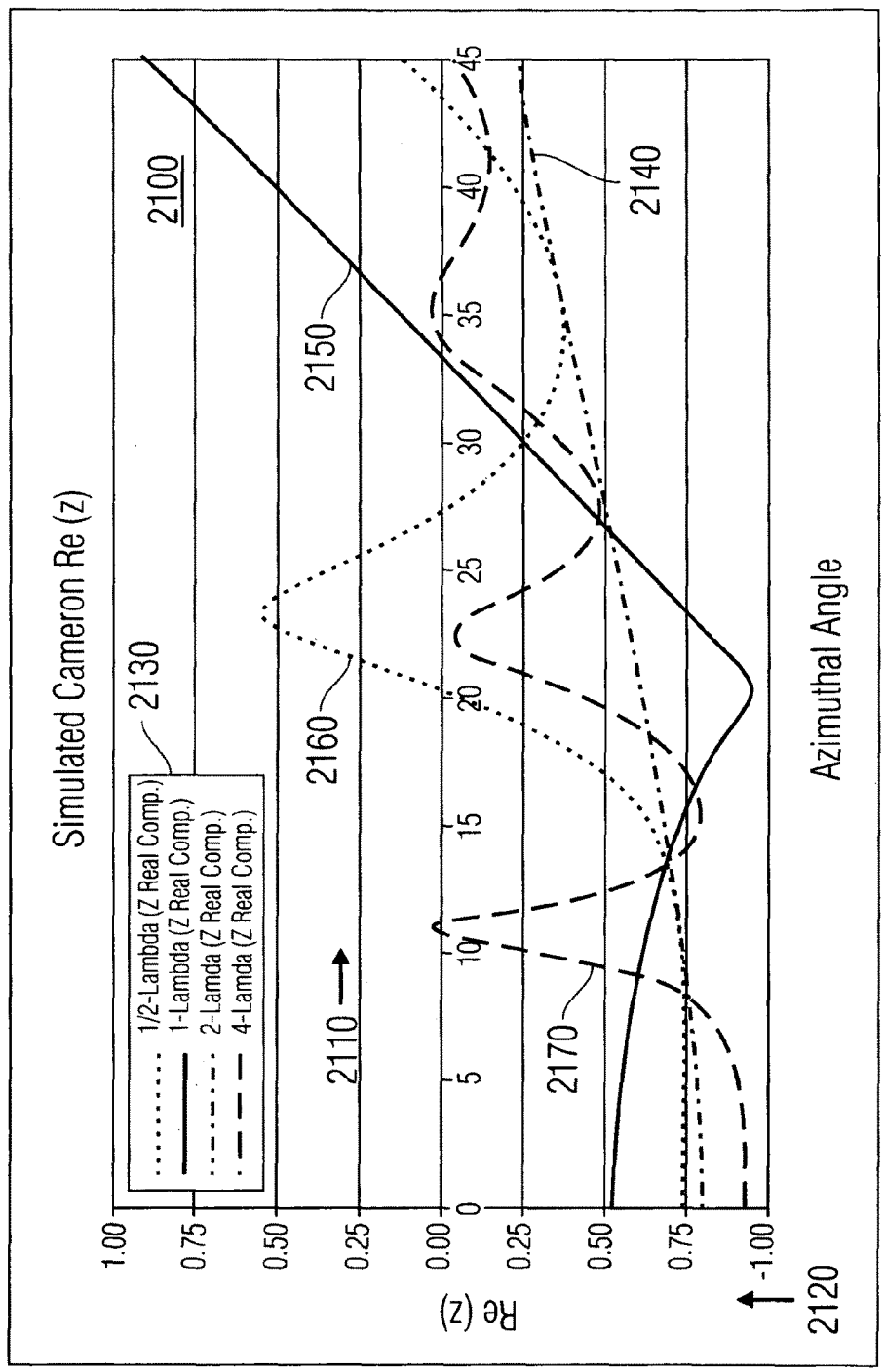
FIG. 21 is a graphical representation of Dihedral simulation results for Real Component of Cameron Symmetric Scatterer Type.
Figure 22:
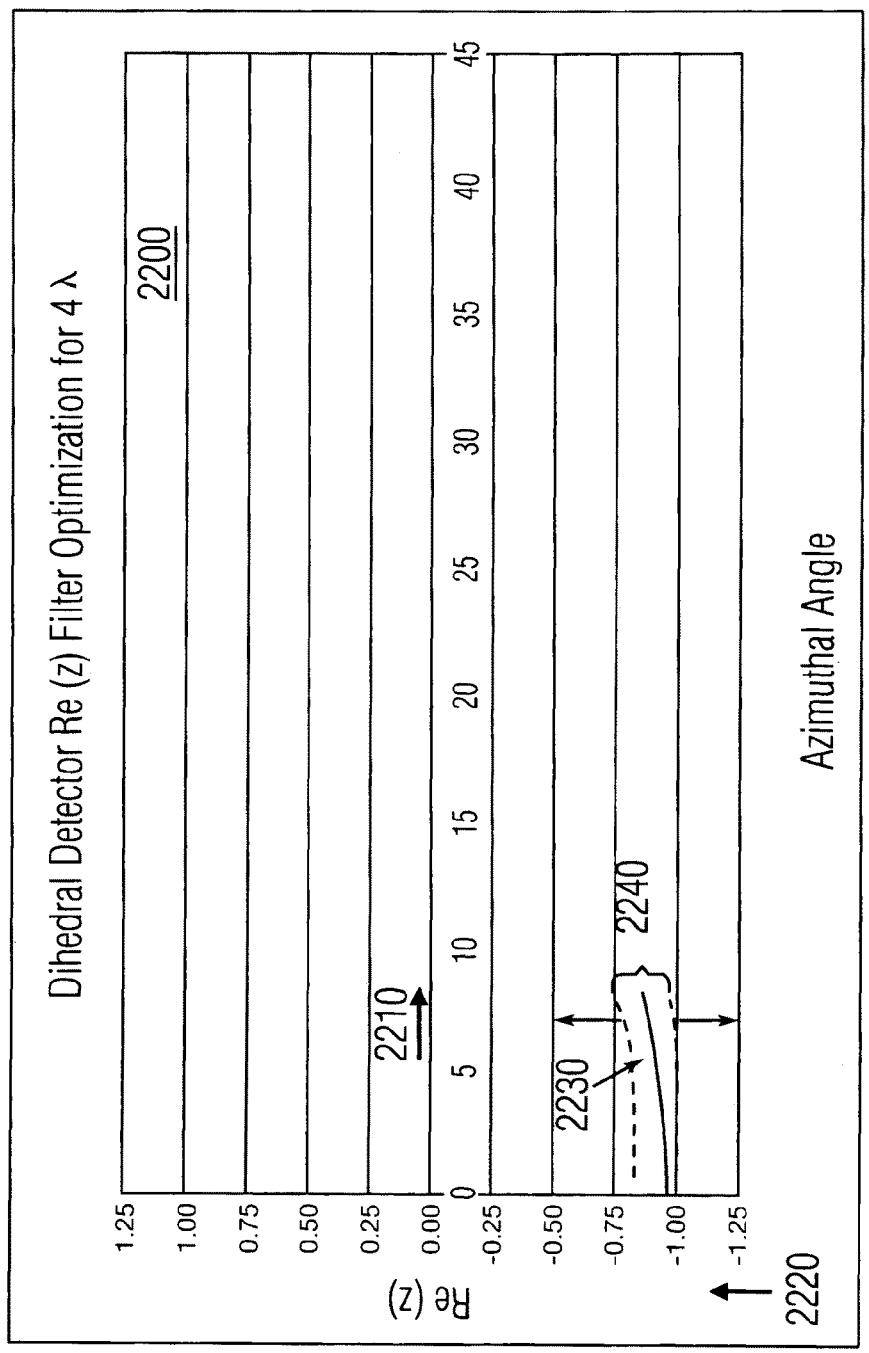
FIG. 22 is a graphical representation of a Dihedral Detector for Real Component of Cameron Symmetric Scatterer Type optimized for a 4λ edge size.

FIG. 21 shows a graph 2100 that features the Real Component of the Measured or Simulated Cameron Symmetric Scatterer Type, $Re(z_Q)$, in relation to Azimuth Angle for ideal dihedrals of different sizes. The abscissa 2110 represents azimuth angle in degrees, while the ordinate 2120 represents $Re(z_Q)$, the real component of the type $z_Q$. The legend 2130 identifies simulation curves for dihedral sizes (in terms of wavelength), including ½λ as 2140, λ as 2150, 2λ as 2160 and 4λ as 2170. The significant variation between the $Re(z_Q)$ responses of different dihedral sizes may be exploited to design the response of the dihedral detector's Real Component of the Symmetric Scatterer Type, $Re(z_R)$, which may be optimized to detect (or differentiate between) specific dihedral sizes. FIG. 22 shows a graph 2200 of an example dihedral detector definition for the Real Component of the Cameron Symmetric Scatterer Type, $Re(z_R)$, in relation to Azimuth Angle. The abscissa 2210 represents azimuth angle in degrees, while the ordinate 2220 represents $Re(z_R)$, the real component of the type $z_R$. The curve 2230 represents $Re(z_R)$ values over a subset of azimuth angles close to broadside (i.e., azimuth angle=0), optimized to detect dihedrals with edge sizes close to 4λ. The tolerance range $\phi_{Re(z)}$ is specified by the bracket 2240. In this example, for azimuth angles close to broadside, $Re(z_R)$ curve 2230 exactly matches the simulated $Re(z_Q)$ curve 2170 in FIG. 21 for a dihedral size of 4λ. The chosen tolerance range $\phi_{Re(z)}$ then assures that acquired returns from dihedral objects with edge sizes close to 4λ are assigned high likelihoods for the Re(z) feature.

Figure 23:
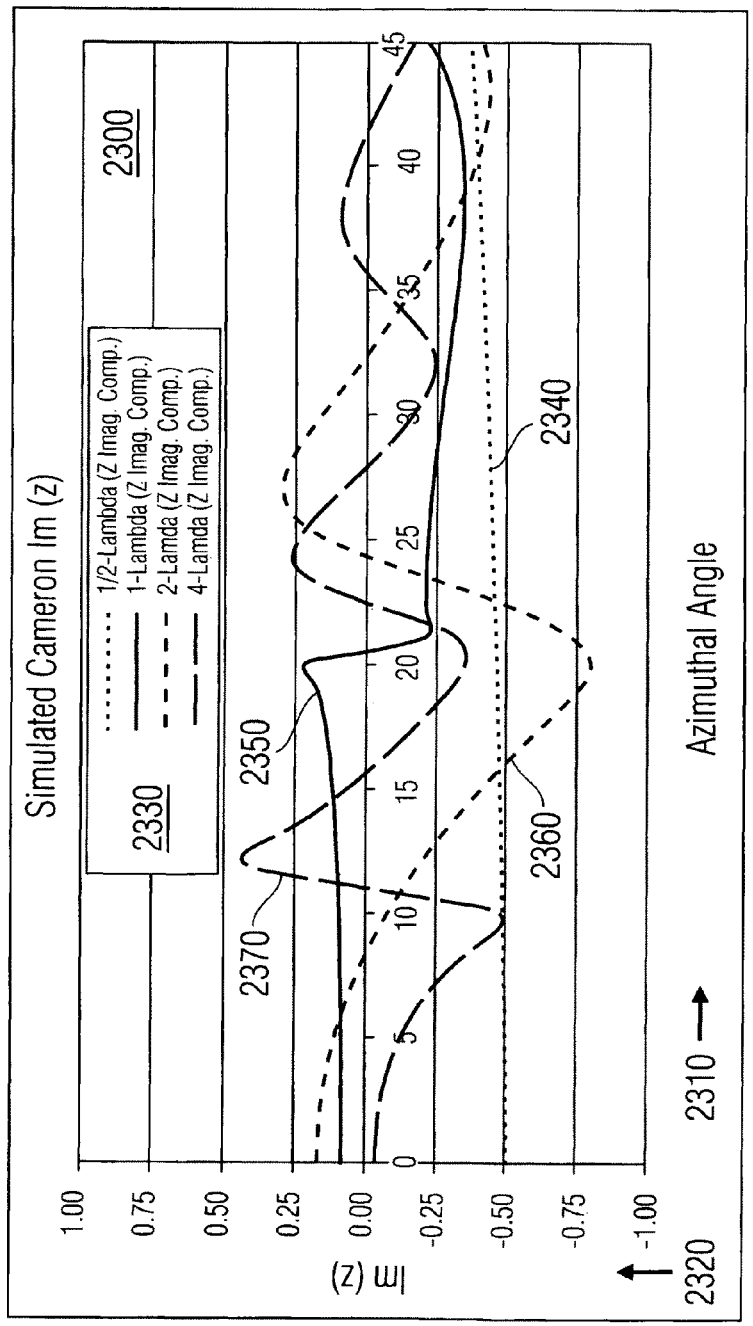
FIG. 23 is a graphical representation of Dihedral Simulation results for Imaginary Component of Cameron Symmetric Scatterer Type.
Figure 24:
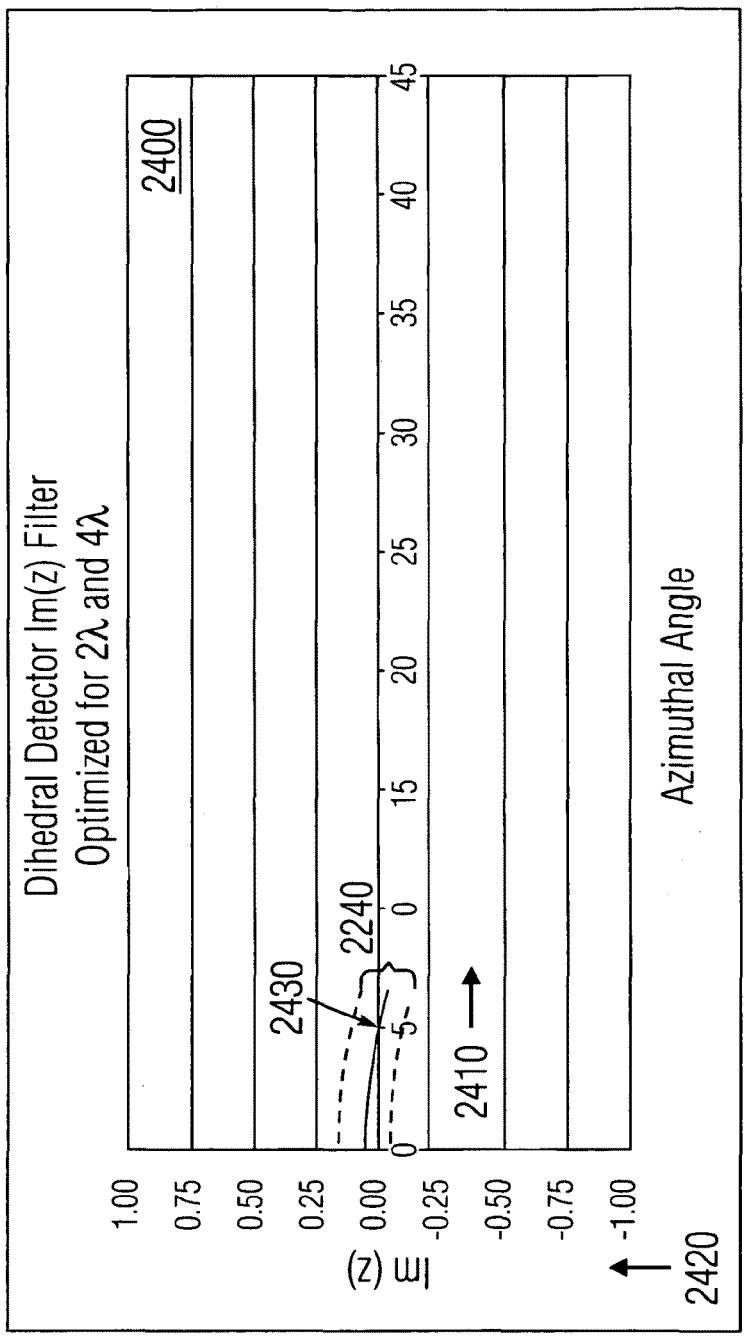
FIG. 24 is a graphical representation of a Dihedral Detector for Imaginary Component of Cameron Symmetric Scatterer Type optimized for 2λ to 4λ edge sizes.

FIG. 23 shows a graph 2300 that features the Imaginary Component of the Simulated Cameron Symmetric. Scatterer, $Im(z_Q)$, in relation to Azimuth Angle for ideal dihedrals of different sizes. The abscissa 2310 represents azimuth angle in degrees, while the ordinate 2320 represents $Im(z_Q)$, the imaginary component of the type $z_Q$. The legend 2330 identifies simulation curves for dihedral sizes (in terms of wavelength), including ½λ as 2340, λ as 2350, 2λ as 2360 and 4λ as 2370. Again, the significant variation between the $Im(z_Q)$ responses of different dihedral sizes may be exploited to design the response of the dihedral detector's Imaginary Component of the Symmetric Scatterer Type, $Im(z_R)$, which may be optimized to detect (or differentiate between) specific dihedral sizes. FIG. 24 shows a graph 2400 of an example dihedral detector definition for the Imaginary Component of the Cameron Symmetric Scatterer Type, $Im(z_R)$, in relation to Azimuth Angle. The abscissa 2410 represents azimuth angle in degrees, while, the ordinate 2420 represents $Im(z_R)$, the imaginary component of the type $z_R$. The curve 2430 represents $Im(z_R)$ values over a subset of azimuth angles close to broadside, optimized to detect dihedrals with edge sizes ranging from about 2λ to 4λ. The tolerance range $\phi_{Im(z)}$ is specified by the bracket 2440. In this example, for azimuth angles close to broadside, $Im(z_R)$ curve 2430 has the same trend/shape as the simulated $Im(z_Q)$ curves 2360 and 2370 in FIG. 23 for dihedral sizes of 2λ and 4λ, respectively. The chosen tolerance range $\phi_{Im(z)}$ then assures that acquired returns from dihedral objects with edge sizes ranging from about 2λ to 4λ are assigned high likelihoods for the Im(z) feature or observable.

Figure 25:
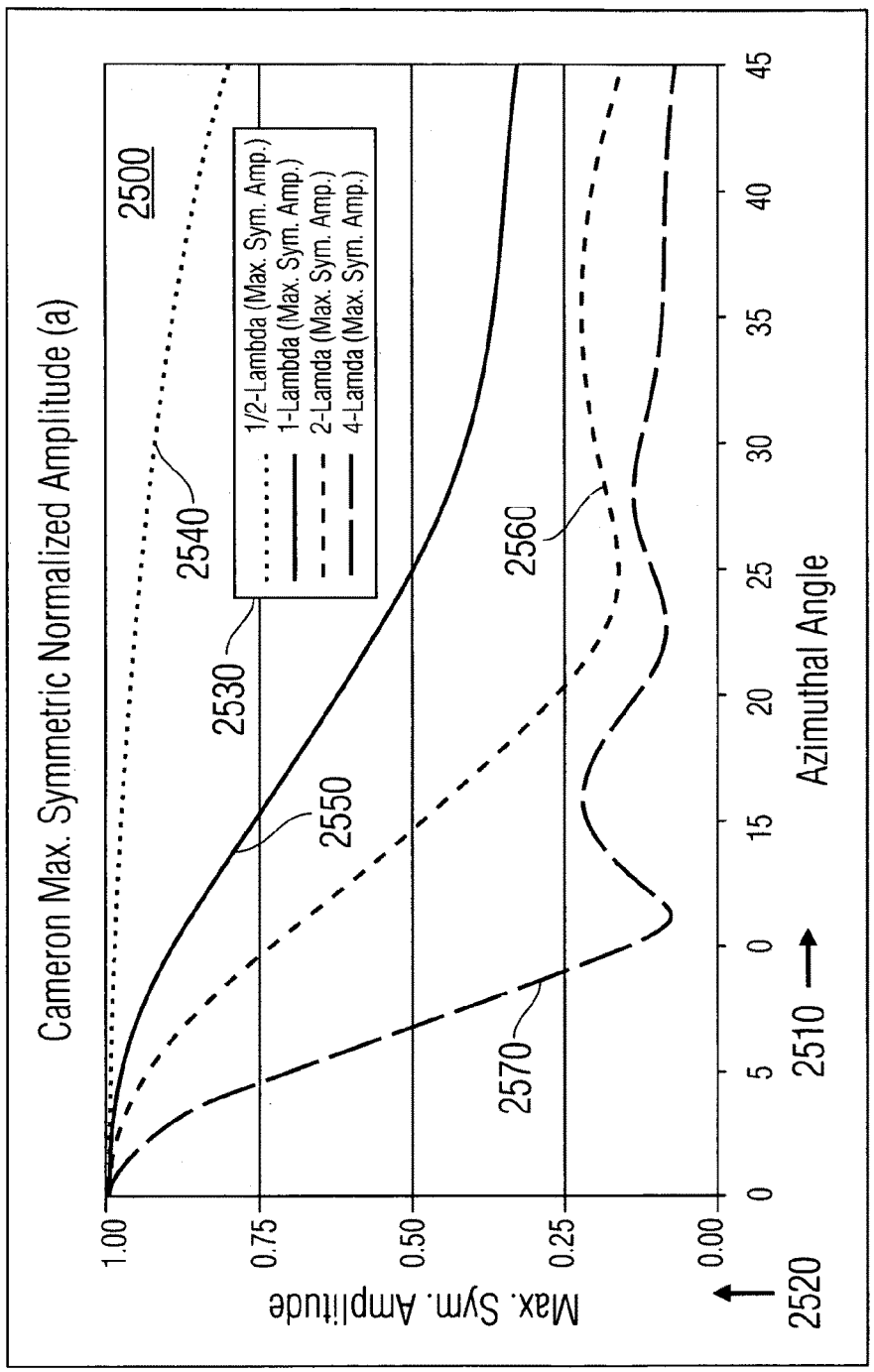
FIG. 25 is a graphical representation of Dihedral Simulation results for Cameron Maximum Symmetric Normalized Amplitude.
Figure 26:
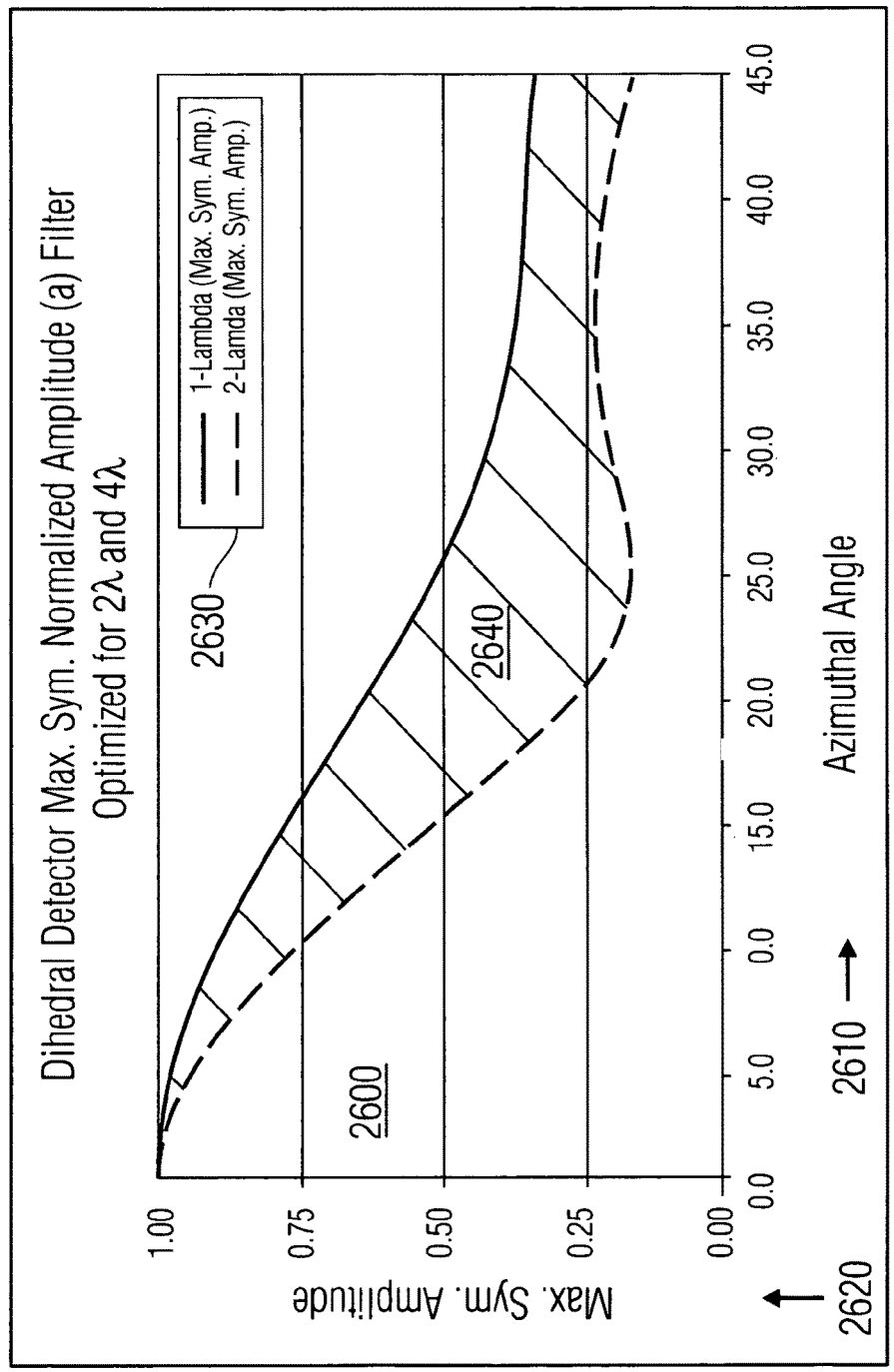
FIG. 26 is a graphical representation of a Dihedral Detector for Maximum Symmetric Normalized Amplitude optimized for 1λ to 2λ edge sizes.

FIG. 25 shows a graph 2500 that features simulated Cameron Maximum Symmetric Normalized Amplitude, $a_Q$, in relation to Azimuth Angle for ideal dihedrals of different sizes. The abscissa 2510 represents azimuth angle in degrees, while the ordinate 2520 represents normalized amplitude $a_Q$. The legend 2530 identifies simulation curves for dihedral sizes (in terms of wavelength), including ½λ as 2540, λ as 2550, 2λ as 2560 and 4λ as 2570. The variations in the main lobe responses of $a_Q$ for different dihedral sizes may be exploited to design the response of the dihedral detector's Maximum Symmetric Normalized Amplitude, $a_R$, which again may be optimized to detect (or differentiate between) specific dihedral sizes. FIG. 26 shows a graph 2600 that features an example of dihedral detector definition for the Cameron Maximum Symmetric Normalized Amplitude, $a_R$, in relation to Azimuth Angle. The abscissa 2610 represents azimuth angle in degrees, while the ordinate 2620 represents $a_R$, normalized amplitude. The legend 2630 identifies a hash region 2640 bounded by simulated $a_Q$ curves 2550 and 2560 in FIG. 25 for dihedral sizes of λ and 2λ, respectively. The distance measure in this example may be defined such that the hash region represents a no-penalty zone, which implies that returns from dihedral objects with edge sizes ranging from about λ to 2λ are assigned high likelihoods. Hence, for $a_Q$ values within the no-penalty zone, the pixel is assigned the highest likelihood for the Maximum Symmetric Normalized Amplitude feature. Otherwise the pixel is assigned a likelihood that decreases linearly from the maximum value depending on the extent that the $a_Q$ value lands beyond this zone.

Figure 27:
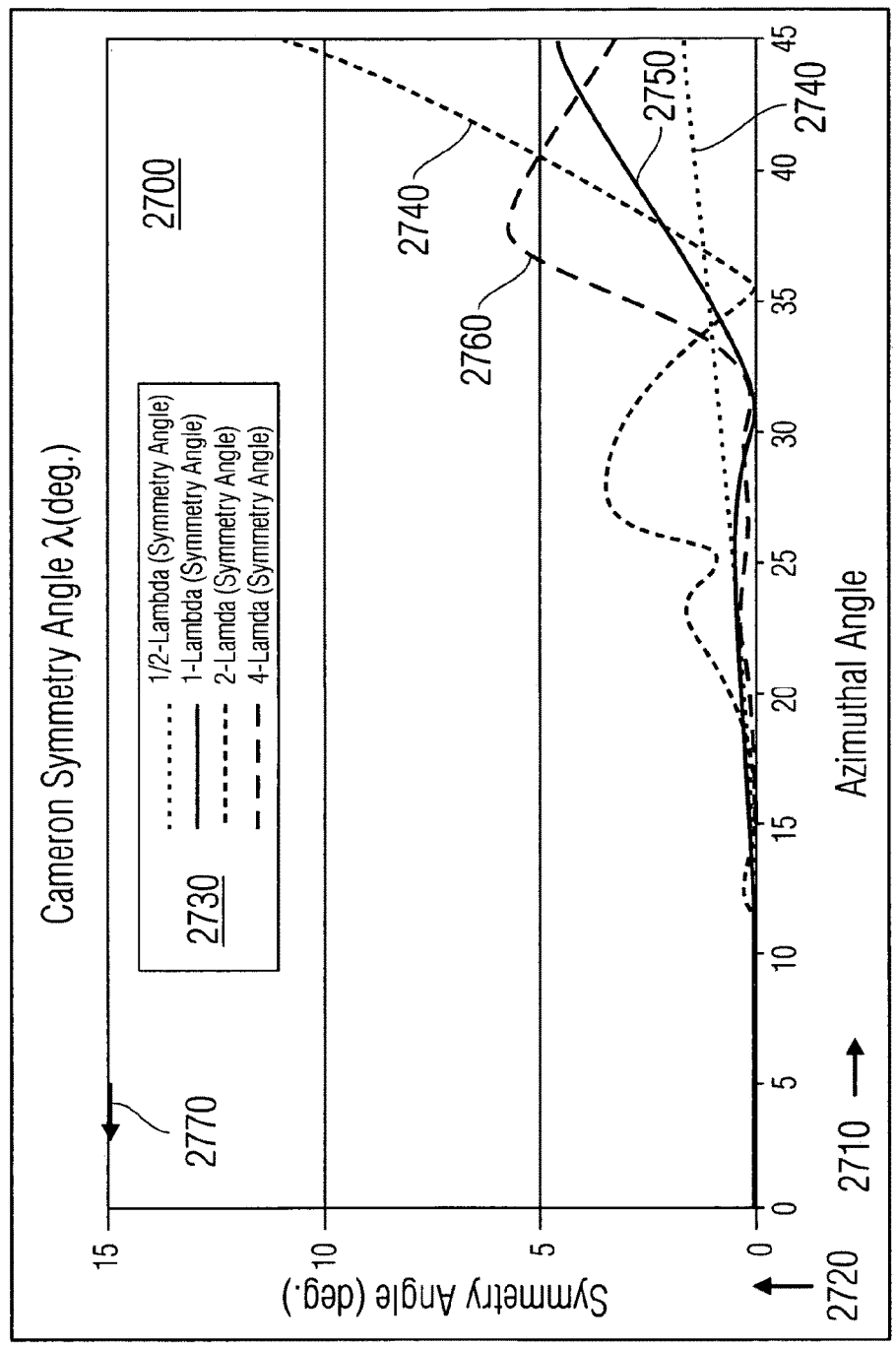
FIG. 27 is a graphical representation of Dihedral Simulation results for Cameron Symmetry Angle.

FIG. 27 shows a graph 2700 that features the simulated Cameron Symmetry Angle in relation to Azimuth Angle $\tau_Q$ for ideal dihedrals of different sizes. The abscissa 2710 represents azimuth angle in degrees, while the ordinate 2720 represents $\tau_Q$, symmetry angle r in degrees. The legend 2730 identifies simulation curves for dihedral sizes (in terms of wavelength), including ½λ as 2740, λ as 2750, 2λ as 2760 and 4λ as 2770. The dihedral detector's Cameron Symmetry Angle $\tau_R$ is fixed at 15° as denoted by arrow 2770. This graph 2700 demonstrates that fixing the value of $\tau_R$ at 15° as shown before in detector definitions, appears to be reasonable; because all simulated $\tau_Q$ values at different dihedral sizes descend well below this threshold (majority of $\tau_Q$ values decrease to below 5°). Hence, for $\tau_Q<15°$, the calculated likelihood value for the Symmetry Angle may be large, whereas for $\tau_Q\geq15°$ the calculated likelihood value is very small.

Figure 28:
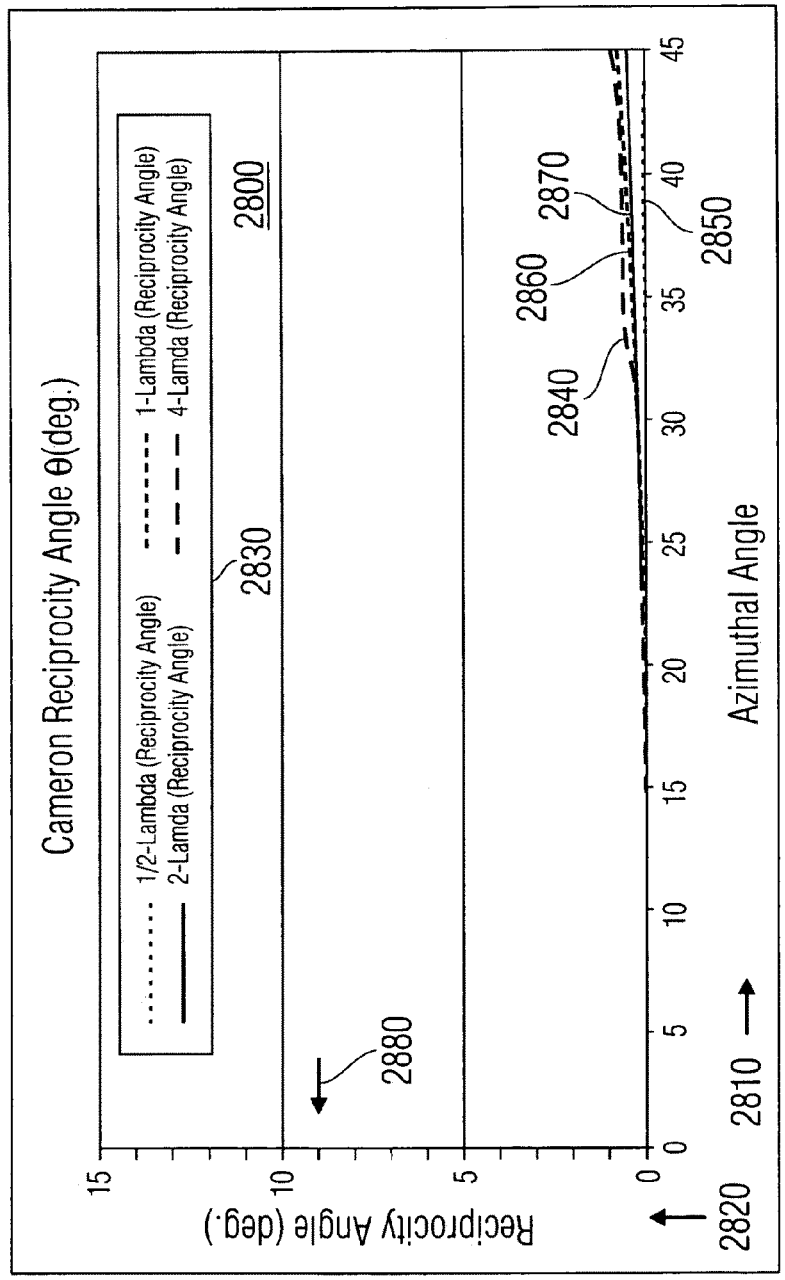
FIG. 28 is a graphical representation of Dihedral Simulation results for Cameron Reciprocity Angle.

FIG. 28 shows a graph 2800 that features the simulated Cameron Reciprocity Angle $\theta_Q$ in relation to Azimuth Angle for ideal dihedrals of different sizes. The abscissa 2810 represents azimuth angle in degrees, while the ordinate 2820 represents $\theta_Q$, reciprocity angle $\theta$ in degrees. The legend 2830 identifies simulation curves for dihedral sizes (in terms of wavelength), including ½λ as 2840, λ as 2850, 2λ as 2860 and 4λ as 2870. The dihedral detector's Cameron Reciprocity Angle $\theta_R$ is fixed at 9° as denoted by arrow 2880. This graph demonstrates that fixing the value of $\theta_R$ at 9° as shown before in detector definitions, appears to be reasonable, because all simulated $\theta_Q$ values at different dihedral sizes descend well below this threshold (majority of $\theta_Q$ values decrease to below 1°). Thus, for $\theta_Q<9°$, the calculated likelihood value for the Reciprocity Angle may be large, whereas for $\theta_Q\geq9°$ the calculated likelihood value is very small.

Figure 29:
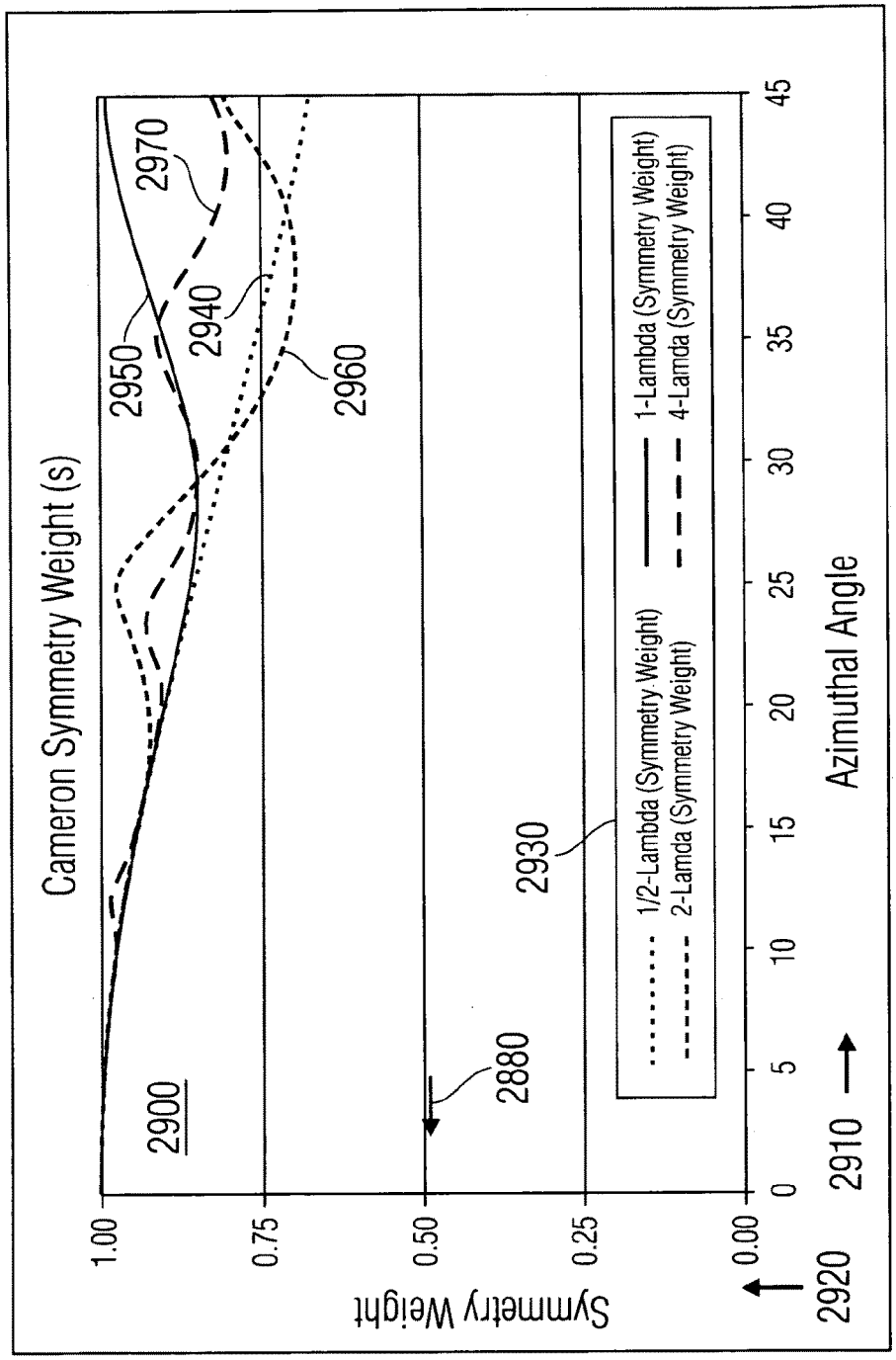
FIG. 29 is a graphical representation of Dihedral Simulation results for Cameron Symmetry Weight.

FIG. 29 shows a graph 2900 that features Cameron Symmetry Weight $s_Q$ in relation to Azimuth Angle for ideal dihedrals of different sizes. The abscissa 2910 represents azimuth angle in degrees, while the ordinate 2920 represents symmetry weight $s_Q$. The legend 2930 identifies curves for dihedral sizes (in terms of wavelength), including ½λ as 2940, λ as 2950, 2λ as 2960 and 4λ as 2970. The dihedral detector's Cameron Symmetry Weight $s_R$ is fixed at 0.5 value as denoted by arrow 2980. This graph 2900 demonstrates that fixing the value of $s_R$ at 0.5 as shown before in detector definitions, appears to be reasonable, because all simulated $s_Q$ values at different dihedral sizes reach well above this threshold (majority of $s_Q$ values are above 0.75). Hence, for $s_Q\geq0.5$, the calculated likelihood value for the Symmetry Weight may be large, whereas for $s_Q<0.5$ the calculated likelihood value is very small.

XIV. Single Scattering Center Phase History Reconstruction: A key aspect of the Polarimetric SAR signatures approach described herein is to use the change in the observables/features (normally derived using a polarimetric decomposition technique) across the chirp (or range) and/or across the synthetic aperture (or cross-range/azimuth) in the detection process. As explained via the exemplary embodiments herein, one method of implementing this approach is to form a sequence of complex sub-aperture images in range and/or cross-range from the Single-Look-Complex (SLC) image of each polarimetric SAR channel and compute the decomposition observables/features separately for each sub-aperture image. This sub-aperture based method has the advantage of being expedient (e.g., fast and easy) to implement, but has two main disadvantages that in some cases may affect the ability to detect and discriminate signatures. The first disadvantage involves trading spatial domain resolution for time domain resolution. In other words, spatial domain resolution is sacrificed in the process of obtaining additional information about the temporal changes in the signal. As an example, a complex image with one-meter cross-range resolution divided into four sub-apertures (with no spectral overlap in the frequency domain) yields four lower resolution sub-aperture images, each having a cross-range resolution of four meters. To the extent that bandwidth or synthetic aperture can be spared, the lower spatial resolution of the sub-aperture images, however, might not actually present a disadvantage. The second disadvantage is that sub-aperture processing results in a very coarse temporal sampling of the observables or features used in signature detections as well as in the averaging of the observable values.

Although these disadvantages do not prevent the useful processing of polarimetric SAR data into signature detections, the desire to overcome these limitations has led to the development of an improved method for extracting signatures as described herein. This improved method is useful upon making a potential detection, so the sub-aperture based signatures approach can serve as a pre-screener (with somewhat looser detection settings than before). With this potential detection, a variation of Rihaczek's approach, described below, may be employed to analyze the radar return signals in manners unique to conventional treatments.

The exemplary steps include performing the following steps, for each of the polarimetric SAR Single-Look Complex images (i.e., $SLC_{HH}$, $SLC_{HV}$, $SLC_{VH}$, $SLC_{VV}$ or the available subset):

(i) Fourier Transform the complex image;

(ii) Reduce the dimensions of the frequency domain image as required to remove any zero padding (typically about 20% to meet the Nyquist requirement);

(iii) If the data has not been previously windowed, apply a suitable window function (e.g., Hanning);

(iv) Inverse Fourier Transform to the original (complex) spatial domain;

(v) Extract one-dimensional cuts in range and cross-range through each potential signature detection for analysis. The cuts may preferably be 16 pixels long, approximately centered on the peak of interest.

Subsequently, for each one-dimensional cut, the following steps can be performed:

(vi) On each side of the peak of interest in the one dimensional cut, find the inflection points and zero every bin outside the inflection points;

(vii) Fourier Transform the result, zero pad by a factor of eight, and inverse Fourier Transform, producing an interpolated time domain version of the original peak;

(viii) Add a factor of eight zero padding to the result of step (vi), and Fourier Transform, producing an interpolated frequency domain representation of the peak of interest;

(ix) Divide the result of step (viii) by the window function applied earlier (step iii) to obtain a close approximation to the actual phase history of the scattering center across the synthetic aperture (for a cut in cross-range) or across the chirp (for a cut in range).

Figure 30:
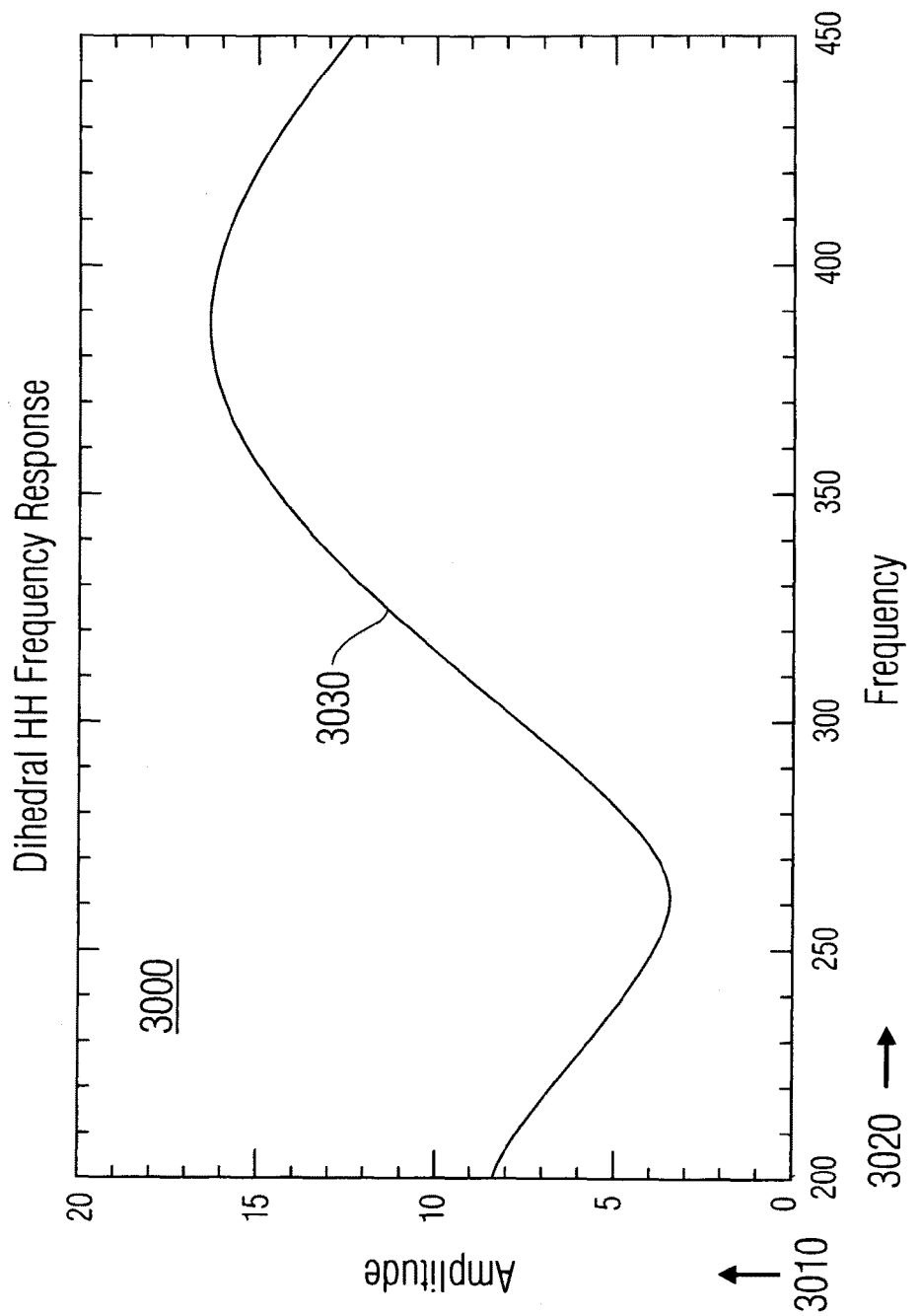
FIG. 30 is a graph of the HH frequency domain response of a dihedral to a Linear FM Chirp in the Mie region after performing range compression.

The graphs in FIGS. 30-34 illustrate the expected amplitude response of an ideal dihedral in both time and frequency domains at different stages of performing steps (i) through (ix). The data samples for these plots were synthetically generated using full-wave electromagnetic simulations, which recorded the complex (phase and magnitude) backscattering response of an ideal dihedral with an edge size equal to one meter, positioned at broadside with respect to the radar transmitter/receiver (e.g., in a monostatic system) for a transmission frequency interval ranging from linearly from 200 to 450 MHz (i.e., a frequency ramp or "chirp"). The line of sight distance between the dihedral and the radar was set at 100 meters to ensure a far-range response and the radiated signal was a plane-wave. The generated data points hence represent the frequency domain response of the dihedral to a chirp (or more precisely to a Linear Frequency-Modulated (FM) Chirp waveform after the application of range-compression) in the Mie region, a region in which the object size (in this case the dihedral's edge size) is comparable to, the radar wavelength: FIG. 30 presents a graph 3000 of the simulation results, which is an example of the expected response in step (ii). The abscissa 3010 represents frequencies in cycles-per-second (Hz), while the ordinate 3020 represents amplitudes. Plotted curve 3030 represents an ideal dihedral's HH amplitude response in the frequency domain to a linear FM chirp waveform after range compression. The amplitude response of the dihedral is non-stationary across the chirp in this case, and this variation can be exploited in the signature method described herein to discriminate the object's shape and size.

As a further observation, the dihedral response shown in FIG. 30 represents an example of a scattering center whose response is non-stationary in phase and in amplitude across the chirp. Variations in both the amplitude and phase responses defocus the return, causing the signal to progressively expand (i.e., spread out) in the spatial domain image with increasing non-stationary. The amplitude variation observed in graph 3000 across the chirp along exemplifies the raw signal being utilized by the detectors in the signature method described herein. The response curve 3030 can be adequately sampled to provide the signature detector with a more accurate representation of the dihedral's amplitude response in time than can be obtained using sub-aperture processing.

Figure 31:
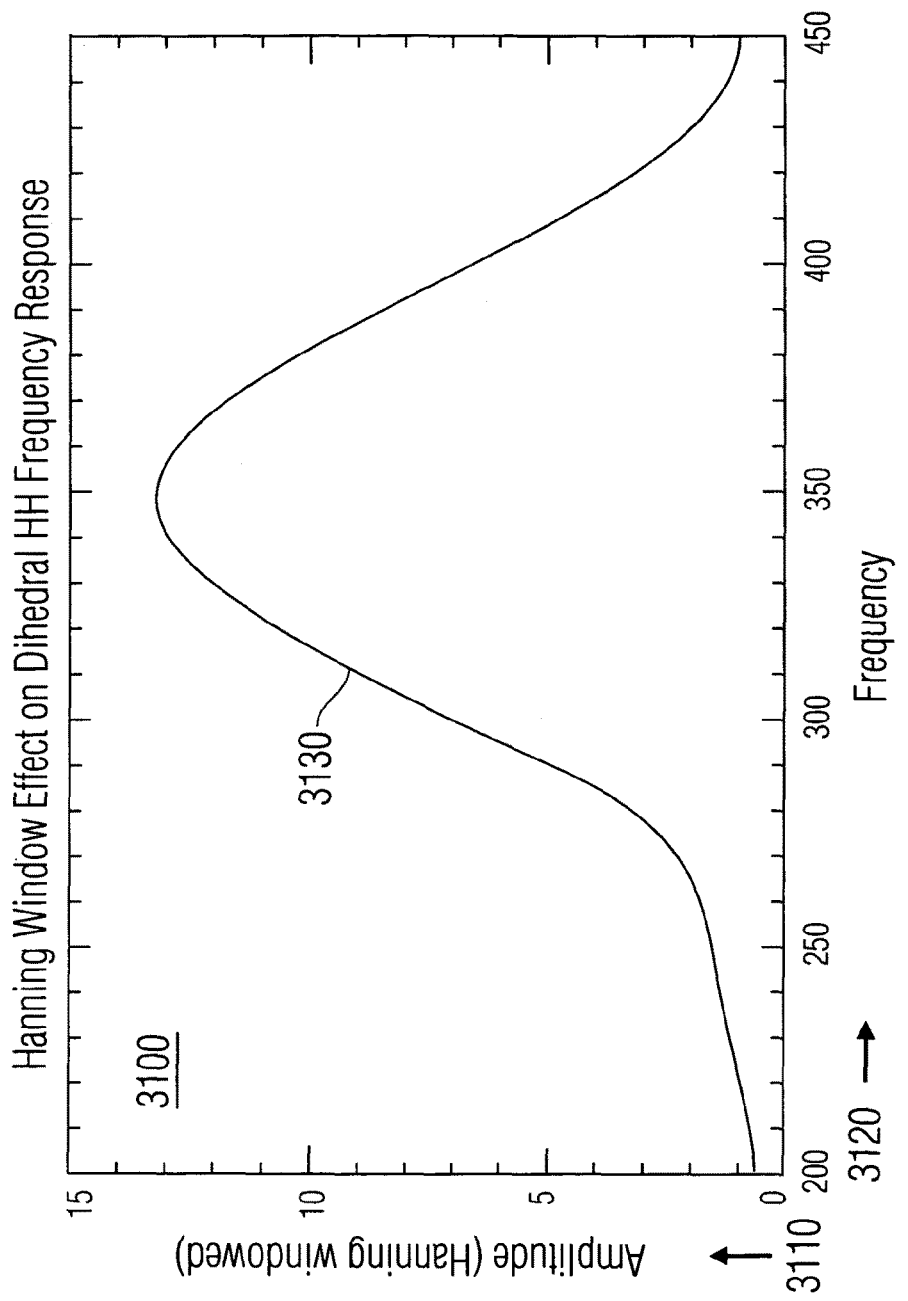
FIG. 31 is a graph of the Hanning window effect on the dihedral frequency domain response shown in FIG. 30.
Figure 32:
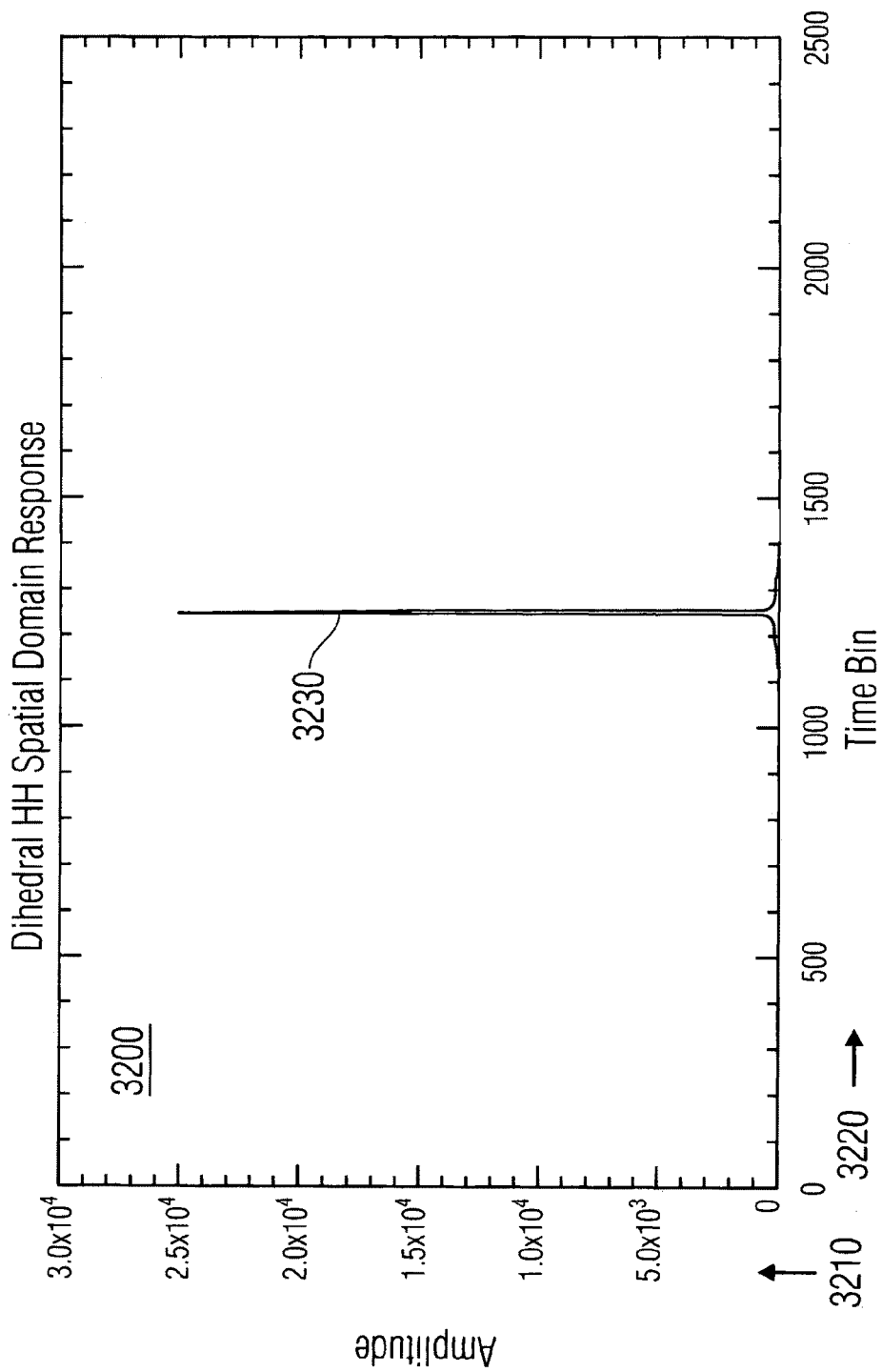
FIG. 32 is a graph of the HH spatial domain response of a dihedral to a Linear FM Chirp in the Mie region after performing range compression.

An example of the expected response in step (iii) is shown in FIG. 31. This figure presents a graph 3100 showing the effect of applying a Hanning Window to the amplitude response curve 3030 shown in FIG. 30. The abscissa 3110 represents frequencies in Hz, while the ordinate 3120 represents Hanning-windowed amplitudes. Curve 3130 represents the Hanning-windowed HH amplitude response of an ideal dihedral in the frequency domain. An example of an expected response in step (i) is shown in FIG. 32. This figure shows a spatial (or time) domain amplitude response graph 3200 which was derived by inverse Fourier transforming the response curve 3030 shown in FIG. 30. The abscissa 3210 represents time bins, while the ordinate 3220 represents amplitudes. Curve 3230 then represents the ideal dihedral's HH amplitude response in the spatial domain to a linear FM chirp waveform after range compression.

Figure 33:
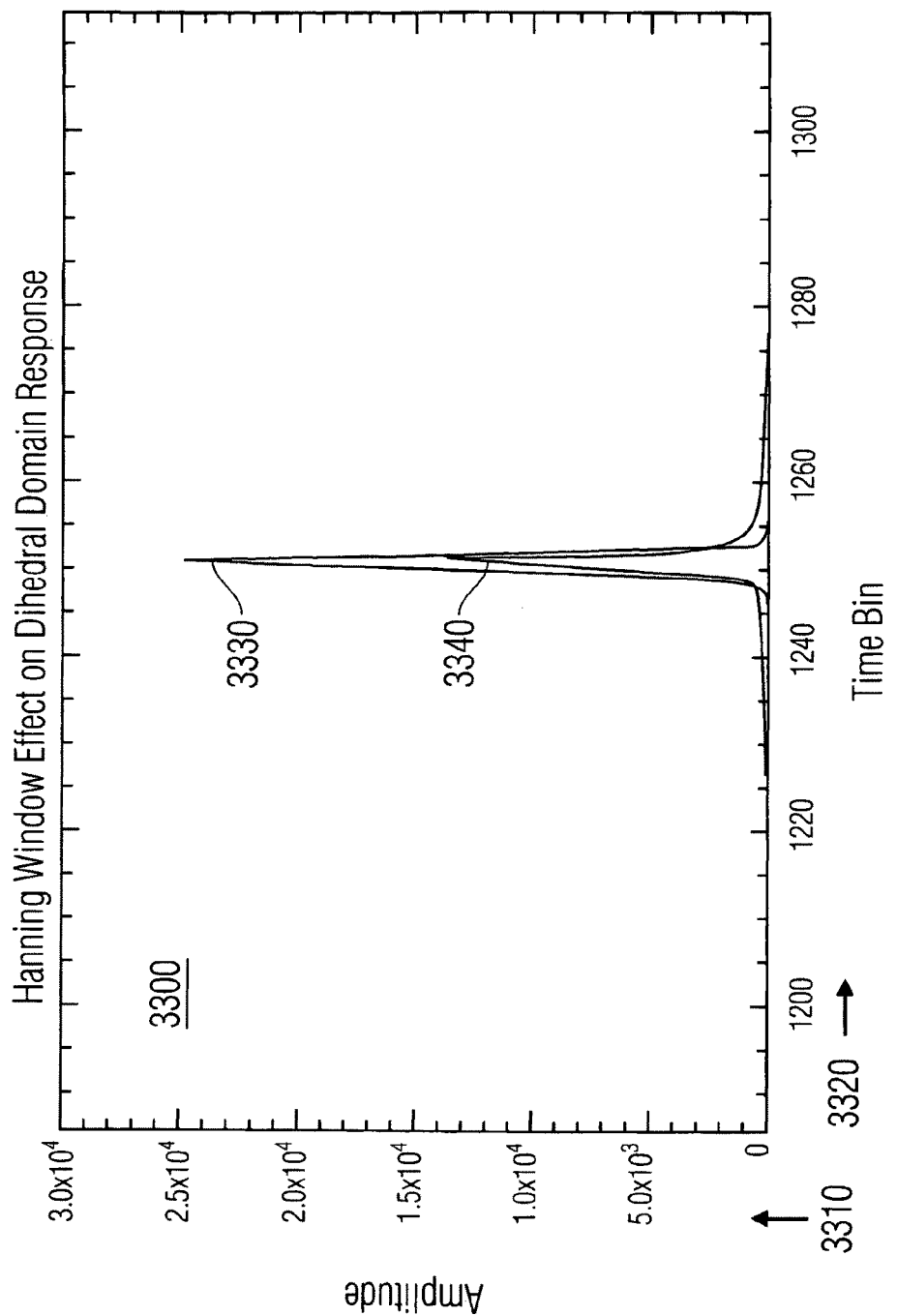
FIG. 33 is a graph of the Hanning window effect on the dihedral spatial domain response shown in FIG. 30.

An example of an expected response in step (iv) is shown in FIG. 33. In this case, step (v) is also included, as the dihedral results are derived only at broadside (i.e., at azimuth angle of zero only or one cross-range cut). FIG. 33 shows a spatial domain amplitude response graph 3300, where the abscissa 3310 represents time bins, while the ordinate 3320 represents amplitudes. Note that the range of the abscissa has been narrowed in this figure to show the response curves in more detail. Curve 3330 is equivalent to curve 3230 in FIG. 32, included in this figure for comparison purposes. Curve 3340, derived by inverse Fourier transforming the response curve 3130 shown in FIG. 31, represents the Hanning-windowed HH amplitude response of an ideal dihedral in the spatial domain. Comparing response curves 3330 and 3340, the application of a Hanning window in the frequency domain results in the widening of the main lobe and lowering the peak of the amplitude response in the spatial domain.

Figure 34:
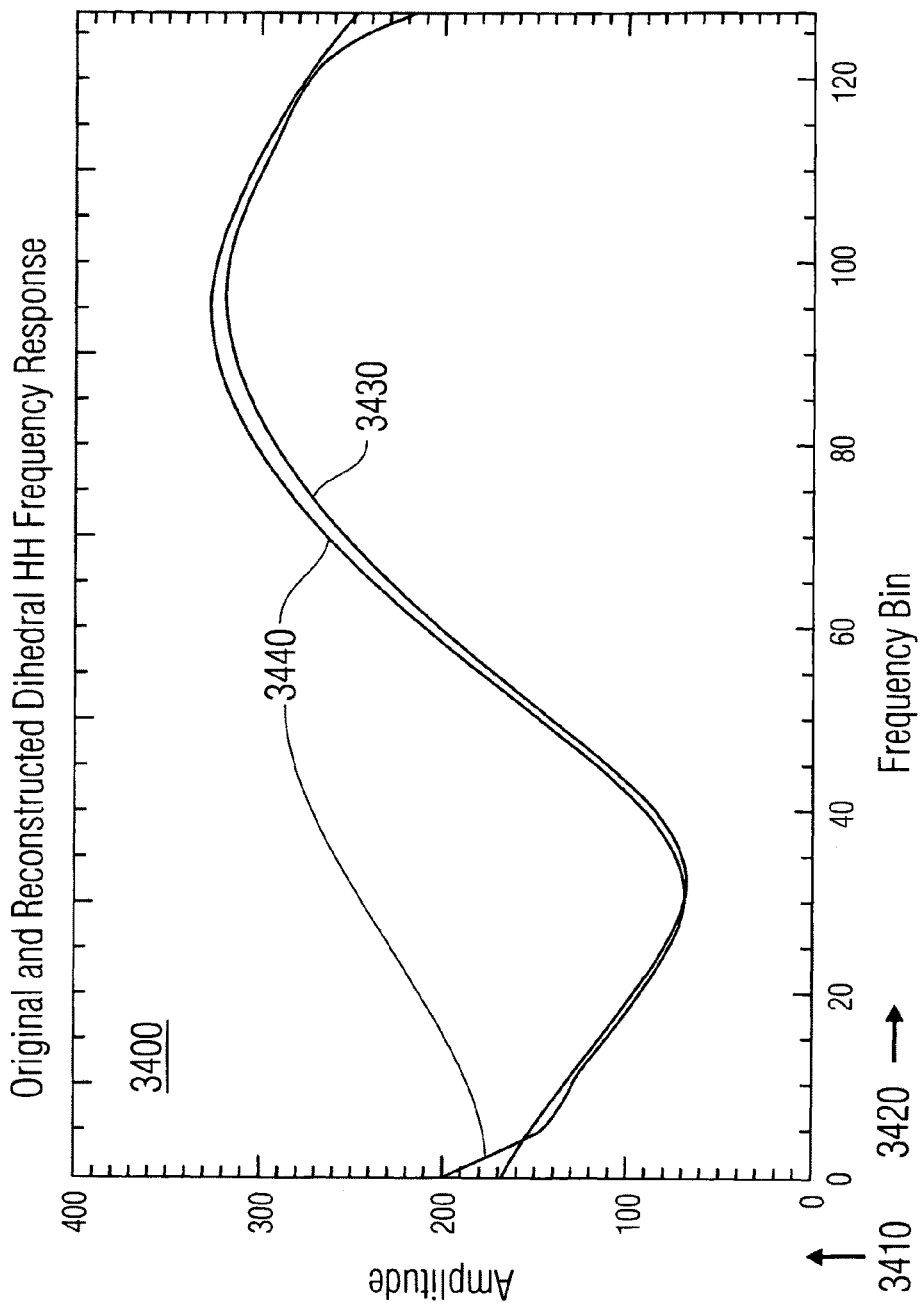
FIG. 34 is a graph comparing the original and reconstructed frequency spectrums for the dihedral.

Performing steps (vi), (viii) and (ix) on response curve 3340, the original frequency domain amplitude response can be closely reconstituted without loss of spatial resolution. FIG. 34 shows a graph 3400 comparing the reconstituted and original frequency plots. The abscissa 3410 represents frequencies in Hz, while the ordinate 3420 represents amplitudes. Curve 3430 is the original frequency spectrum, equivalent to curve 3030 in FIG. 30, included in this plot for comparison purposes. Curve 3440 is the reconstituted spectrum following the described approach. A comparison of curves 3430 and 3440 reveals that curve 3440 presents a useful estimate of the original frequency response. This important result shows the possibility of recovery of interpolated versions of responses across the chirp and/or synthetic aperture using this reconstruction method, without any loss in spatial domain resolution as would be the case with sub-aperture processing. Furthermore, as opposed to the coarse sampling achieved using sub-aperture processing, the variations in the amplitude response shown in graph 3000 (in FIG. 30) can be reasonably sampled at twenty or more locations to provide a more accurate and refined characterization of the response in time for use in the signature approach, as explained via the exemplary embodiments. This level of sampling, can be obtained without degrading spatial resolution and thereby adversely influencing the results.

XV. Implications: A sub-aperture image may be formed by extracting a complex image, Fourier transforming the image, zeroing all but a subset of the spectrum, and inverse Fourier transforming the result. However, the spectrum cannot then be used to recover signature information because the spectrum is a linear superposition of all the returns from all the scattering centers in the original complex image. By operating preferably in the image domain the amplitude and phase information can be recovered from the scattering center of interest. The approach of A. W. Rihaczek in *Radar Resolution and Complex-Image Analysis*, Artech House© 1996, provides only an estimate of the frequency response of the scattering center of interest. However, performing a Fourier transform on a complex SAR image (with increasing range in the down direction), yields vertical frequency bins that correspond to the wavenumber responses to the different frequencies contained in the chirp. By contrast, the horizontal bins contain the wavenumber responses to the different azimuths sampled (by the individual pulses) across the synthetic aperture. In the case of a single scattering center, applying Rihaczek's approach results in the wavenumber responses of the scattering center as a function of azimuth and/or chirp frequency. Most importantly, these responses can be sampled as densely (i.e., often within a sampling interval) as desired. Each frequency bin corresponds to the plane-wave response of the scattering center. In the case of a range cut, the response is integrated over azimuths, while in the case of a cross-range cut, the response is integrated over the chirp frequencies. The signature approach, as explained via the exemplary embodiments, uses the change in the polarimetric amplitudes and phases across the synthetic aperture and the chirp as well. This reconstruction approach allows recovery of accurate estimates of the plane-wave responses of the scattering center as a function of the azimuth and/or chirp frequency as illustrated in FIG. 34.

XVI. Limitations and Information Theory: The accurate recovery of the plane-wave responses is based on separation of the response (peak) of the desired scattering center from the signal produced by other scattering centers. The signatures approach described via the exemplary embodiments herein prefers that the scattering center of interest be the dominant source of return energy in the resolution cell. The reconstruction approach allows the use of full resolution rather than reduced resolution (as is the case with the sub-aperture approach), where the probability of having multiple scattering centers within a resolution cell is much higher.

To address the information content of this reconstruction approach, a pure point response can be used as a limiting example, representing a sin c function in the original complex image. As an aside, a normalized sin c function for digital signal processing and communication theory may be expressed as $$\operatorname{sinc}(x) \equiv \frac{\sin(\pi x)}{\pi x},$$

the sinc function being equal to unity at the x=0 singularity where the sin function also approaches zero. After removing zero padding, this sin c function has a spatial domain response peak of one pixel. Applying reconstruction steps (i) through (iv) to this response results in the extension of the peak into multiple pixels in the spatial domain. Continuing with the other reconstruction steps results in a smooth interpolation between these discrete peak values. Finally after performing step (ix), the resulting de-windowed frequency domain response is flat, with no change in amplitude or phase (other than the linear phase ramp that determines the position of the peak in the spatial domain image). Thus, the information content in this example includes a constant amplitude and phase offset.

XVII. Signature Derivation: The amplitude and phase of a scatterer's response by themselves provide only minimal information as exemplified by the pure point response. However, variations of the amplitude and phase of the response across the synthetic aperture and/or chirp drive the signature detectors. For example, for a pure (i.e., idealized) point target, the signature information derives from the knowledge that both the amplitude and phase of the response remain constant across the synthetic aperture, whereas for the dihedral target, the signature information derives from the observed variations in both amplitude and/or phase of the response across the chirp (as in FIG. 30). Thus, both the change and its absence in the responses across the chirp and/or synthetic aperture have the necessary information content to identify imaged candidates that correspond to a target scatterer. The signature method is driven by the quality of characterizing the variations in amplitude and phase responses with minimal or no loss in spatial resolution. Thus, the actual information content arises from adequate sampling of phase and amplitude information at multiple azimuth bins and using the sampled values in the signature analysis process. The Single Scattering Center Phase History Reconstruction provides a method for sampling responses at a high level across the synthetic aperture and/or the chirp and to recover interpolated versions of these responses, without degrading spatial resolution and adversely influencing target detection and discrimination.

The signature approach described herein can be used with any of the polarimetric decomposition techniques. The theoretical responses can sometimes be derived and alternatively be determined with computational electromagnetic codes. The size and number of the sub-apertures can be chosen based on the bandwidth of the SAR system and the size of the desired objects to be detected and classified. The parameters in the distance functions used in the weighted log-likelihood function can be determined using collected data or estimated using a basic knowledge of SAR systems. These embodiments can preferably be used with virtually any two, three or four channel polarimetric SAR, and can be adapted to both high and low resolution/bandwidth systems.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A system for processing an acquired polarimetric synthetic aperture radar (SAR) image of a region to identify a candidate pixel that correlates to a target representation, said polarimetric SAR image having a plurality of pixels, said candidate pixel corresponding to a position in said region that contains a candidate object, the system comprising:
a sub-aperture processor configured to extract an N plurality of sub-apertures from the polarimetric SAR image;
a polarimetric decomposition processor configured to deconstruct a J plurality of parameter components from each sub-aperture of said N plurality of sub-apertures;
a log-likelihood processor configured to identify the candidate pixel by generating a log-likelihood value from said J plurality of parameter components by:
obtaining an acquired value for said sub-aperture from at least one parameter component of said J plurality of parameter components;
acquiring a reference value that characterizes said parameter component for the target representation;
determining a distance value between said reference value and said acquired value;
combining said distance value for said each sub-aperture of said N plurality of sub-apertures together to obtain said log-likelihood value; and
log-likelihood value against a classification criterion to determine whether the candidate pixel conforms to the target representative.

2. The system according to claim 1, wherein comparing said log-likelihood further includes applying a lower bound threshold to discard a pixel from the plurality of pixels.

3. The system according to claim 1, wherein the polarimetric SAR image corresponds to at least one of Horizontal transmit—Horizontal receive (HH), Horizontal transmit—Vertical receive (HV), Vertical transmit—Vertical receive (VV) and Vertical transmit—Horizontal receive (VH).

4. The system according to claim 1, wherein said log-likelihood processor further determines said distance value by:
subtracting said reference value from said acquired value to obtain a difference;
assigning a normalized default to said difference in response to said difference having a specified relation to a parameter threshold, and otherwise normalizing said difference; and
determining a natural log of unity minus said difference to obtain said distance value.

5. The system according to claim 1, wherein:
said acquired value represents a set of acquired values relating to said J plurality of parameter components,
said reference value represents a set of reference values from said J plurality of parameter components,
said distance value represents a set of distance values, such that respectively subtracting each reference value in said set of reference values from each acquired value in said set of acquired values determines each distance value in said set of distance values, and
said distance summation represents a set of distance summations, such that each distance summation corresponds to combining together for the N plurality of sub-apertures said each distance value in said set of distance values.

6. The system according to claim 5, wherein said log-likelihood processor further includes operations for:
assigning a weighting factor to said each distance summation, each weighting factor being within a set of weighting factors; and determining a product of said each distance summation and said each weighting factor to obtain a weighted result, each weighted result being within a set of weighted results; and combining said each weighted result in said set of weighted results to produce a weighted log-likelihood function.

7. The system according to claim 1, wherein said sub-aperture processor extracts said N plurality by:

performing an inverse fast Fourier transform (FFT) on the SAR image as transformed image data;

spectral windowing said transformed image data as windowed data;

separating sub-aperture data as transformed extracted data; and performing an FFT on the extracted data as said N plurality.

8. The system according to claim 1, wherein said polarimetric decomposition processor deconstructs said J plurality by:

subdividing said each sub-aperture into reciprocal and nonreciprocal components;

subdividing said reciprocal component into maximum symmetric and minimum symmetric components;

combining said maximum symmetric, minimum symmetric and nonreciprocal components; and separating observable features into said J plurality.

9. The system according to claim 8, wherein said J plurality includes: scatter type; orientation angle; amplitude of maximum symmetric normal; symmetry angle; reciprocity angle and symmetry weight.

* * * * *